United States Patent
Reid et al.

(10) Patent No.: US 11,907,894 B2
(45) Date of Patent: *Feb. 20, 2024

(54) STORAGE DEVICES AND OPERATION METHODS THEREOF

(71) Applicant: FFF Enterprises, Inc., Temecula, CA (US)

(72) Inventors: Kenneth Shay Reid, Temecula, CA (US); Connor Ramm, Temecula, CA (US)

(73) Assignee: FFF Enterprises, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,838

(22) Filed: Mar. 18, 2022

(65) Prior Publication Data
US 2022/0207479 A1 Jun. 30, 2022

Related U.S. Application Data

(63) Continuation-in-part of application No. 16/994,843, filed on Aug. 17, 2020, now Pat. No. 11,282,028, (Continued)

(51) Int. Cl.
*G06K 15/00* (2006.01)
*G06Q 10/0836* (2023.01)
(Continued)

(52) U.S. Cl.
CPC ..... *G06Q 10/0836* (2013.01); *G06K 7/10861* (2013.01); *G06K 7/1417* (2013.01); (Continued)

(58) Field of Classification Search
CPC ...... G06Q 10/087; G16H 20/13; G16H 40/20; G06F 17/0092
(Continued)

(56) References Cited

U.S. PATENT DOCUMENTS 5,485,000 A * 1/1996 Schneider .............. G06K 17/00
235/494
6,788,997 B1 9/2004 Frederick
(Continued)

OTHER PUBLICATIONS

International Search Report and Written Opinion, PCT2020/013241, dated Mar. 25, 2020.
(Continued)

*Primary Examiner* — Daniel St Cyr
(74) *Attorney, Agent, or Firm* — Fox Rothschild LLP

(57) ABSTRACT

A cabinet that securely stores items in cabinet drawers using preconfigured nests. The drawers can be reconfigured using one or more dividers to divide the drawers into two or more compartments. The cabinet has cameras mounted to it and uses images to determine if a compartment contains an item and other information. In some embodiments, features are implemented to closely monitor the self-serve access and removal of items from the cabinet. Features can include the incorporation of serialization of items and automated tracking of items in a bulk item stocked in the cabinet. Features can also include multimode access such as allowing users to quickly access contents of the cabinet while for example providing graphical illustrations based on information about the stock in a supporting database.

25 Claims, 28 Drawing Sheets

Related U.S. Application Data which is a continuation of application No. 16/740,371, filed on Jan. 10, 2020, now Pat. No. 11,263,581.

(60) Provisional application No. 62/791,683, filed on Jan. 11, 2019.

(51) Int. Cl.
  *G06K 7/10* (2006.01)
  *G06Q 10/087* (2023.01)
  *G06K 7/14* (2006.01)
  *G06V 10/22* (2022.01)

(52) U.S. Cl.
  CPC ......... *G06Q 10/087* (2013.01); *G06V 10/225* (2022.01); *G06V 10/235* (2022.01)

(58) Field of Classification Search
  USPC ............... 235/383, 385, 462.01, 462.09
  See application file for complete search history.

(56) References Cited

U.S. PATENT DOCUMENTS

| | | | | |
|---|---|---|---|---|
| 7,568,627 | B2* | 8/2009 | Lunak | B65G 1/127 |
| | | | | 235/383 |
| 7,630,791 | B2 | 12/2009 | Nguyen et al. | |
| 7,859,417 | B2* | 12/2010 | Harper | G06Q 10/087 |
| | | | | 340/572.8 |
| 8,700,210 | B2 | 4/2014 | Bufalini et al. | |
| 9,355,220 | B2 | 5/2016 | Paydar et al. | |
| 9,842,351 | B2* | 12/2017 | Lenahan | G06Q 20/384 |
| 11,263,581 | B2* | 3/2022 | Reid | G06V 40/28 |
| 11,282,028 | B2* | 3/2022 | Reid | G06V 40/28 |
| 2003/0001466 | A1 | 1/2003 | Herrington | |
| 2007/0208598 | A1* | 9/2007 | McGrady | G16H 15/00 |
| | | | | 705/3 |
| 2010/0039682 | A1 | 2/2010 | Peot et al. | |
| 2010/0046791 | A1* | 2/2010 | Glickman | G06V 10/147 |
| | | | | 705/28 |
| 2013/0257592 | A1 | 10/2013 | Johnson et al. | |
| 2014/0167575 | A1 | 6/2014 | Freimuth | |
| 2016/0098831 | A1 | 4/2016 | Glickman et al. | |
| 2016/0165114 | A1 | 6/2016 | Kim et al. | |
| 2016/0307150 | A1* | 10/2016 | Rogers | B25H 3/028 |
| 2017/0109480 | A1 | 4/2017 | Vahlberg | |

OTHER PUBLICATIONS

Rieffel, et al. "Interactive Models from Images of a Static Scene,"Computer Graphics and Virtual Reality (CGVR 09), Jul. 13, 2009, 9 pages; Retrieved on Mar. 6, 2020 (Mar. 6, 2020) from <http:/lciteseerx.ist.psu_edu/viewdoc/ download? doi=10.1.1.421.7254&rep=rep1 &type=pdf> entire document.

* cited by examiner

3" Drawers (10):
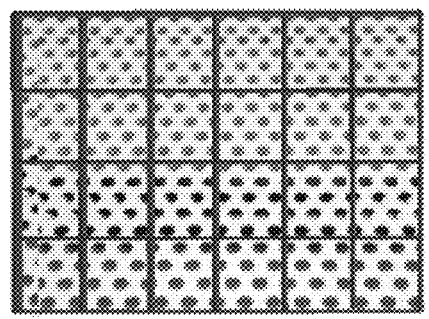
Drawers 11 - 12
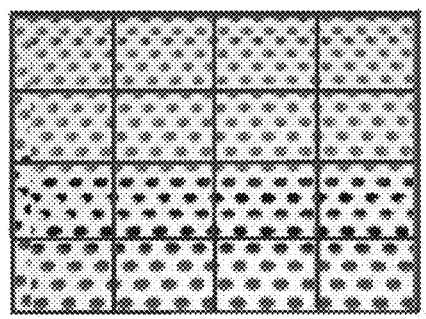
Drawers 13 - 18
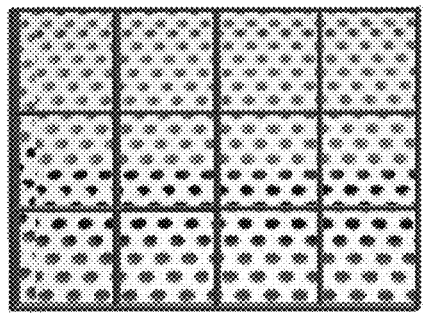
Drawer 19
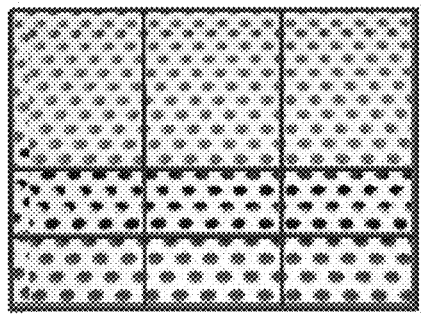
Drawer 20
Fig. 4

4" Drawers (2):
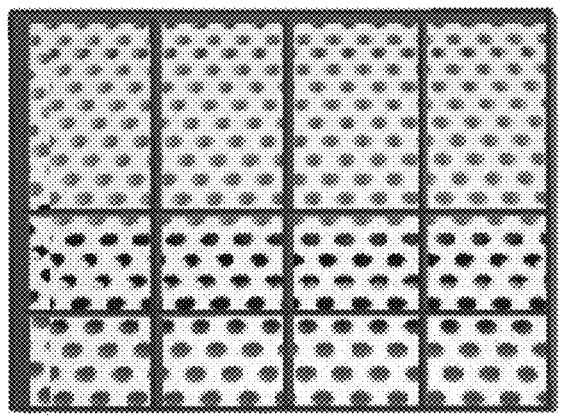
Drawer 09
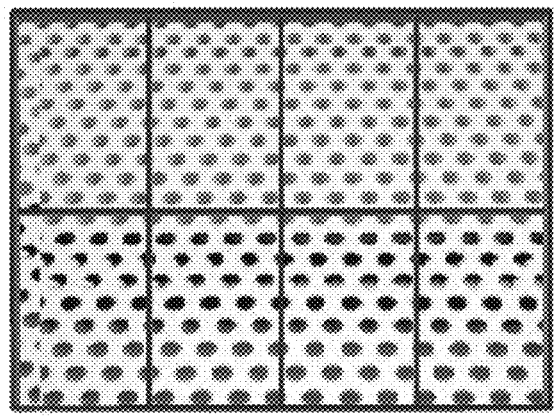
Drawer 10
Fig. 5

| H-Image | H-Value | H-Text | L-Image | L-Value | L-Text | W-Image | W-Value | W-Text |
|---|---|---|---|---|---|---|---|---|
| 2 | 2.0 | 2" | ◆ | 0.5 | A | ■ | 0.6 | 1 |
| 3 | 3.0 | 3" | A | 0.8 | A | 1 | 0.7 | 1 |
| 4 | 4.0 | 4" | B | 1.6 | B | 2 | 1.4 | 2 |
| 5 | 5.0 | 5" | C | 2.3 | C | 3 | 2.2 | 3 |
| 6 | 6.0 | 6" | D | 3.1 | D | 4 | 2.9 | 4 |
| | | | E | 3.8 | E | 5 | 3.7 | 5 |
| | | | F | 4.6 | F | 6 | 4.4 | 6 |
| | | | G | 5.3 | G | 7 | 5.2 | 7 |
| | | | H | 6.1 | H | 8 | 5.9 | 8 |
| | | | J | 6.8 | J | 9 | 6.7 | 9 |
| | | | K | 7.6 | K | 10 | 7.4 | 10 |
| | | | L | 8.3 | L | 11 | 8.2 | 11 |
| | | | M | 9.1 | M | 12 | 8.9 | 12 |
| | | | N | 9.8 | N | 13 | 9.7 | 13 |
| | | | O | 10.6 | O | 14 | 10.4 | 14 |
| | | | P | 11.3 | P | 15 | 11.2 | 15 |
| | | | R | 12.1 | R | 16 | 11.9 | 16 |
| | | | S | 12.8 | S | 17 | 12.7 | 17 |
| | | | T | 13.6 | T | 18 | 13.4 | 18 |
| | | | U | 14.3 | U | 19 | 14.2 | 19 |
| | | | V | 15.1 | V | 20 | 14.9 | 20 |
| | | | X | 15.8 | X | 21 | 15.7 | 21 |
| | | | Y | 16.6 | Y | 22 | 16.4 | 22 |
| | | | Z | 17.7 | Z | 23 | 17.2 | 23 |
| | | | | | | 24 | 17.9 | 24 |
| | | | | | | 25 | 18.7 | 25 |
| | | | | | | 26 | 19.4 | 26 |
| | | | | | | 27 | 20.2 | 27 |
| | | | | | | 28 | 20.9 | 28 |
| | | | | | | 29 | 21.7 | 29 |
| | | | | | | 30 | 22.4 | 30 |
| | | | | | | 31 | 23.2 | 31 |

Fig. 6A

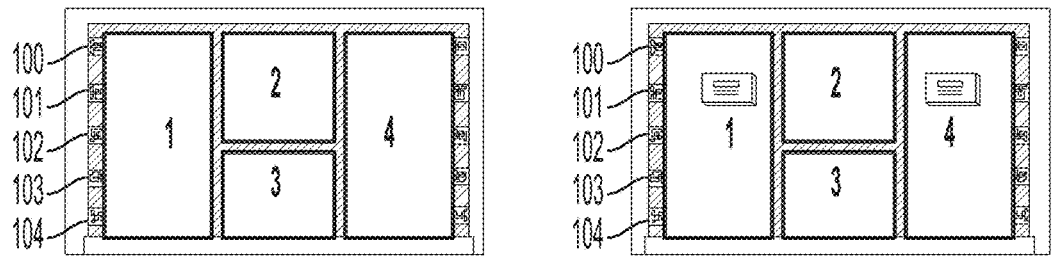
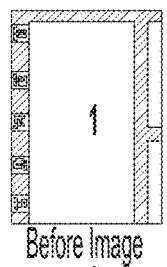 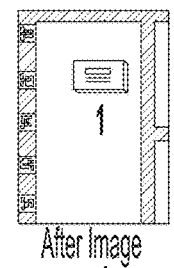
The system determines that nest 1 has change, updates the information on nest 1, and communicates the detection result to the user
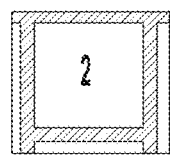 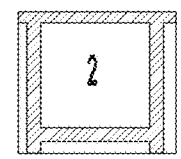
The system determines that nest 2 has change, updates the information on nest 2, and communicates the detection result to the user
Fig. 21A

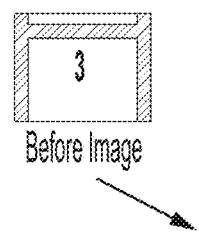
Before Image
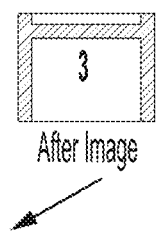
After Image
The system determines that nest 3 has change, updates the information on nest 3, and communicates the detection result to the user
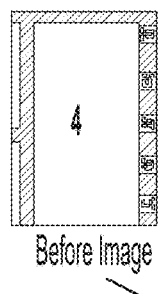
Before Image
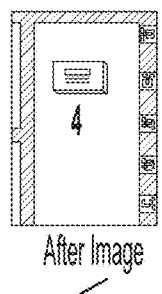
After Image
The system determines that nest 4 has change, updates the information on nest 4, and communicates the detection result to the user
Fig. 21B

STORAGE DEVICES AND OPERATION METHODS THEREOF

CROSS-REFERENCE TO RELATED APPLICATIONS

This application is a Continuation-in-Part of U.S. patent application Ser. No. 16/994,843, filed Aug. 17, 2020, which is a Continuation of U.S. patent application Ser. No. 16/740,371, filed Jan. 10, 2020, now U.S. Pat. No. 11,263,581, issued Mar. 1, 2022, which claims the benefit of priority to U.S. Provisional Application 62/791,683, filed Jan. 11, 2019, the entirety of each is herein incorporated by reference.

FIELD OF THE INVENTION

Embodiments of the present invention are related to storage devices and operations of storage devices, and in particular, to storage devices and operations that involve a camera, a divided drawer, and a plurality of visual markers.

BACKGROUND OF THE INVENTION

Cabinets are widely used by facilities to store their products, tools, merchandises, and medications. Currently, there is a need for improved cabinets and related features in the industry that do not rely upon added identification devices to the packaging, that are easily reconfigured for changing product demand and that have a robust and multi-faceted machine to human interface.

SUMMARY OF THE INVENTION

It is an objective of the invention to provide improved storage devices that can operate without the use of unique identification devices such as RFID affixed devices or barcodes; however, may have capability to use an affixed 2D barcode label for serialization purposes. The device may also incorporate the use of specialized over pack techniques to determine product usage (e.g., a colored band that must be broken to use product).

It is another objective of the invention to provide improved storage devices that include a highly interactive user interface, adjustable compartments in the drawer that are flexible for different product sizes, and compartments that can store items without their packages being removed.

It is still another objective of the invention to provide improved storage devices that are equipped with a backup override and recovery function to ensure the user high availability of the products within.

It is a further objective of the invention to provide improved storage devices that minimize the number of in-cabinet electronics.

It is a related objective of the invention to provide improved storage devices that can store different types of items, such as refrigerated or non-refrigerated product, biologics, vaccines, solid molecules, merchandise, and tools.

In accordance with principles of the invention, a cabinet is contemplated. A cabinet comprises a drawer comprising a volume to store items, one or more dividers that divide the volume into a plurality of nests, and a wall enclosing the dividers and the nests. The wall extends upward from a bottom surface of the drawer and comprises a top surface including a plurality of visual markers. The cabinet also comprises an imaging and spatial determination system including a processor and memory storing computer executable instructions, and a camera. The execution of the instructions in the memory causes the processor to record, via the camera, a first image of the drawer when the drawer is open, the first image including the visual markers, determine if the drawer is partially open or fully open using the visual markers in the first image, and determine first content information of the drawer from the first image. The execution of the instructions in the memory also causes the processor to record, via the camera, a second image of the drawer, and determine second content information of the drawer from the second image. The execution of the instructions in the memory further causes the processor to compare the first image and the second image and determine if there is a difference between the images and update content information of the drawer based on the comparison.

In one embodiment, the system further includes a database storing distance information of the plurality of visual markers and the distance information represents how far the drawer is open.

In one embodiment, the plurality of visual markers are QR codes.

In one embodiment, the plurality of visual markers include a QR code configured to indicate the drawer is 6 cm open upon recording the first image.

In one embodiment, the plurality of visual markers include a QR code configured to indicate which drawer in the cabinet is open upon recording the first image.

In one embodiment, the wall has a height of 3 inches and the distance between the top surface of the wall and the bottom surface of the drawer is 3 inches.

In one embodiment, the drawer is configured to store items to be scanned by an optical scanner and the cabinet further comprises another drawer configured to store items from the first drawer scanned by the optical scanner. The cabinet further comprises a user interface and the execution of the instructions in the memory further causes the processor to communicate, via the user interface, to a user an option to select an item stored in the drawer and identify an item from the drawer scanned by the optical scanner as a scanned item.

In one embodiment, the execution of the instructions in the memory further causes the processor to receive, via the user interface, a user selection to obtain an item from the cabinet, determine whether the item to be obtained is available in the drawer or the other drawer, and communicate, via the user interface, to the user that the item to be obtained is available in the other drawer when the item to be obtained is available in both the drawer and the other drawer.

In one embodiment, the execution of the instructions in the memory further causes the processor to communicate, via the user interface, to the user to retrieve the item to be obtained from the drawer when the step of determining determines that the item is unavailable in the other drawer, and identify the retrieved item after scanning by the optical scanner as a scanned item.

In accordance with principles of the invention, another cabinet is contemplated. The cabinet comprises a first drawer configured to store items to be scanned by an optical scanner and a second drawer configured to store items from the first drawer scanned by the optical scanner. The first drawer and second drawer comprise a volume to store items, one or more surfaces of the first drawer including a plurality of visual markers, and one or more dividers that divide the volume into a plurality of nests. The cabinet also comprises an imaging and spatial determination system including a processor and memory storing computer executable instructions, a user interface, and a camera. The execution of the instructions in the memory causes the processor to communicate, via the user interface, to a user an option to select an item stored in the first drawer and identify an item from the first drawer scanned by the optical scanner as a scanned item. The execution of the instructions in the memory also causes the processor to receive, via the user interface, a user selection to obtain an item from the cabinet, determine whether the item to be obtained is available in the first drawer or the second drawer, and communicate, via the user interface, to the user that the item to be obtained is available in the second drawer when the item to be obtained is available in both the first drawer and the second drawer.

The execution of the instructions in the memory further causes the processor to communicate, via the user interface, to the user to retrieve the item to be obtained from the first drawer when the step of determining determines that the item is unavailable in the second drawer, and identify the retrieved item after scanning by the optical scanner as a scanned item. Additionally, the execution of the instructions in the memory causes the processor to make the second drawer available to the user to store the identified item. Moreover, the execution of the instructions in the memory causes the processor to record, via the camera, a first image of the first drawer or the second drawer when that drawer is open, the first image, including the visual markers, determines if that drawer is partially open or fully open using the visual markers in the first image, and determines first content information of that drawer from the first image. Furthermore, the execution of the instructions in the memory causes the processor to record, via the camera, a second image of the same drawer in the first image, and determine second content information of that drawer from the second image. The execution of the instructions in the memory then causes the computer to compare the first image and the second image and determine if there is a difference between the images and update content information of that drawer based on the comparison.

In one embodiment, the one or more surfaces of the drawer including a plurality of visual markers comprises walls of the drawer. The walls of the drawer include a color that is different from a bottom surface of the drawer. The color difference allows the system to detect that a drawer is in the first image and the second image and determine the first content information and the second content information in the first image and the second image.

In one embodiment, the plurality of visual markers include a QR code configured to indicate the drawer is 6 cm open upon recording the first image.

In one embodiment, the plurality of visual markers include a QR code configured to indicate which drawer in the cabinet is open upon recording the first image.

In one embodiment, the system is configured to display a drawer configuration of the first drawer or the second drawer through the user interface upon recording the first image. The system is further configured to display an identifier for each nest in the drawer configuration displayed on the user interface upon recording the first image.

In one embodiment, the system further includes a database storing distance information of the plurality of visual markers.

In one embodiment, the cabinet is configured to operate in a mode that relies on a backup battery and a keypad to unlock a door of the cabinet when the primary source of power is unavailable and to update inventory information of the cabinet when the primary source of power becomes available again, and wherein the updated inventory information includes what items and the number of items that haven been taken out from or inserted into the drawers.

In some embodiments, a cabinet or cabinet system that implements precise inventory tracking operations is provided such as by implementing two or more determinations of whether the removed item is a select product or item.

In some embodiments, serialization techniques are provided for maintaining inventory of items in the cabinet involving bulk items and lot items in the bulk item.

In some embodiments, multiple simultaneous ways of using the cabinet is provided such as to allow the user, with the option to open any drawer when the user approaches the cabinet, such as after logging into the cabinet, and can provide another mode of operation at the same time that allows the user to enter product information and be guided in the process.

Counterpart method and computer-readable medium embodiments would be understood from the above and the overall disclosure. Also, broader, narrower, or different combinations of the described features are contemplated, such that, for example, features can be removed or added in a broader or narrower way.

BRIEF DESCRIPTION OF DRAWINGS

Various features of examples in accordance with the principles described herein may be more readily understood with reference to the following detailed description taken in conjunction with the accompanying drawings and in which:

FIG. 4 depicts another plurality of drawers having illustrative divider configurations in accordance with some embodiments of the present invention;

FIG. 5 depicts another plurality of drawers having illustrative divider configurations in accordance with some embodiments of the present invention;

FIGS. 6A and 6B depict illustrative frame and size tables for a method for detecting and determining a divider configuration in accordance with some embodiments of the present invention;

FIGS. 21A and 21B together make up a process that illustrates a nest change detection method in accordance with some embodiments of the present invention;

Figure 1:
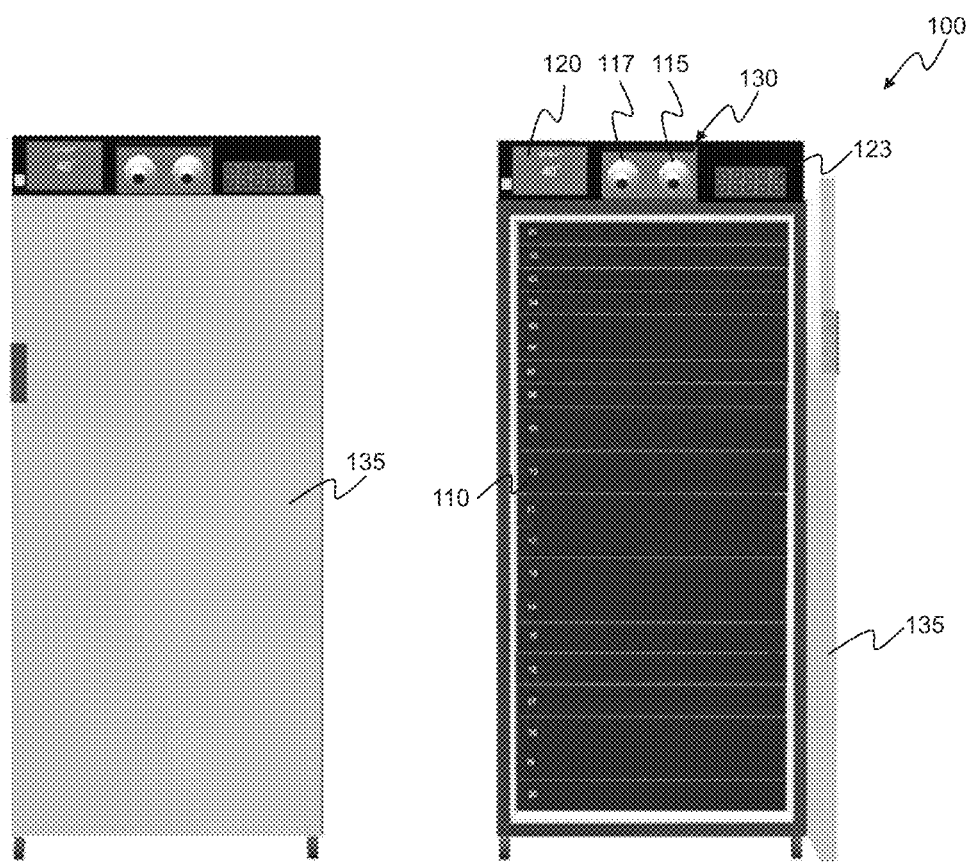
FIG. 1 depicts an illustrative storage device in accordance with some embodiments of the present invention.

The components in the figures are not necessarily drawn to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely. Furthermore, counterpart system, method, and computer-readable medium embodiments would be understood from the above and the overall disclosure. Also, broader, narrower, or different combinations of the described features are contemplated, such that, for example features can be removed or added in a broadening or narrowing way.

DETAILED DESCRIPTION OF THE INVENTION

The present application is related to a cabinet that has manually reconfigurable shelves, that can automatically detect the configuration of compartments in a shelf, and that can automatically detect if a user is accessing or restocking the right compartment. The shelf can be reconfigured using one or more dividers to divide the shelf into two or more compartments. The compartments can have different sizes and store products, tools, merchandises, medications, and other items. One or more surfaces of the shelf include a plurality of visual markers. In one embodiment, the bottom surface of the shelf includes a plurality of visual markers and they form a pattern on the bottom surface. In another embodiment, the wall of the shelf (top surface of the wall) includes a plurality of visual markers. The cabinet has one or more cameras mounted to it and uses one of the cameras and the pattern, visual markers, image detection, or a combination thereof to determine if a compartment contains an item or has been accessed, if the compartment configuration has been modified, and other information.

The cabinet can be an ambient cabinet, a refrigerator or other temperature-controlled machine. The cabinet can also be constructed and fashioned as a safe for products requiring high security control. A portal for the cabinet is implemented and configured to be accessible by administrators and customers of the cabinet. Administrators and customers can access the portal from their computers over a network or Internet to obtain information related to the cabinet such as operating status and inventory information. Administrators and customers can also control the cabinet and place orders from their computers. The cabinet can further automatically tell the user where the items should be inserted (e.g., which drawer and which compartment in the drawer, or another cabinet and the drawer and compartment in that cabinet if the items are not for the current cabinet) before placement.

FIG. 1 depicts an illustrative storage device 100. The storage device 100 includes a storage body 105 configured to store one or more drawers, one or more drawers 110, a user interface 120, and an imaging and spatial determination system 130. The drawers 110 can be opened and closed, such as by configuring them to automatically eject from and retract into the storage device 100 (e.g., controlling the opening and closing of the drawers through the user interface) or to be manually moved in and out the storage device 100 (e.g., manually pulling out and pushing in the drawers by a user). Other manners of opening and closing the drawers are also contemplated. The storage device 100 may include a door 135 to close or open the storage device or the storage body 105. The door 135 may be provided as an additional protection to the drawers 110 such that accessing the drawers 110 requires opening or unlocking the door 135 first.

Figure 2:
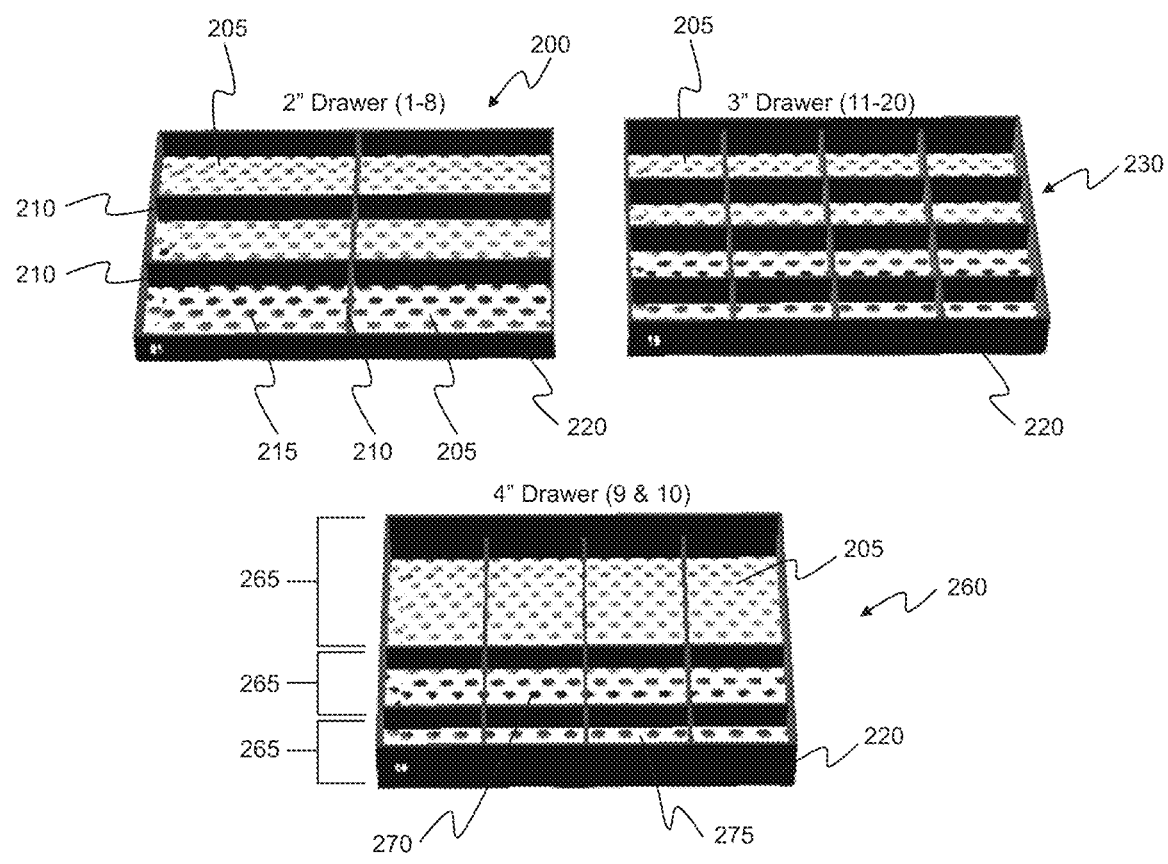
FIG. 2 depicts illustrative drawers in accordance with some embodiments of the present invention.

FIG. 2 depicts illustrative drawers 200, 230, 260. The drawer 200 has a height of 2 inches (2" drawer), the drawer 230 has a height of 3 inches (3" drawer), and the drawer 260 has a height of 4 inches (4" drawer). Each one of the drawers 200, 230, 260 includes a volume to store items. Each of the drawers 200, 230, 260 may include one or more dividers 210 that divides the volume into one or more nests 205 or compartments. Each of the nests 205 can also store items. The top surface of the drawer is open (e.g., without a cover or lid), and individuals can place items into and retrieve items from the nests when the drawer is open. In one embodiment, the bottom surface of the drawer or nest includes one or more perforations 215 that allows air flow (e.g., air can flow from one drawer to another drawer through the perforations). Perforations can also be visual markers that can be used in determining a pattern on the bottom surface of nest 205. Visual markers can include markers formed using characters, values, numbers, structures (e.g., change in physical structure of the bottom surface or a structure drawn on the bottom surface), color, shapes, or a combination thereof. For example, visual markers can be a plurality of indentations, a plurality of triangles drawn in a color, or other markers.

The drawers may have a configuration or a divider configuration. A configuration refers to a layout of storage spaces or nests, or an arrangement formed by dividers that defines the number of nests and/or the sizes of nests in the drawer. Nest configuration and drawer configuration are other terms for divider configuration and they are used interchangeably throughout this application. In some embodiments, a configuration (or configuration information) may further include the nest pattern, the number of the perforations in each nest, or both. The configuration can be changed depending on the number of dividers utilized and their placement in the drawer (e.g., installed vertically or horizontally and their locations inside the drawer). The configuration is manually customizable by an individual. Additional or fewer dividers can be inserted into the drawer to determine the appropriate number and sizes of nests. The storage device can include additional dividers allowing the individual to customize the configuration. The nests (e.g., 205, 270, 275) in the drawer (e.g., 260) can have different sizes by separating the dividers with different distances (e.g., 265). The dividers are removable from the drawer and are reconfigurable (e.g., can be removed and installed in different locations in the drawer and the drawer includes corresponding structures such as at the edge or perimeter to receive the dividers). The dividers and drawers are adapted to allow a user to manually install or remove dividers in the drawer to define new compartment or to remove and create new compartment. The drawer is adapted to mate with the dividers to install dividers that form one or more nests in the drawer.

The dividers in all the drawers may have same or different sizes. For example, all the dividers used in all the drawers may have the same height of 2 inches. The storage device may have a first drawer having a first or default configuration such as the one shown in the drawer 200, a second drawer having a second configuration (e.g., reconfigured from the first configuration) such as the one shown in the drawer 230, and a third drawer having a third configuration (e.g., reconfigured from the first configuration but is different from the second configuration) such as the one shown in the drawer 260. Drawers can also be used without dividers. A drawer without any divider also has a configuration or drawer configuration, e.g., a rectangular configuration defined by the perimeter of the drawer that has only one nest.

Figure 3:
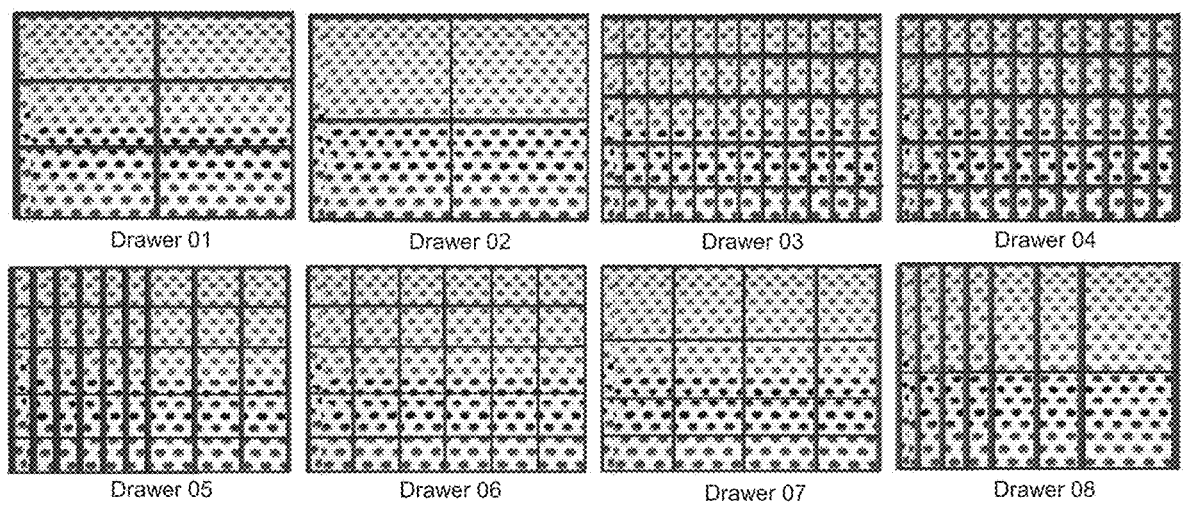
FIG. 3 depicts a plurality of drawers having illustrative divider configurations in accordance with some embodiments of the present invention.

All the drawers may have the same width and depth (the height as shown may vary), such as 24 inches wide and 18 inches deep, 18 inches wide and 10 inches deep, and other dimensions. The storage device may include a plurality of drawers 200, a plurality of drawers 230, and a plurality of drawers 260. For example, as shown in FIGS. 3-5, the storage device may accommodate 20 drawers that are 24-inch wide and 18-inch deep, that have a height of several inches, such as between 2 inches and 4 inches, and that utilize dividers that are all 2 inches high. In this example, the storage device contains a total of 420 nests. The storage device may include 8 2-inch high drawers, and those drawers may have illustrative divider configurations shown in FIG. 3. The storage device may include 10 3-inch high drawers, and those drawers may have illustrative divider configurations shown in FIG. 4. The storage device may include 2 4-inch high drawers, and those drawers may have illustrative divider configurations shown in FIG. 5. In FIGS. 3-5, all the drawers have the same width (24 inches) and depth (18 inches) and all the dividers used are 2 inches high.

Other sizes of the dividers and drawers are also contemplated. The drawers may be stacked on top of each other and the storage device may include one or more columns of drawers stacking on top of each other. The drawers may be arranged such that the adjacent drawers are in physical contact or are separated by a space. The drawers may have a flat, front surface 220 that serves as a portion of a barrier or wall that prevents air or light from entering into the storage device. The barrier or wall is formed by the flat, front surface 220 of all the drawers when they are aligned (when all the drawers are closed) as shown in FIG. 1. The wall has no gap or a very small gap (e.g., the gap between adjacent drawers or adjacent flat, front surfaces) such that the wall in conjunction with the storage body (e.g., the wall formed by the front surfaces and the perimeter of the storage body or the empty space in the storage body that receives the drawers) can completely prevent or reduce the amount of air or light from entering into drawers or the storage device. The wall serves as a protection to the items stored in the drawers when the door is open. The front surface 220 may include a handle or other mechanism to facilitate the opening and closing of the drawer if necessary.

The user interface 120 (FIG. 1) include devices that allow an individual to interact with the storage device. The user interface 120 may include a display, touch screen, mouse, keyboard, click wheel, trackball, keypad, button, dial, speaker, microphone, biometric reader, or any combination thereof. The user interface 120 includes devices that can receive input from the individual, and the input can be in the form of physical movement (touching or clicking the user interface 120) or audio (e.g., individual speaking to the user interface 120). Preferably, the user interface 120 includes a touch-sensible screen that presents an interactive graphical user interface to the current user of the storage device. The graphical user interface can be implemented using software (stored in non-transient memory), a processor (one or more), and memory. From the touch screen the individual can open or close the drawers. The person can enter the number of the drawer he wishes to open on the touch screen and the storage device then ejects the corresponding drawer after the person enters the number. The person can close the drawer by pressing a close button on the touch screen or entering the drawer number again and the storage device can then close the drawer by retracting the drawer. If desired, the person can also manually pull the drawer from and push the drawer into the storage body to open and close the drawer, respectively. The storage device may include a mechanism to engage with or lock the drawer when the drawer is closed. The storage device may also include a drawer motor and drawer mechanical components configured to open/eject and close/retract a drawer in response to receiving an open command and a close command from the user interface 120, respectively. For example, upon receiving an open command (e.g., entering the number of the drawer to be opened), the user interface 120 sends a signal to the drawer motor and drawer mechanical components and the motor and components then perform an operation that causes the drawer to be ejected. In some embodiments, the storage device can be operated manually and the user action (e.g., pulling or pushing) can cause the motor and/or corresponding components to move accordingly (e.g., opening or closing). The storage device can also provide information about the storage device, drawers, nests and divider configurations via the user interface 120. For example, the user interface 120 can notify individuals that a certain nest is empty or is low on supplies, that other nests are full, and the temperature of the storage device (e.g., the temperature in which the drawers or items are stored in).

In some embodiments, the actual configuration of the nests can be automatically determined by the spatial and image system by using the camera (discussed later in the application) and the user interface 120 can automatically display a graphical representation of the nest configuration in a drawer. If desired, the storage device may include a database that stores divider configuration information (e.g., all the possible divider configurations that a drawer can have), drawer information (e.g., the total number of drawers in the storage device, an identification number or code for identifying each of the drawers, and the associated divider configuration set by the user or determined by the imaging and spatial determination system), imaging information (e.g., recorded images, nest patterns, perforation patterns, and visual markers, which are discussed later), video information (e.g., recorded videos, which are discussed later), nest identifiers (discussed later), size tables (discussed later), inventory information, or other information. The storage device can also change a configuration that was previously determined by the storage device to a different configuration if the drawer has been manually reconfigured by a user. This can be an automatic process that detects the current drawer and nest configuration. The person can also add additional drawers to the storage device if it is not full (e.g., still includes space for accommodating other drawers). The user interface 120 communicates with the database to access the information. The database can also be stored remotely and the storage device can communicate with the remote database to access the necessary data (e.g., divider configuration information, drawer information, imaging information, video information, etc.).

The user interface 120 communicates with the imaging and spatial determination system 130. The imaging and spatial determination system 130 includes an image sensor or optical instrument for capturing still images or recording videos (e.g., camera 115), and a processor and memory configured to control the operation of the sensor or instrument and determine the actual configuration and update the database. The camera 115 of the imaging and spatial determination system 130 can record an image of the drawer. The drawer is open or in an open position that allows the camera 115 to take a complete image of the divider configuration in the drawer (e.g., the entire divider configuration is in the image). For example, the storage device may eject the drawer to an open position allowing the entire divider configuration to be recorded by the camera 115. The drawer does not need to be in the full open position in order to image the divider configuration as long as the open position is sufficient for the camera to see the complete divider configuration. A complete divider configuration refers to an arrangement that includes all the nests created by all the dividers. The perforations on the bottom surface of the drawer, the visual markers on the walls of the drawer, or both may be used to help determine the boundary of the drawer. The drawer being imaged may be empty (e.g., none of the nests include any item), partially filled, or completely filled. Preferably, the drawer is empty when the image is taken. The divider configuration can be set for each drawer before the storage device is used for the first time or during service life.

In some embodiments, imaging the nest configuration of each drawer before deployment is not necessary. The imaging and spatial determination system may be provided with information that defines a perforation pattern and the system can determine the corresponding pattern for each nest depending on the size of each nest (e.g., by duplicating additional perforations in a provided perforations image and enlarging the image until the image fits the size of the nest, by removing several perforations in a provided perforations image and shrinking the image until the image fits the size of the nest, etc.). The nest size determination method and the boundary determination method are illustrated in FIGS. 6-10 and described below.

The storage device 100 may also include a second camera 117 and backup keypad 123, both of which are described later in the application. The storage device 100 may include additional cameras (e.g., the total number of cameras is three or more) or may have either the first camera 115 or the second camera 117. For example, the storage device 100 may include another first camera 115 and the images taken by both first cameras 115 can be stitched together to form a larger image or a better quality image. For example, the storage device 100 may include another camera that is another type or the same type, and that is used for a different purpose (e.g., telephoto camera, ultra-wide angle camera, shorter or longer focal length camera, a camera to record an image of the user, etc.). In one embodiment, the storage device 100 includes another camera dedicated to record an image of an individual for determining whether the individual is an authorized user (further discussed below). In another embodiment, the same camera (first camera 115) can be used for such purposes.

The processor and memory are programmed with algorithms that can recognize the divider configuration in the image. The algorithms may be capable of interpreting the dividers in the image as edges or lines that delineate the structure of the configuration. The number of nests may be determined from the delineated structure. The perimeter or boundary of the drawer may also be considered by the algorithms in making such determinations if needed. The algorithms may involve visual marker detection or perforation detection such as by discerning visual markers on the walls or perforations on the bottom surface and determining the area associated with the visual markers or perforations (e.g., the area on which the visual markers or perforations are formed) and circumscribed by dividers and a portion of the drawer perimeter to be a nest. The algorithms can detect dividers and the drawer perimeter and can stop determining the area when it senses and detects a physical relationship that indicates the perimeter of the nest is known using the camera and comparison to the reference data (e.g., adjacent perforations are separated by a divider). The region defined or closed by the determined nests is the configuration of the dividers. The algorithms can discern the visual markers or perforations by several manners, such as by creating reference data representing the visual markers with a certain shape and pattern and by implementing processes that can detect those shapes and pattern in a nest using the camera and comparison to the reference data. The reference data can also be created for other visual markers that are based on other characters, values, numbers, structures, or a combination thereof. When perforations are used as visual markers on the bottom surface, the algorithms, for example, can discern the perforations because of their color in the image (e.g., shown as black circles because perforations are through holes) and the algorithms can include processes that can detect that color.

If there are items in the drawer or nests, the items in the image can be ignored by the system 130 in the configuration determination. Upon recording an image, the storage device can automatically detect the configuration from the image and save the information in the database.

Figure 6B:
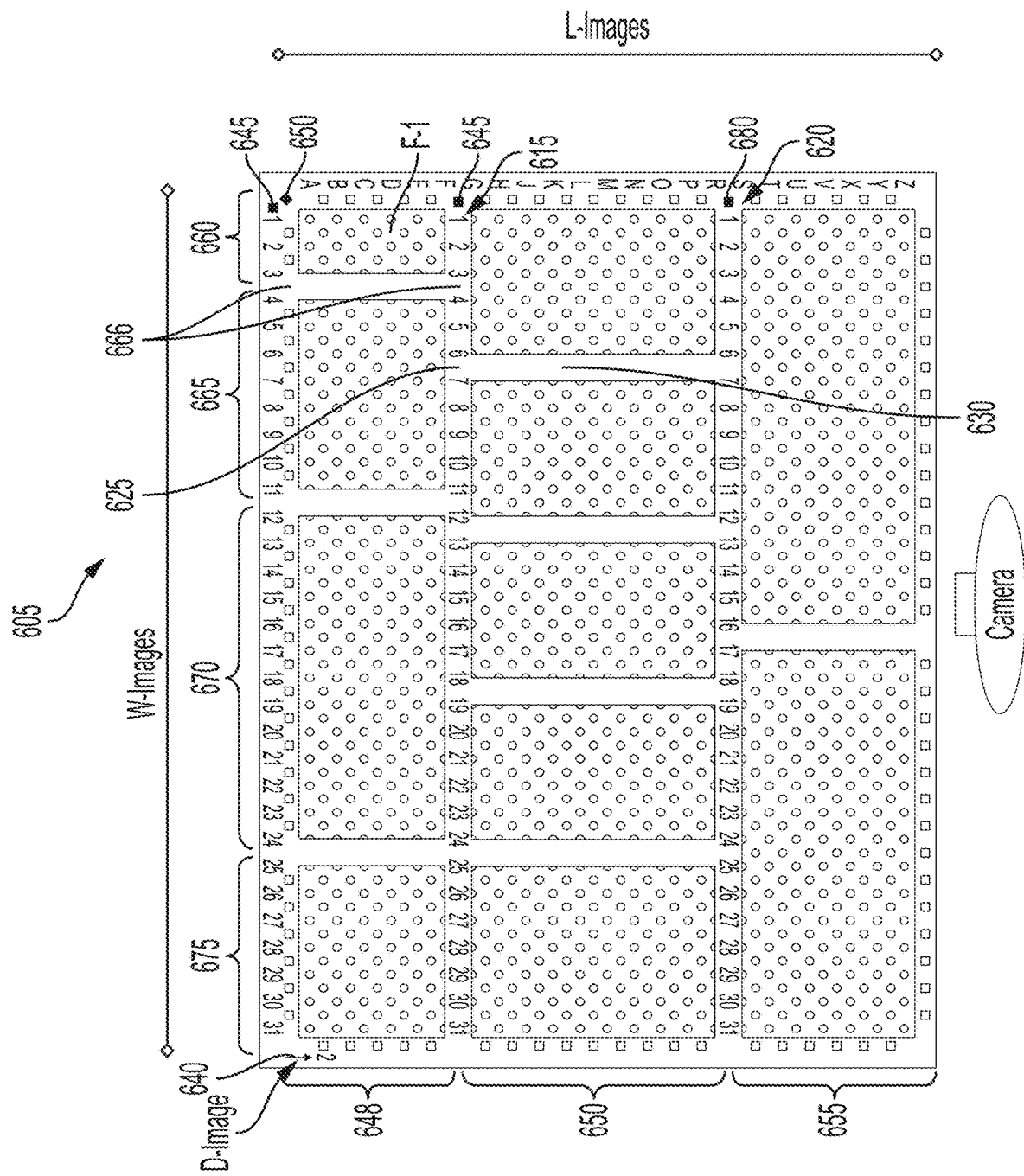

In some embodiments, the processor and memory are programmed with algorithms that can determine a divider configuration by using a frame 605 and size tables 610 shown in FIG. 6. The size tables 610 include a height or depth table 612, a length table 613, and a width table 614 and are stored in the database. A frame can be an image recorded by the camera or a frame extracted from a video by the camera. The drawer may include a first mechanism (e.g., FIG. 6, 640) identifiable by the imaging and spatial determination system (through a camera to the processor and memory) and configured to initiate a depth image-finding process after the first mechanism is identified by the imaging and spatial determination system. The drawer may include a second mechanism (e.g., FIG. 6, 650) identifiable by the imaging and spatial determination system and configured to initiate a length image-finding process and a width image finding process after the second mechanism is identified by the imaging and spatial determination system. The drawer may include a third mechanism (e.g., FIG. 6, 645) identifiable by the imaging and spatial determination system and configured to determine when the length image-finding process should terminate and to guide the width image-finding process. The mechanism can be a shape, color, structure, or other form (or a combination thereof) that is identifiable by the imaging and spatial determination system.

The first, second, and third mechanism are different (e.g., in shape, color, or structure) so that each mechanism can initiate a different or the corresponding image determination process (i.e., depth imaging-finding process, length image-finding process, or width image-finding process). The mechanisms are located on the edge or perimeter of the drawer. Other locations are also contemplated. The drawer may include one or more rows 615, 620 of indentations, notches, other structures 625 configured to receive or engage with dividers 630. The perimeter of the drawer may be similarly configured to receive or engage with dividers. Dividers can be installed in and removed from the drawer by hand without using a tool. The perimeter of the drawer (the top view shown in FIG. 6), the depth or height of the drawer, and structure forming the rows 615, 620 may be labeled with tags or indicators, such as numbers, values, and alphabets. The algorithms through the camera can recognize the tags (seeing the tags as images such as seeing the tag or letter "A" as an image of A) and use the tags and size tables 610 to determine the size of nests (e.g., depth, length, and width of nests).

Figure 7:
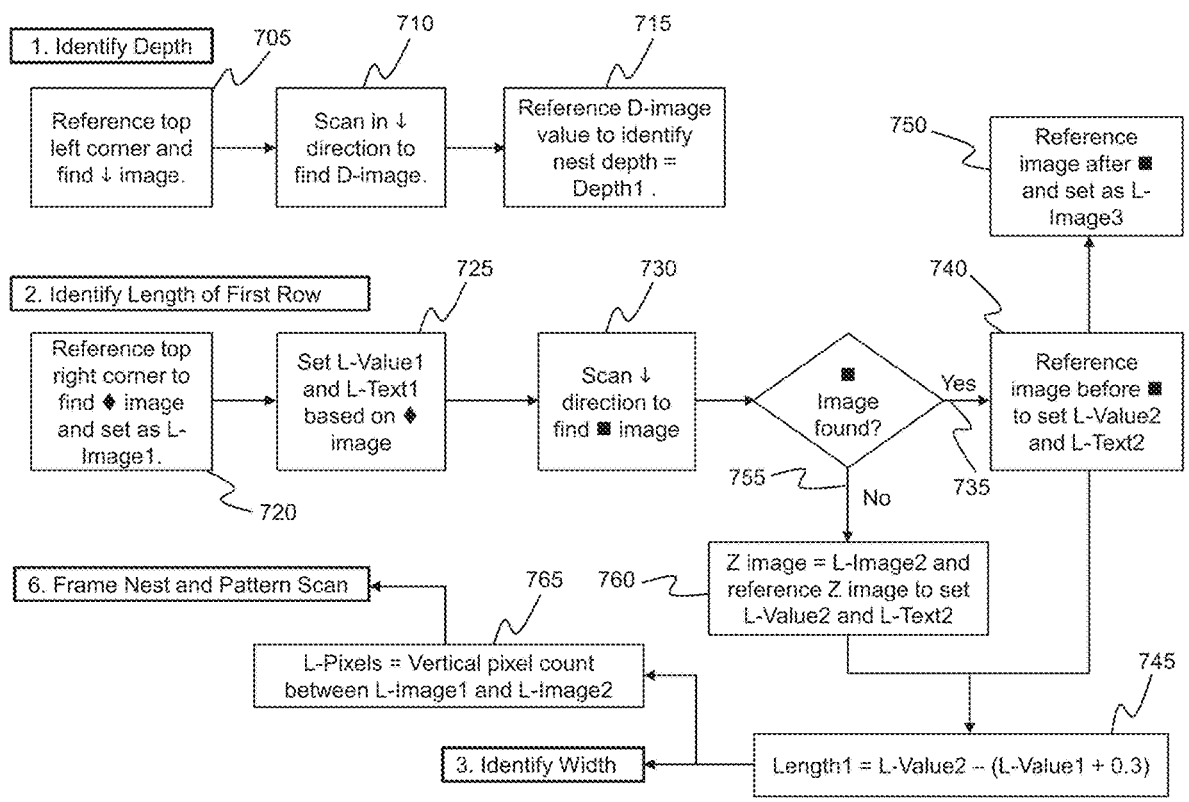
FIG. 7 depicts an illustrative method for determining a length of the nests in one row in accordance with some embodiments of the present invention.

In one embodiment, the first mechanism 640 is the form of an arrow or down arrow and is positioned at a first corner or the top left corner of the drawer's perimeter. The divider configuration determination method may start with the imaging and spatial determination system detecting the arrow or the arrow image (FIG. 7, step 705). Upon detection, the system scans in a downward direction (e.g., into the drawer) to find a depth image (step 710). The depth image may be an image containing or an image of a depth value labeled on the drawer. The depth value in the depth image is the value labeled closest to the bottom surface of the drawer. Using the depth value in the depth image and the depth table 612, the system can determine the depth of the drawer (step 715). For example, the system may find that the depth value is "3," discover that the depth value "3" is associated with a distance measurement of 3 inches, and determine that the drawer is 3-inch deep. The determined depth may also be the depth of the nests. All the nests in the same row may have the same depth.

In the depth table 612 (and tables 613 and 614), the values (or alphabets) under the image column are the values (or alphabets) seen by the camera, the values (or alphabets) under the text column are the inversed values (or inversed alphabets) of the values (or alphabets) seen by the camera, and the numbers under the value column are the distance measurement associated with each value (or alphabet) in the image column (or the text column). The tables 610 correspond the tags used on the perimeter of the drawer (the top view shown in FIG. 6), the depth of the drawer, and structure forming the rows 615, 620 and are used as distance lookup tables.

After determining the depth of the drawer or the nests, the system then proceeds to determine the length 648 of nests (FIG. 7). In one embodiment, the second mechanism 650 is the form of a diamond and is positioned at a second corner or the top right corner of the drawer's perimeter. The second corner may be a corner different from the first corner. The imaging and spatial determination system detects the diamond or the diamond image and discovers that the diamond is associated with a distance measurement of 0.5 inches (step 725) using the length table 613. The system then scans in a vertical direction (or y-axis) of the drawer perimeter in the frame to find a third mechanism 645 such as a square or square image (step 730). If the third mechanism 645 is found (step 735), the system then finds a length image immediately before the third mechanism 645 (step 740). The length image may be an image containing a length value labeled on the drawer (step 710). For example, the length value immediately before the third mechanism 645 is "F." Using the length value "F" and the length table 613, the system can determine that "F" is associated with a distance measurement of 4.6 inches (step 740). The system then calculates the difference or distance between "F" (4.6 inches) and the diamond (0.5 inches) to determine the length of the nests (step 745). All the nests in the same row 648 have the same length.

Figure 9:
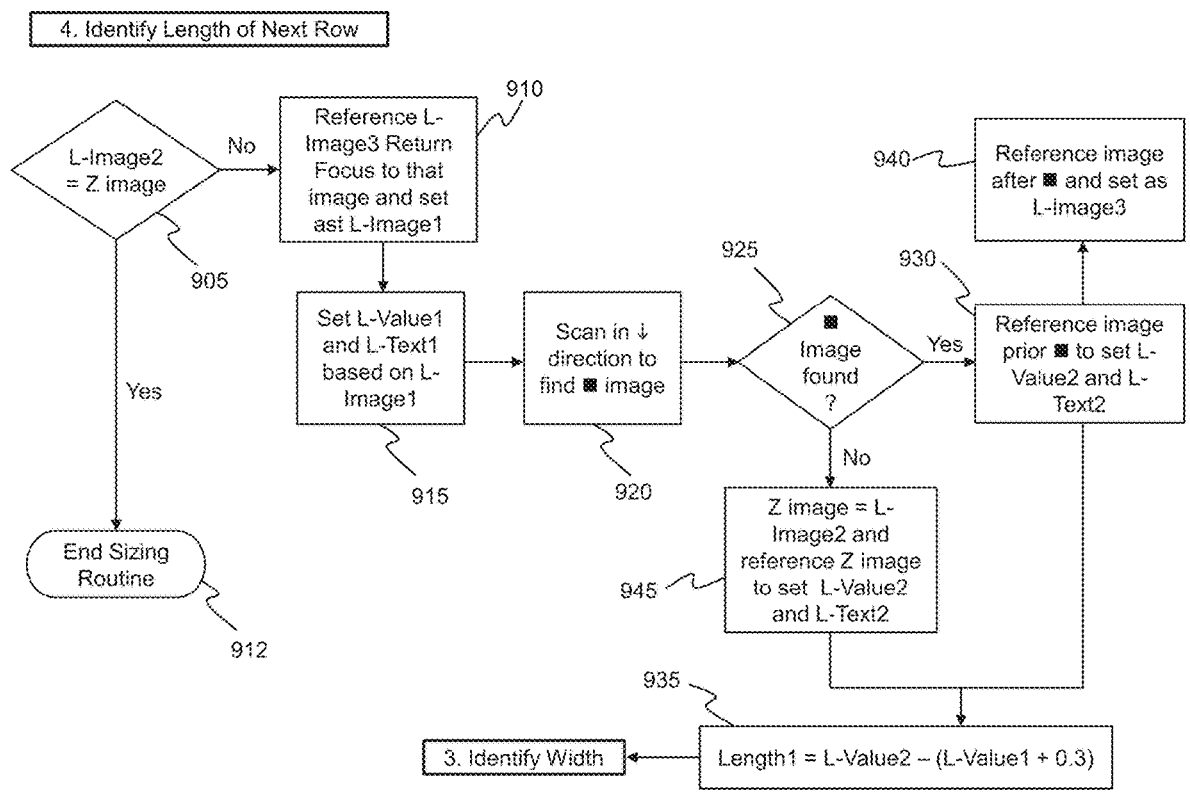
FIG. 9 depicts an illustrative method for determining a length of the nests in the next row in accordance with some embodiments of the present invention.

The length image immediately after the third mechanism 645 (e.g., "G") is saved by the system (step 750) and the system can later return to that location to determine the length of the next row (FIG. 9, step 910).

After the length is determined in step 745, whether the length value is "F" or "Z," the system counts the number of pixels in the determined length and the obtained number of pixels is then used in determining the boundary of the perforation pattern (step 765). The boundary determination method is described in FIG. 10 which is explained below.

The length determination may continue until all the lengths 650, 655 of all the nests are determined or until the length determination reaches the end of the vertical edge or the y-axis of the drawer perimeter in the frame.

If the system does not find the third mechanism 645 or any other mechanism in the vertical direction (step 755), then the system looks for the last length image (e.g., "Z") in the vertical direction (step 760). Using the length value "Z" and the length table 613, the system can determine that "Z" is associated with a distance measurement of 17.7 inches (step 760). The system then calculates the difference or distance between "Z" (17.7 inches) and the diamond (0.5 inches) to determine the length of the nests (step 745).

The system can determine a width of nests after all the lengths 650, 655 of all the nests are determined, or after the length 648 of nests is determined but before the next length 650 of nests is determined.

Figure 8:
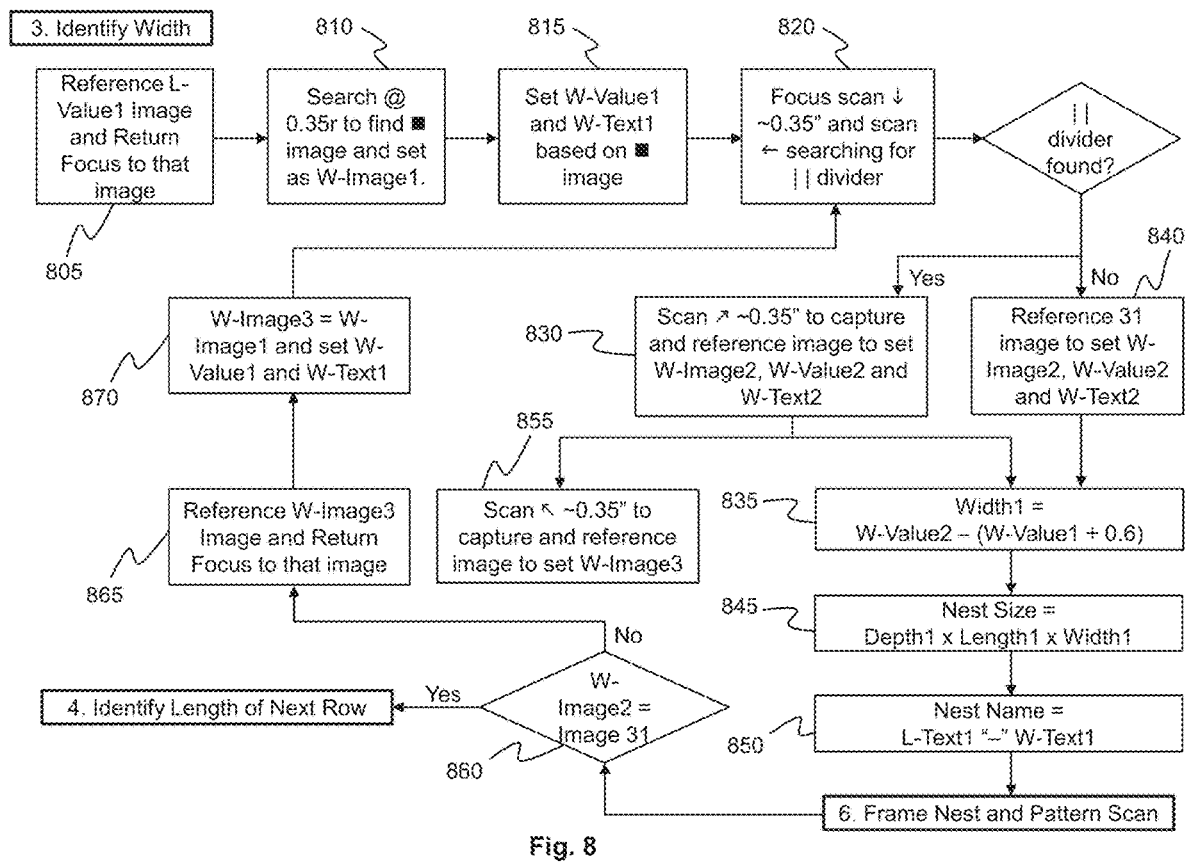
FIG. 8 depicts an illustrative method for determining a width of the nests in the same row in accordance with some embodiments of the present invention.

For example, after determining the length 648 of nests but before determining the next length 650 of nests, the system can determine the width 660 of nests, e.g., the width of the nests in the same row that already have had their length determined (FIG. 8). After determining the length 648, the system is configured to detect the second mechanism 650 again (step 805). The system then scans in a horizontal direction (or x-axis) of the drawer perimeter in the frame to find a third mechanism 645 such as a square or square image (step 810). Upon finding the third mechanism 645, the system determines that the square is associated with a distance measurement of 0.6 inches (step 815) using the width table 614. The system then scans further in the same direction and checks if a divider is found (step 820). For example, the system may check whether a protrusion is in the notch for receiving a divider. In some embodiments, that portion of the divider in the notch include a mechanism similar to the first, second, and third mechanisms allowing it to be recognized by the system. If a divider 666 is found, the system then finds a width image immediately before the divider 666 (step 830). The width image may be an image containing a width value labeled on the drawer. For example, the width value immediately before the divider is "3." Using the width value "3" and the width table 614, the system can determine that "3" is associated with a distance measurement of 2.2 inches. The system then calculates the difference or distance between "3" (2.2 inches) and the square (0.6 inches) to determine the width of the nests (step 835).

The width image immediately after the divider 666 (e.g., "4") is saved by the system (step 855) and the system can later return to that location to determine the width of the next nest in the same row (FIG. 9, step 910).

The width determination may continue until all the widths 665, 670, 675 of all the nests in the same row are determined or until the width determination reaches the end (e.g., image "31") of the horizontal edge (or the x-axis) of the drawer perimeter in the frame. This is shown through steps 860, 865, 870.

If the system does not find a divider, then the system looks for the last width image (e.g., "31") in the horizontal direction (step 840). Using the width value "31" and the width table 614, the system can determine that "31" is associated with a distance measurement of 23.2 inches (step 840). The system then calculates the difference or distance between "31" (23.2 inches) and the square (0.6 inches) to determine the width of the nests (step 835).

After determining the depth, length, and width of the nest (e.g., nest F-1 in FIG. 6), the nest size or area can determined (step 845). The nest name can also be determined by using the length value and the width value. For example, the nest name can have a format based on "'length value'–'width value'" (e.g., nest F-1 in FIG. 6). The length value and the width value seen by the camera can be reversed by the system before being used in the nest name since the value seen by the camera may be upside down. The nest name can also be based on other formats.

Although FIG. 8 shows that the nest boundary determination step (Frame Nest and Pattern Scan) can be performed as the nest size and nest name for a nest are determined (before step 860), the nest boundary determination step for each nest can also occur after all the nest sizes and nest names for all the nests are determined (after step 860). Likewise, although FIG. 8 shows that the step of determining the length of next row (Identify Length of Next Row) happens after all the widths for all the nests in the same row are determined, that step can also perform as the width is determined, instead of waiting until all the widths are obtained.

After determining the widths of the nests in one row, the system then proceeds to determine the length of the nests in the next row 650 (FIG. 9). The system stores the location information of the length value "G" from step 750 in FIG. 7 in the database, and is directed to scan from that location using the location information (step 910). The system starts from step 910 because the length value "G" is not the length value "Z" (step 905), which indicates the end of the vertical edge of the drawer. If the system finds the length value to be "Z" from steps 755 and 760 in FIG. 7, then the system does not proceed to determine the length of the nests in the next row because "Z" represents the end of the vertical edge of the drawer and there is no other row for which the length can be determined. As such, the system ends the length determination process at step 912.

The length value "G" is associated with a distance measurement of 5.3 inches and is used as the base for calculating the length of the nests in the next row (step 915). The system scans in the vertical direction (or y-axis) away from the second mechanism 650 (step 920). The system then checks if another third mechanism 680 is found (step 925). If the answer is yes, the system finds a length image immediately before that third mechanism 680 (step 930). The length image may be an image containing a length value labeled on the drawer. For example, the length value immediately before the third mechanism 680 is "R." Using the length value "R" and the length table 613, the system can determine that "R" is associated with a distance measurement of 12.1 inches. The system then calculates the difference or distance between "R" (12.1 inches) and the length image after the previous third mechanism 645 "G" (5.3 inches) to determine the length of the nests in the next row 650 (step 935). All the nests in the same row 650 have the same length. The system then proceeds to determine the width of the nests in that row 650 using the process described with respect to FIG. 8 (Identify Width). The system returns to the location of the third mechanism 645 and is directed to scan from that location using the location information in the horizontal direction (or x-axis).

The length value immediately after the third mechanism 680 is (e.g., "S") is saved by the system 940 and the system can later return to that location to determine the length of the subsequent row 655. If the system does not find the third mechanism 680 or any other mechanism in the vertical direction, then the system looks for the last length image (e.g., "Z") in the vertical direction (step 945). Using the length value "Z" and the length table 613, the system can determine that "Z" is associated with a distance measurement of 17.7 inches (step 945). The system then calculates the difference or distance between "Z" (17.7 inches) and "S" (0.5 inches) to determine the length of the nests in row 650 (step 935).

The length and width determination processes continue until all the lengths and widths of all the nests are calculated. In the above disclosure, the identifying step, detecting step, the scanning step, the finding step, and other relevant steps involve using the camera to see the image, mechanism, and tag. All the determined lengths and width, location information of all the mechanisms, and the divider configuration are saved in the database.

Figure 10:
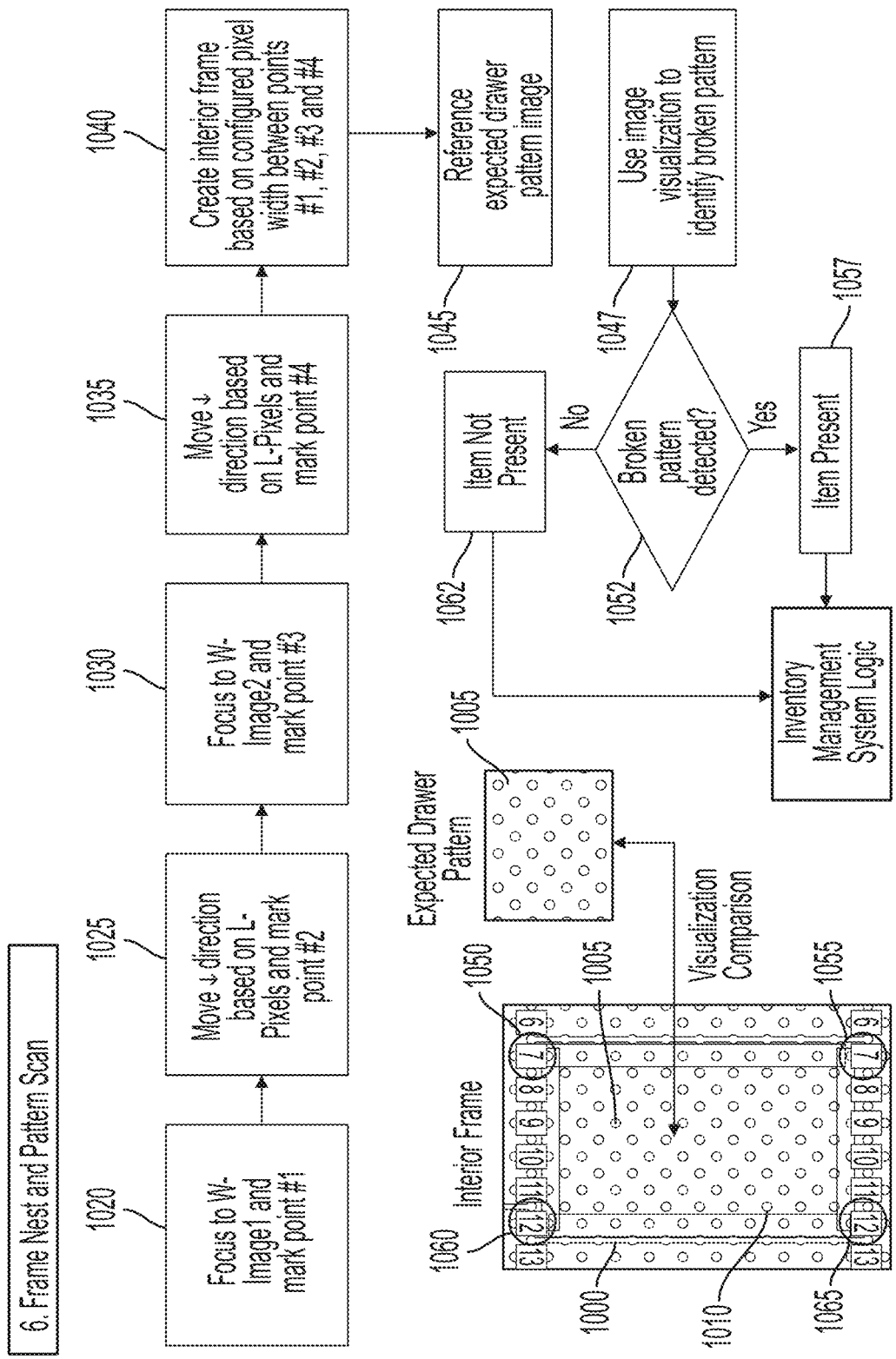
FIG. 10 depicts an illustrative method for detecting and determining a perforation pattern of a nest in accordance with some embodiments of the present invention.

After determining all the lengths and widths, the system proceeds to determine a perforation pattern for each nest (FIG. 10). Although FIG. 10 illustrates a method for determining a perforation pattern, the illustrated method can also be applied to determine a pattern based on other visual markers. In some embodiments, the system may determine the perforation pattern of a nest as it completes the determination of the length and width of that nest, instead of waiting until all the lengths and widths of all the nests are calculated. Using the saved location information of the mechanisms and the notches that have a divider (e.g., reference points from which the length and width of each nest are calculated), the system can define the area or boundary 1000 of the perforation pattern 1005 to be determined. For example, using the location information, the system can find the location of a width image or value 1050 (or length image or value) from which the width (or length) of the nest is determined (step 1020). Using that image or value 1050 (first point), the system moves in the vertical direction (or y-axis) according to the number of pixels calculated in step 765 in FIG. 7 and marks the destination after the movement as point 2 (step 1025). In some embodiments, the system may move in the vertical direction until it finds the next width image or value 1055 in the same direction (or next length image or value). This movement reveals one side of the boundary. The system then finds the location (point 3) of another width image or value 1060 (or length image or value) from the saved location information and moves in the vertical direction according to the number of pixels calculated in step 765 in FIG. 7 and marks the destination after the movement as point 4 (step 1035). In some embodiments, the system may move in the vertical direction until it finds the next width image or value 1065 (or next length image or value) in the same direction (steps 1030 and 1035). This movement reveals another side of the boundary. The other two sides of the boundary can be similarly found by using the image 1050 and the image 1060, and the image 1055 and the image 1065. After figuring out the four sides or four points, the boundary 1000 of the perforation pattern 1005 is determined (step 1040).

The size of the determined boundary 1000 can be reduced (e.g., by 10%) or adjusted since the camera viewing from the top is operating at an angle and/or at a different height (e.g., a drawer close to the camera vs. a drawer that is further from the camera) and thus may not be able to see the entire determined boundary. The perforation pattern 1010 in the adjusted boundary 1010 is then imaged by the camera and saved in the database. The perforation pattern 1010 is used as the default pattern that indicates that the nest is empty (step 1045). The perforation pattern refers to a pattern or arrangement formed by the perforations on the bottom surface of the net. The number of perforations in the pattern are also considered. This default perforation pattern is compared to the actual perforation pattern in the nest when the storage device is in use (step 1047). When the system detects a difference between the two perforation patterns or that the actual perforation pattern is broken based on the default perforation pattern (e.g., the actual perforation pattern is different or smaller because an item is blocking a portion of the perforation pattern), the system notifies the user through the user interface that there is an item present in the nest of the broken perforation (steps 1052 and 1057). A broken pattern may also be described as a lack of continuity in the actual perforation pattern or detected perforation pattern. If there is no item and the two perforation patterns match, the system notifies the user otherwise (step 1062). The actual perforation pattern may be obtained by the system through the camera when a user opens the drawer and before the user accesses the drawer, or after the user accesses the drawer and before the user closes the drawer, or both. The pattern may be a repeating pattern of perforations on the bottom surface such as the one represented in FIG. 10, 1005. For example, perforation may repeat every 2 cm laterally and 2 cm up/down. Other intervals are also contemplated. A broken pattern or a lack of continuity may be detected because one or more perforations are missing from the image of the actual perforation pattern, one or more perforations expected in a path are not seen from the image of the actual perforation pattern, or one or more perforations are partially covered in the image of the actual perforation pattern (e.g., an item partially covers four adjacent perforations without completely covering each perforation).

The default perforation pattern and the actual perforation pattern may be used to determine whether a nest needs attention, such as the inventory in the nest is low or empty and needs to be restocked. For example, when a nest is full, the system may detect, from imaging the drawer, that the actual perforation pattern is completely covered, is close to completely covered, or a threshold area is covered by items. Since no perforation pattern or little perforation pattern is seen, the system may determine that the nest is full. However, when the nest is low in supplies or empty, the actual perforation pattern may show a large amount of pattern or a complete pattern. When the amount of pattern shown is greater than a threshold amount determined by the system, the system may notify the user and request the user to perform some actions through the user interface.

By using a camera to sense if the completely uncovered pattern is broken (e.g., partially or completely covered), the storage device knows if a nest needs to be restocked. The storage device can also use the camera to detect if the user is restocking the right nest. For example, a nest to be restocked should have a broken pattern after an item is placed into the empty nest. If the storage device camera does not see a broken pattern in the nest from the camera after the user inserts the item, then the storage device informs the user that he is not accessing the right nest. The storage device also uses another camera to monitor a user movement and determine if the user is accessing the correct nest.

When a drawer is reconfigured based on the earlier discussion, the perforation patterns in the drawer can be updated and saved in the database (using the camera, such as when the nest are being stocked). The new perforation patterns of the newly configured drawer or nests are imaged and saved to replace the old perforation pattern images.

In some embodiments, the system is configured to only determine whether the pattern is broken (produce a binary output).

In some embodiments, imaging the perforation patterns to obtain the default perforation patterns before the first use of the storage device may not be necessary. The system may have all the possible divider configurations and their perforation patterns pre-stored in the database, and the actual divider configurations and perforation patterns may be compared with the pre-stored divider configurations and perforation patterns. The boundary of each nest in the actual divider configuration can be identified and the actual perforation pattern in each nest can be determined by the method illustrated in FIG. 10. The system can similarly detect whether a broken pattern or lack of continuity exists. If desired, the perforation patterns and/or nest areas may be automatically determined and stored indirectly such as by automatically detecting the configuration of the nests using a camera.

Figure 11:
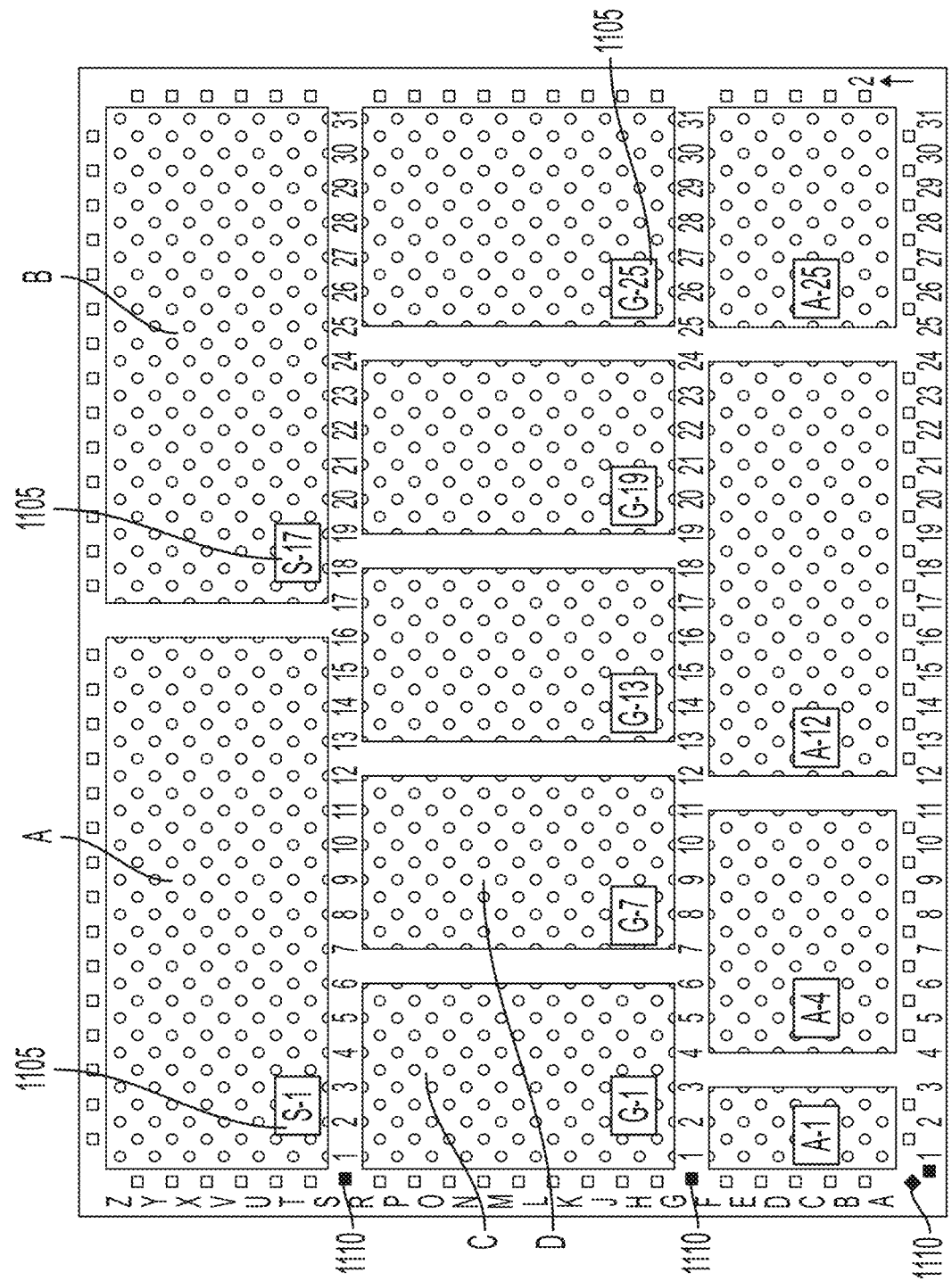
FIG. 11 depicts illustrative nests in a drawer identified by nest identifiers in accordance with some embodiments of the present invention.

FIG. 11 shows illustrative nests in a drawer identified by nest identifiers 1105. The system may determine an identifier for a nest by using one or more of the images or values shown in FIG. 10 and the image or value associated with the mechanism 1110. For example, the system may determine that the identifier for nest A is "S-1," that the identifier for nest B is "S-17," that the identifier for nest C is "G-1," and that the identifier for nest D is "G-7," and so forth. Nest identifier is determined based on where the dividers are placed and the system can automatically determine the corresponding nest identifiers when the drawer is reconfigured. The default perforation pattern and the actual perforation pattern for each nest are linked to the corresponding nest identifier so that the nest identifier can be used to communicate which nest requires attention. The link also helps the system to determine that it is this nest's default perforation pattern and actual perforation pattern should be compared, not this nest's default perforation pattern and another nest's actual perforation pattern. All these information (e.g., nest identifiers and link information) is saved in the database.

Once the divider configuration has been determined, the name or type of the item to be stored in each nest can be determined by the system. The system can include remote computer that can be used for specifying the items to be stocked in the storage device. The user interface 120 can be used to specify the individual item to be stocked in each nest and may also be used to link and identify product availability in related connected storage devices and direct the user to another storage device. The system can include a notification to the storage device of the delivery of items to the customer and the storage device, system, or user interface can automatically, manually, or in combination determine the nest for stocking received item(s) in the storage device or other connected storage devices. The name or type of the item to be stored in each nest is saved in the database. The name or type of the item and the nest identifier can be used by the system to notify the user about what items should be added into a nest when the nest is low on supplies or empty, and the nest that should receive the items.

Items can be placed into the nests after the divider configuration is determined. The system then may record an image of the drawer including the items (or images of nests) before the storage device closes the drawer. The system may record an image every time the drawer is open to keep track changes in images or perforation patterns. The recorded image may be compared with the image including the default perforation pattern and/or the image recorded from a previous access. The system can determine whether action is required for one or more nests based on the comparison.

The imaging and spatial determination system may also include a second camera. The second camera is preferably an infrared camera which is a device that detects infrared energy (heat) and converts it into an electronic signal, which is then processed to produce a thermal image on a display. The first camera or the camera that has been discussed in the above disclosure can be a color camera, still image camera, or video camera that is configured to capture the real color in the view of the camera and display the captured real color on the resulting image or video (e.g., green in the view is captured and displayed as green in the resulting image or video). The first camera produces images or videos by primarily capturing the visible spectrum of light, as opposed to infrared energy.

The first camera is configured to record images or videos of the drawer (showing actual divider configurations, perforation patterns, and/or visual markers) as the user opens and/or closes the drawer. For example, the first camera can record the images or videos as soon as the user opens the drawer, after the user accesses drawer (e.g., after placing or removing an item or after reconfiguring the drawer), and/or before the user closes the drawer. The user's movement with respect to the drawer may also be recorded. The recorded images or videos are provided to the imaging and spatial determination system, and the system uses the received image or videos to perform operations and determinations discussed in this application.

The second camera is configured to detect if anything is near the drawer and the storage device will open the drawer only if there is nothing near the drawer or if something is around the drawer but far enough from the drawer. For example, the second camera may detect that the user's hand is too close to a drawer to be opened and the storage device may not open the drawer after the user selects that drawer to be ejected from the user interface. The second camera may communicate with a system that controls the opening and closing of the drawers. The imaging and spatial determination system may include a system that controls the opening and closing of the drawers and the second camera may be configured to communicate with the imaging and spatial determination system. The second camera may also be configured to detect the location of the user's hand or appendage in relation to the nest to be dispensed or restocked after the drawer is open. In some embodiments, the first camera may also be configured to perform functionalities of the second camera such that the cabinet may only need one camera (described below).

Both cameras can be configured to zoom in and zoom out (e.g., using a lens or software scaling) and adjust viewing angle depending which drawer is open. For the drawer closest to the camera (e.g., the top drawer), the camera may zoom out and/or change viewing angle by tilting the lens farther away from the storage device. For the drawer farthest to the camera (e.g., the bottom drawer), the drawer may zoom in and/or change the viewing angle by tilting the lens closer to the storage device. If the storage device includes multiple stacks of drawers, the camera can also tilt left or right. Camera motors that enable such movements can be included. The camera motors can be installed on the cameras, imaging and spatial determination system, or other locations in the storage device that connect the cameras and the imaging and spatial determination system (and the user interface if necessary). The cameras and the camera motors can operate under the control of the imaging and spatial determination system (and the user interface if necessary) such as based on the determination that a drawer or a nest in a drawer requires action and directing the cameras and the camera motors to focus on that drawer or a nest in that drawer. In some embodiments, the camera is fixed to the cabinet or imaging and spatial determination system (e.g., no tilting and/or height adjustment ability) and is configured to record images of the drawers from the same fixed location.

Figure 12:
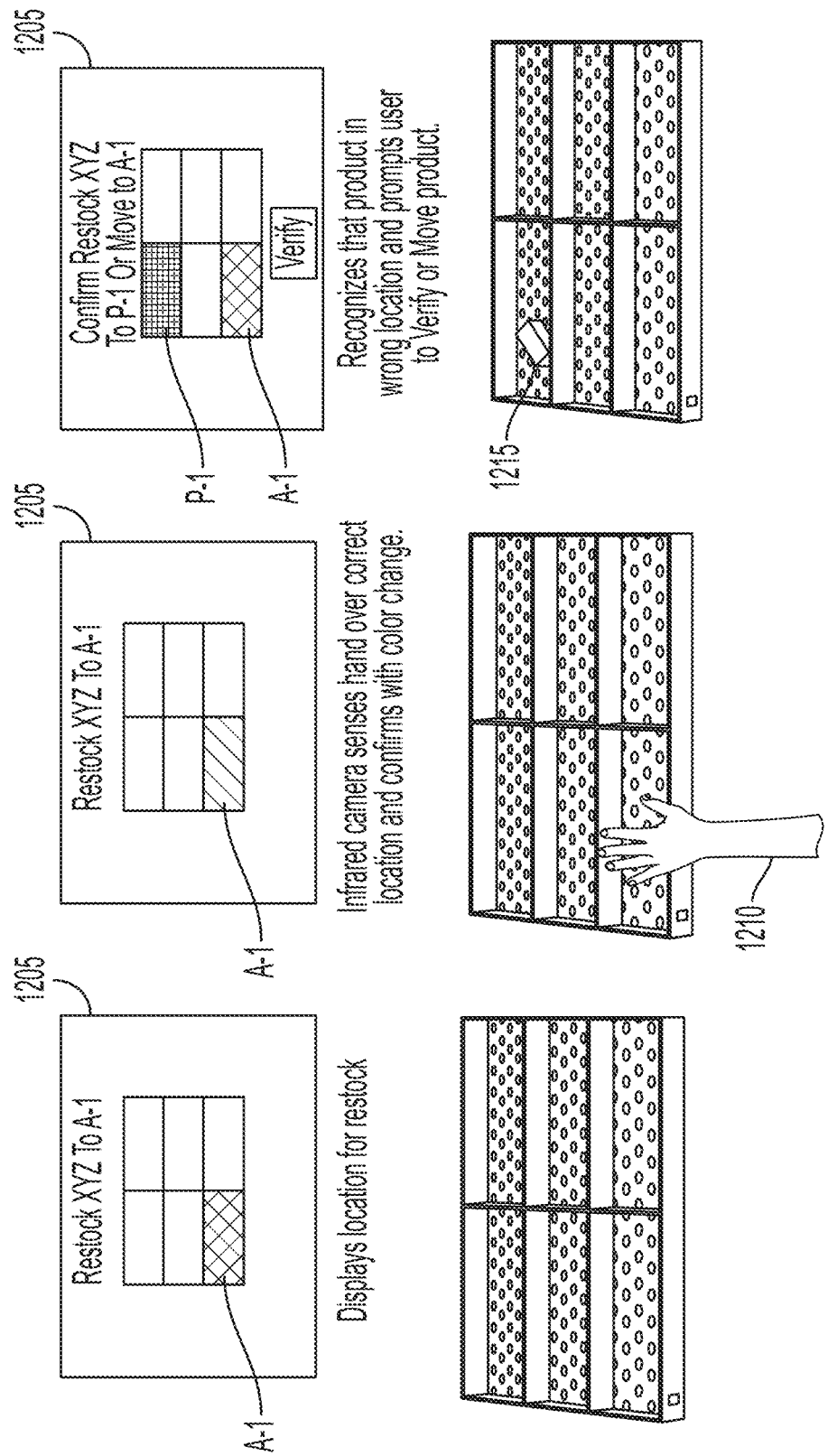
FIG. 12 depicts an illustrative method for stocking nests in accordance with some embodiments of the present invention.

If the imaging and spatial determination system determines that the actual perforation pattern of a nest is greater than the threshold pattern (e.g., the actual perforation pattern shows that 75% of the perforation pattern is uncovered and the threshold pattern is 50% of uncovered perforation), the system can notify the user that the nest needs to be restocked. The system can notify the user by presenting the corresponding nest identifier or displaying the nest for restock on the touch screen. The system can also notify the user the name or type of the item that should go into the nest. For example, as shown in FIG. 12, the system may determine that nest A-1 requires action and notify the user to restock that nest with items associated with that nest (e.g., item XYZ) on the touch screen 1205. Through the infrared camera, the system can determine whether the user is accessing one of the nests and whether the user's hand 1210 is over the correct location. For example, the infrared camera records a thermal frame (which can be a thermal image or a thermal frame from a thermal video recorded by the infrared camera). A thermal frame is a frame generated based on infrared energy (heat) detected in the view of the infrared camera. The system can monitor the user's movement by using the infrared camera to record one or more thermal frames (e.g., by recording a thermal image periodically such as every 1 second or by recording a thermal video). If the hand location in one thermal frame is different from the hand location in the next thermal frame, the system knows that the user's hand is still moving and the user's hand has not yet reached to the desired location. When the hand location in one thermal frame is the same as the hand location in the next thermal frame, and subsequent thermal frames also show the same hand location (because inserting or removing item from a nest requires placing the hand in that location for a short period of time such as between 1-3 seconds), the system knows that the user is accessing one of the nests. The system then records a thermal frame in that duration (e.g., 1-3 seconds). The system compares the recorded thermal frame (with the user's hand or hand location in the frame) with the image of the drawer or divider configuration and determine whether the user's hand 1210 is over the correct nest. The size of the thermal frame or the image of the drawer configuration can be adjusted or scaled before comparison so that the size of the thermal frame and the size of the drawer configuration image match and the hand's exact location on the drawer (or drawer configuration image) can be determined. If the system determines that the user's hand 1210 is over the correct location, the system then notifies the user accordingly such as by changing the color of the nest A-1 on the touch screen 1205 to a different color or through audio.

Instead of determining the user's hand, the system can also determine if an item is placed in the correct location using the infrared camera. The determination is similar to the method described above. Instead of recording a thermal frame with the user's hand, the system records a thermal frame with the placed item 1215. If the system determines that the item 1215 is placed into the correct location, the system then notifies the user accordingly.

If the system determines that the user's hand 1210 or the item 1215 is in a location P-1 different from the location A-1 that requires action, the system can also notify the user accordingly. For example, the system can determine the nest P-1 over which the user's hand 1210 or the item 1215 is placed and indicate that nest P-1 to the user. The system may indicate that nest P-1 to the user by using a nest identifier ("P-1" is a nest identifier) or marking that nest P-1 on the touch screen. The system then prompts the user to move his hand or the item to the nest A-1 that requires action or to confirm that the nest P-1 is indeed the nest he wishes to restock. When system detects that the user's hand is removed from the drawer and has verified the placement (either in nest A-1 or P-1), the storage device can automatically close the drawer.

If desired, one or more video cameras can be employed to perform this function without using an infrared camera.

When the system detects that a stocking error has occurred by a user (based on hand position and/or movement and/or the described imaging analysis algorithm), the system can store information about the error and generate a notification indicating the error on the user interface or send a notification indicating the error to a remote computer such as an administrator's client device or customer's client device.

Figure 13:
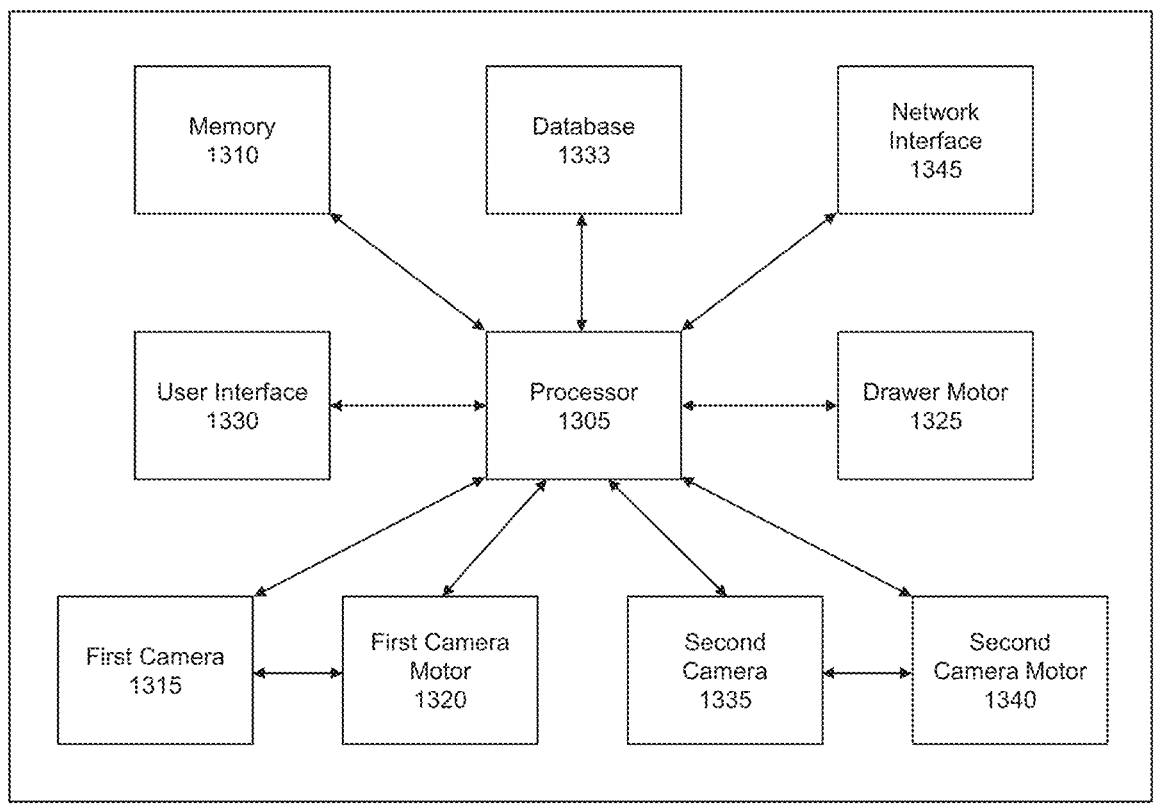
FIG. 13 depicts an illustrative imaging and spatial determination system in accordance with some embodiments of the present invention.

FIG. 13 illustrates one embodiment of the imaging and spatial determination system 1300. The system 1300 includes a processor 1305, memory 1310 configured to store computer executable instructions, such as the algorithms described above, a first camera 1315, a camera motor 1320 configured to control the movement of the first camera 1315, a drawer motor 1325 configured to control one or more drawers in the storage device, a user interface 1330 configured to allow users interacting with the system 1300 or the storage device, and a database 1333. The system 1300 may further include a second camera 1335 and a second camera motor 1340 configured to control the movement of the second camera 1335. The system 1300 may include additional cameras (e.g., the total number of cameras is three or more) and the associated motors, or may have only either the first camera 1315 or the second camera 1335 and its associated motor. Memory 1310, the first camera 1315, the camera motor 1320, the drawer motor 1325, the user interface 1330, the second camera 1335, and the second camera motor 1340 are communicatively coupled to the processor 1305 and operate under the instructions of the processor 1305. The first camera 1315 (or camera 1335) and the first camera motor 1320 (or camera motor 1340) are also communicatively coupled. The first camera 1315 is preferably a visible light camera that primarily uses visible light to form an image (or frame in a video) whereas the second camera 1335 is preferably infrared thermal imaging camera that primarily uses infrared radiation to form a thermal image (or thermal frame in a video). The visible camera, for example, can be a color camera (or color video camera) or a monochrome camera (or monochrome video camera). The thermal imaging camera, for example, can be an infrared camera or a night vision camera. The storage device may be a cabinet that has the first and second cameras 1313, 1335 mounted on it. The database 1333 is configured to store divider configuration information (e.g., all the possible divider configurations that a drawer can have), drawer information (e.g., the total number of drawers in the storage device, an identification number or code for identifying each of the drawers, and the associated divider configuration set by the user or determined by the imaging and spatial determination system), imaging information (e.g., recorded images, nest patterns, and nest perforation patterns), video information (e.g., recorded videos), nest identifiers, size tables, inventory information, and other related information used and saved by the system 1300.

The system 1300 (or the storage device) may also include a network interface 1345. The network interface 1345 is configured to exchange data with an access point, a server, another computer system, or other connected storage devices via a communications network. The network interface 1345 is operative to interface with a communications network using any suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, VOIP, or any other suitable protocol. The network interface 130 can include an Ethernet adapter (for wired connection), a wireless network adapter, a Bluetooth adapter, or other similar types of adapters.

An imaging and spatial determination system including one or more of the components shown in FIG. 13 is also contemplated.

Memory can be tangible or intangible memory which can be used to carry or store desired program codes in the form of computer-executable instructions or data structures. Tangible memory, for example, may include random access memory, read only memory, magnetic disk storage media, optical storage media, flash memory devices, and other tangible and non-transitory storage devices. Intangible memory, for example, may include storages implemented by software.

Database can also be tangible or intangible databases which can be used to carry or store storage device data, administrator and user data, or other high level data generated as a result of executing the computer instructions in the memory (other than computer instructions themselves). Tangible database, for example, may include a hard-drive, solid state drive, flash memory, permanent memory such as ROM, magnetic, optical, semiconductor, or any other suitable type of storage component. Intangible database, for example, may include storages implemented by software.

The storage device may include mechanical components (e.g., sliding mechanisms) controlled by the drawer motor 1325 to open and close the drawers.

The imaging and spatial determination system 1300 may be implemented as one single system. Each component in the system 1300 may also be a separate, independent device and the components are connected together (e.g., through wireless connection) to form the system 1300. Different combinations are also contemplated such that components can be removed or added in a broadening or narrowing way.

Features and functionalities of the storage device or the imaging and spatial determination system can be performed without relying on any light source pointing device. The device or system, however, can also employ light source pointing (and light source pointing motors) to implement additional features if necessary. The light source pointer may be a laser device that produces a laser beam.

Figure 14:
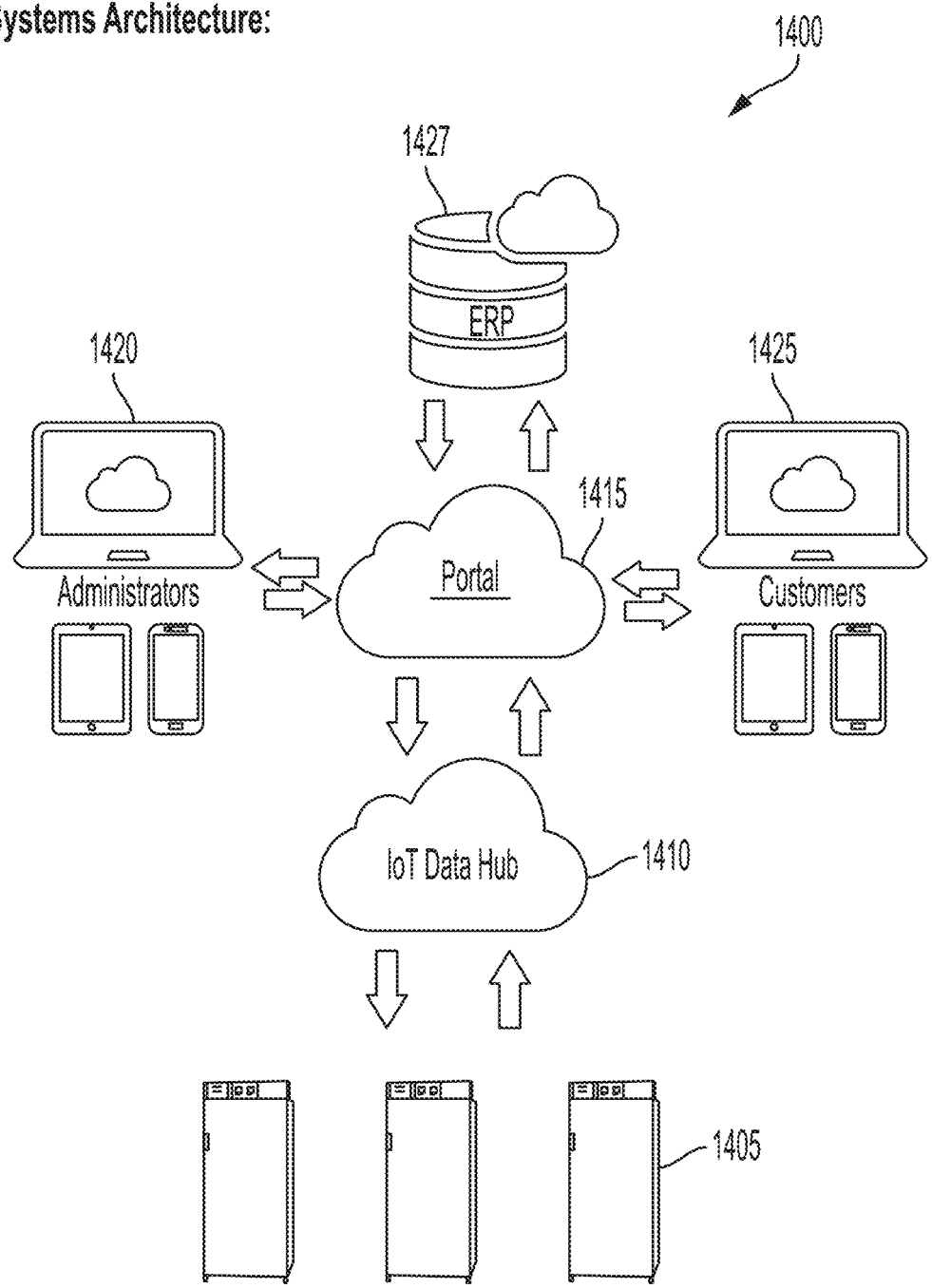
FIG. 14 depicts an illustrative system architecture in accordance with some embodiments of the present invention.

FIG. 14 depicts an illustrative system architecture. The system 1400 includes one or more storage devices 1405, a computer hub 1410, a server 1415 implementing a portal, an administrator client device 1420, a customer client device 1425, and a management computer system 1427. The imaging and spatial determination system in the storage device 1405 is configured to communicate (e.g., receive and transmit data) with the server 1415 via the computer hub 1410. The computer hub 1410 is configured to receive data and transmit data via a communications protocol. The computer hub 1410 is also configured to manage connectivity and data traffic between the server 1415 and the storage devices 1405. The computer hub 1410, for example, can be an IoT data hub. An IoT data hub can be an application implemented on a computing cloud service over the Internet that is configured to handle communications with the storage devices 1405. An IoT data hub can also be a system that is implemented at the same location as where the storage devices 1405 are located or at a remote location. The system is configured to communicate with the storage devices 1405 via a private network such as WiFi, LAN, etc. The storage devices 1405 are equipped with devices that are configured to communicate with the system. The IoT data hub may be configured to receive and aggregate data from the storage devices 1405 periodically over the Internet or intranet such as every 5 minutes or at other frequencies. Storage devices 1405 may be connected via WiFi or LAN to other storage devices or may stand alone independently. The server 1415 that implements a portal is where all the data resides for managing the connected storage devices 1405. The server 1415 can be implemented on a cloud computing service over the Internet or on a system over a private network. The server 1415 may connect to a management computer system 1427 to facilitate movement of inventory through an integrated supply chain. The management computer system 1427, for example, may be an Enterprise Resource Planning (ERP) system. The server 1415 serves as the system of record for connected storage devices 1405 with regard to customer usage and demand, restocking, alert and trouble managed and storage device life cycle events. Administrators are individuals who are employed by the company deploying the storage devices 1405. Administrators access the server 1415 from their administrator client devices 1420 to access information regarding specific storage devices and interact with the storage devices 1405 and customers through various machine command protocols. For example, administrators can monitor the inventory of the storage devices, submit orders for items that are low on supplies or have no supplies, and issue invoices for the orders to the respective customers.

Administrators can also monitor the operating status of the storage devices and check if any storage devices require adjustment, maintenance, or repair. For instance, administrators can observe that some storage devices have been set to operate at a higher than the maximum allowed temperature and inform the respective customers to lower their storage temperature. Administrators can note that some storage devices are operating in an alternative mode that relies on a backup battery, instead of the normal operating mode that relies on the primary source of power, and require the storage devices to perform an update process (discussed below). Customers are individuals or entities that bought, lease, or otherwise have access to the storage device 1405 through other relationships with the company of the administrators. Customers likewise have access to reporting and other interactions with the server 1415 via their customer client devices 1425. Customers can also monitor the operating status of the storage devices and can place orders with human intervention or have orders placed automatically based on usage. After the customer receives the items, the storage device can tell the customer where in the storage device the items should be placed. For example, the storage device may instruct the customer to enter the order number from the user interface and the storage device may show the drawers and nests where the items should belong on the user interface. The storage device may also automatically eject the involved drawers. The ability to determine the associated drawers and nests can be done automatically by the storage device such as based on the information entered during the ordering process or the information stored in the database. This ability can also be configured by the administrator or customer from their remote client device. Administrators and customers can control and interact with the storage devices from their respective client devices that are remote from the location of the storage devices or over a network or Internet. Administrators and customers can create their respective accounts (e.g., user name and password) in order to access the portal. A client device may be a desktop computer, laptop computer, a mobile computer, a tablet computer, a cellular device, a smartphone, a personal digital assistant (PDA), or any other computing devices having a microprocessor and memory.

Figure 15:
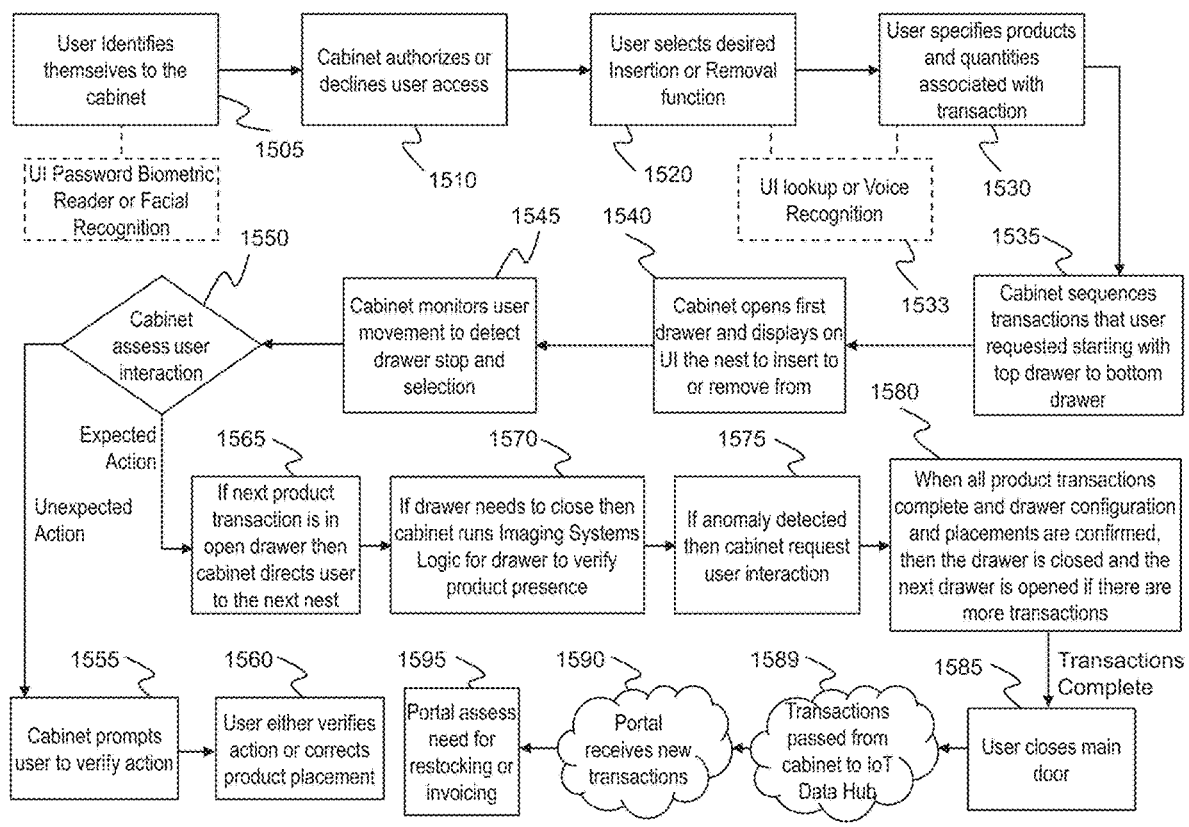
FIG. 15 depicts an illustrative user interaction with a storage device (e.g., cabinet or smart cabinet) in accordance with some embodiments of the present invention.

FIG. 15 depicts an illustrative user interaction with a storage device (or illustrative operation of the storage device). The process may start with a user identifying himself to the storage device from the user interface (step 1505). For example, the user interface may require the user to enter a password or include a biometric reader, facial recognition device, or voice recognition device configured to recognize an individual based a physiological or behavioral characteristic. These characteristics may include fingerprints, facial images, iris and voice recognition. Upon supplying the requested information, the storage device verifies whether the user is authorized to access the storage device (step 1510). If the user does not provide the requested information or the supplied information does not match the security information stored in the storage device, the use is denied access (e.g., keeping the door of the storage device locked). On the other hand, if the supplied information matches the security information, then the user is granted access (e.g., unlocking the door of the storage device, check for inventory information of the storage device, place order from the storage device, etc.). A user may be an administrator, a customer, or other individual who wants to use or access the storage device. The security functionality or login functionality may be provided by the imaging and spatial system in combination with the user interface, biometric reader, facial recognition device, and/or voice recognition device. The imaging and spatial system may include authorized user profiles and biometric information for each authorized user stored in the database for comparison or verification. In some embodiments, the imaging and spatial system may be configured to communicate with a separate system that is configured to store authorized user profiles and their biometric information and determine whether an individual is an authorized user.

The user interface then may provide an option prompting the user to select the type of the transaction, e.g., item insertion transaction or item removal transaction (step 1520). After selecting the transaction type, the user interface then requests the user to specify the items and the number of such items associated with the transaction. Before step 1520 or step 1530, the storage device can use a voice recognition device to verify whether the user is authorized to use the functionalities in steps 1520, 1530, if the device was not used earlier in step 1505. The storage device may require the user to speak to the voice recognition device. User actions performed in the item insertion transaction or item removal transaction (step 1520) can be recorded by the imaging and spatial system. The user can specify an item that he seeks to insert into or remove from the cabinet on the user interface. The imaging and spatial system can send the user's indication (and recorded actions) to a server to update the relevant information or execute a function. For example, when the user specifies an item to be removed from the storage device, the imaging and spatial system can send that indication to a server for the execution of a purchase.

The storage device then sequences the transaction starting from the top drawer to the bottom drawer (step 1535). The storage device, from the information stored on the database, can determine which drawers contain or should contain the items the user specified in step 1530. For example, the storage device may include 10 drawers, the drawers are numbered from 1 to 10 in an height descending order (e.g., drawer 1 is the top or highest drawer whereas drawer 10 is the bottom or lowest drawer, and drawers 2, 4, 5, 7 and 9 contain or should contain the items the user specified in step 1530. The storage device then ejects drawer 2 first and displays on the user interface the nest to insert to or remove from (step 1540). The storage device monitors user movement (e.g., hand movement) and assesses whether the user movement is directed to the nest (e.g., whether the user's hand is over the correct nest) (steps 1545 and 1550). If the user movement is not directed to the nest (or an item is inserted to or removed from a different nest), then the storage device notifies the user and instructs the user to move to the correct nest (or insert the item to or remove the item from the correct nest). The storage can also prompt the user to verify the user's action (e.g., placing an item in nest C instead of nest A) if it is different from the required action (e.g., the item should be placed in nest A). For example, the storage may inquire "Do you really want to place the item in nest C instead of nest A?" The user can select a "Yes" option on the user interface to confirm his action. All these procedures are shown in steps 1550, 1555, and 1560.

If the user movement is directed to the correct nest and then the user completes all the placements or removals for drawer 2, the storage device subsequently closes drawer 2, ejects drawer 4, and displays on the user interface the nest to insert to or remove from (step 1565). In some embodiments, before the drawer 2 closes, the storage determines if items are present in the nest (e.g., whether a visual marker or perforation pattern is broken) (step 1570). If an anomaly is detected (e.g., there are items in or missing from a nest that does not match data stored in the database), the storage device notifies the user and requests user action (step 1575).

The open drawer 4 then goes through the same procedures as described with respect to drawer 2. This operation continues until all the drawers, i.e., drawers 5, 7, and 9, have been addressed (step 1580). The storage device also senses whether the user's hand is near the drawer before ejecting or retracting the drawer. After the transaction is complete, the user then closes the door which is locked by the storage device to prevent unauthorized access (step 1585).

The user's transaction is transmitted from the storage device to the computer hub (step 1587). The transaction information sent to the computer hub may include the identity of the user, the drawers and nests that have received items and the number of items they have received, the drawers and nests that have items removed and the number of items they have lost. The computer hub then transfers the data to the server that implements a portal (step 1590). The server can receive additional transactions from the same user if there are more than one transaction to be conducted by the user, or transactions by users from other storage devices (step 1590). The server can determine that if drawers and nests in the storage device are full, need to be restocked, or require any other actions (step 1595). If there are drawers and nests that need to be refilled, the server can place orders for the required items. The server can also issue invoices for the transactions or the items that the user placed into the nests. Administrators and clients can access the server through the portal to access the data, the order information, the invoices, and other information.

The storage device is configured to handle multiple transactions or a transaction that includes multiple types of items (e.g., item A, item C, and item C) and multiple items of each type (e.g., X number of item A, Y number of item B, and Z number of item C). The steps illustrated in FIG. 15 are carried out by the imaging and spatial determination system of the storage device.

In some applications, the storage device may be deployed to locations where the items contained within is of critical nature such as health care settings. The items must always be available to the facility in the event of a power outage or in other situations that the storage device cannot receive power from the mains electricity (e.g., failure of a power supply unit). The storage device may be equipped with a backup battery and an independent keypad system or other system that allows the user to access the storage device when there is no power (or when the storage device is powered by the backup batter). With the backup battery, the storage device can still operate automatically (e.g., the drawers can be ejected or retracted automatically). Users can also operate the storage device manually (e.g., by pulling out and pushing in the drawer).

Figure 16:
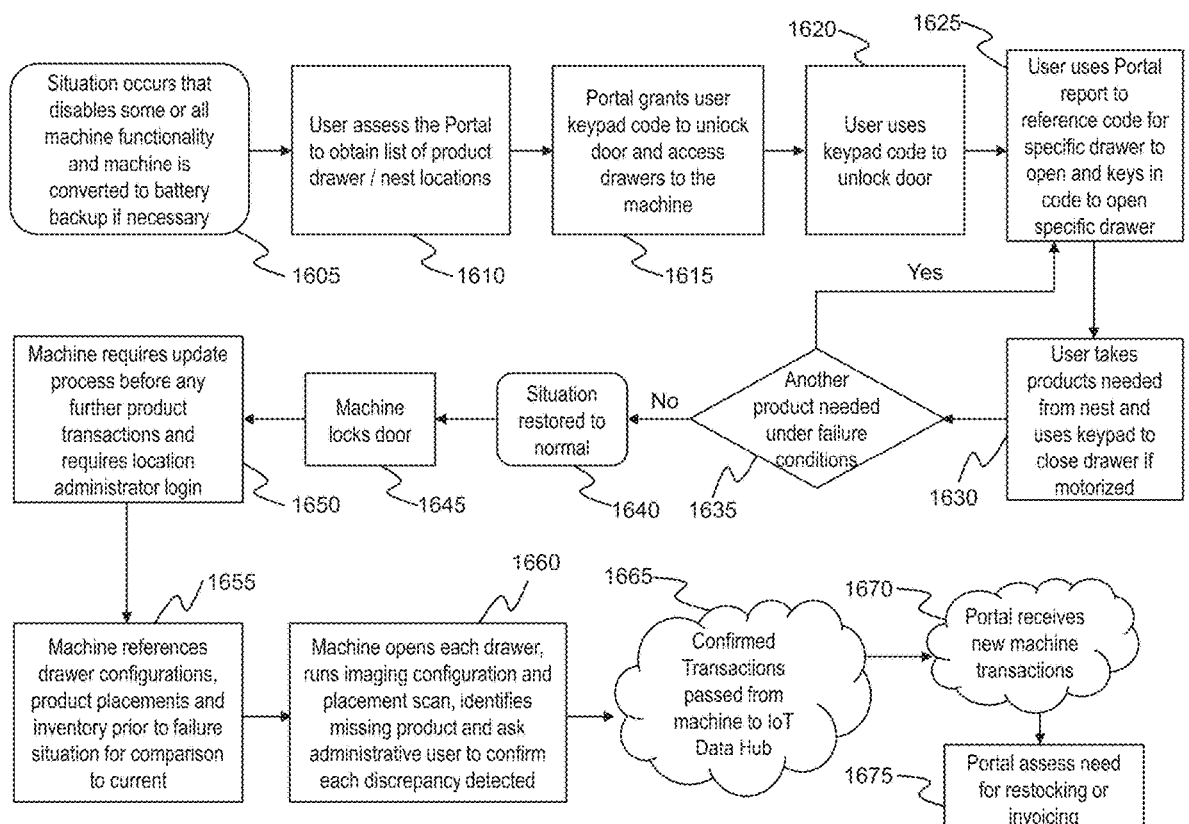
FIG. 16 depicts an illustrative operation of (or user interaction with) the storage device in the event of a power outage in accordance with some embodiments of the present invention.

FIG. 16 depicts an illustrative operation of (or user interaction with) the storage device in the event that the primary source of power is unavailable. The storage device is referred to as a machine in FIG. 16. When the storage device detects such a situation, the storage device is switched to operating from the backup battery (step 1605). The user can access the portal from their client devices to obtain a list of items that are in the storage device and location information of those items, e.g., the drawers and nests in which they are placed (step 1610). The user can also access the portal to acquire a first keypad code required to unlock the door of the storage device and a second keypad code required to unlock a drawer in the storage device (steps 1615 and 1620). After obtaining the keypad codes, the user can enter them from the keypad system to access a particular drawer. The user can obtain multiple different second keypad codes if he needs to access more than one drawer with each second keypad code being used to unlock a particular drawer (step 1625). In some embodiments, the user may only need to obtain the first keypad code if the drawers are unlocked or that can also simultaneously unlock all the drawers. If the drawers are motorized, entering the correct second keypad code can automatically have the drawer ejected. After taking the needed items from the drawer, the user can close the drawer by selecting a button on the keypad (step 1630). The user can then enter another second keypad code to get other items from another drawer (step 1635). This process repeats until the user retrieves all the items he needs (steps 1625, 1630, and 1635).

When the storage device can derive power from the mains again, the storage device can lock the door if it is not already locked (steps 1640 and 1645). The storage device then performs an update process before the user can conduct any further transactions (step 1650). The update process may involve an administrator and require an administrator to log in to the portal (step 1650). The update process includes the storage device examining nest configuration information, item placement information, and inventory information before the failure situation from the database for comparison to the current status (step 1655). The update process also includes the storage device automatically opening each drawer, running an imaging and placement scan, identifying missing items, and instructing the administrator to confirm a discrepancy if it is detected (step 1660). In some embodiments, the update process may also involve a user and require a user to open each drawer so that the storage device can perform the scanning and identifying steps. The confirmed discrepancies, which may be interpreted as transactions by the storage system, are transmitted from the storage device to the computer hub which then sends that information to the portal (steps 1665 and 1670). From that information, and any other transactions received by the portal after the failure condition, the portal can determine if there is a need to restock the drawers or if invoices need to be issued for the items removed by the user (steps 1670 and 1675).

The steps illustrated in FIG. 16 are carried out by the imaging and spatial determination system of the storage device. The imaging and spatial determination system may include a power sensor configured to detect whether the storage device is receiving power from the mains and switch the storage device between the normal operating mode and the backup operating mode.

Although the storage device described in this application is a cabinet that includes two cameras (e.g., integrated into the front face of the cabinet and at the top of the cabinet), in some embodiments, the cabinet may be equipped or operate with only one camera (e.g., by either installing only one camera on the storage device or deactivating one of the two cameras). Preferably, the only camera is the first camera or visible light camera. The second camera can be optional. If desired, an individual camera can be configured in combination with other features herein to automatically detect drawer configuration (e.g., nest arrangement and user hand movement when accessing or stocking nests).

In one embodiment, the cabinet is configured to operate with one camera. For example, the storage device 100 in FIG. 1 may have only one camera (e.g., camera 115) or have one of the cameras turned off (e.g., camera 117). The imaging and spatial determination system shown in FIG. 13 is configured accordingly (e.g., include all the components shown in FIG. 13 except the second camera 1335 and motor 1340 or include all the components shown in FIG. 13 with one of the cameras, such as the second camera 1335, disabled). The cabinet or imaging and spatial determination system (e.g., the processor and memory in the system) may be implemented with algorithms to perform the following image difference detection method, drawer detection method, drawer configuration detection method, nest change detection method, sliding drawer detection method, item recognition method, augmented reality overlay, and other methods.

In the image difference detection method, the imaging and spatial determination system is configured to record images of an open drawer using the camera and compare the recorded images. When the drawer is open, the system may record an image before the user accesses the drawer (or immediately after opening the drawer) and an image after the user accesses the drawer (or immediately before closing the drawer). User access may refer to removing an item from a nest in the drawer, placing an item in a nest of the drawer, or making a change to the nest configuration (adding, removing, or rearranging a divider).

The system may take a picture of the drawer after the user pulls out a drawer or selects a drawer to be opened from the user interface and before the user accesses the drawer. After the drawer is opened, the system may communicate to the user through the user interface that imaging is in process and that the user should not place his hands on the drawer (above the drawer). In some embodiments, such communication is unnecessary. The system may take an image several seconds later after it detects that a drawer has been pulled or selected (e.g., 2 or 3 seconds later or other duration when the drawer reaches its maximum extension) and that user hands or other objects are not over the drawer. The system may determine whether user hands or other objects are over the drawer by objection recognition (discussed below). If user hands or other objects are detected, then no image is taken. The system may take multiple images of the fully extended drawer or multiple images as the drawer is opening or extending. Imaging the fully extended drawer may not be required.

After the user accesses the drawer, the system may take a picture of the drawer when the system user starts closing (e.g., pushing in) the drawer or after the user selects to close the drawer from the user interface. Similarly, the system may communicate to the user through the user interface that imaging is in process and that the user should not place his hands on the drawer (above the drawer). In some embodiments, such communication is unnecessary. The system may take an image when it detects that the drawer is being pushed or selected and that user hands or other objects are not over the drawer. If user hands or other objects are detected, then no image is taken. The system may take multiple images of the drawer before or as the drawer is retracting. Imaging the entire drawer may not be required.

The system can detect whether the drawer is being pulled or pushed through the drawer motor (FIG. 13, 1325) and the processor (FIG. 13, 1305).

Figure 17:
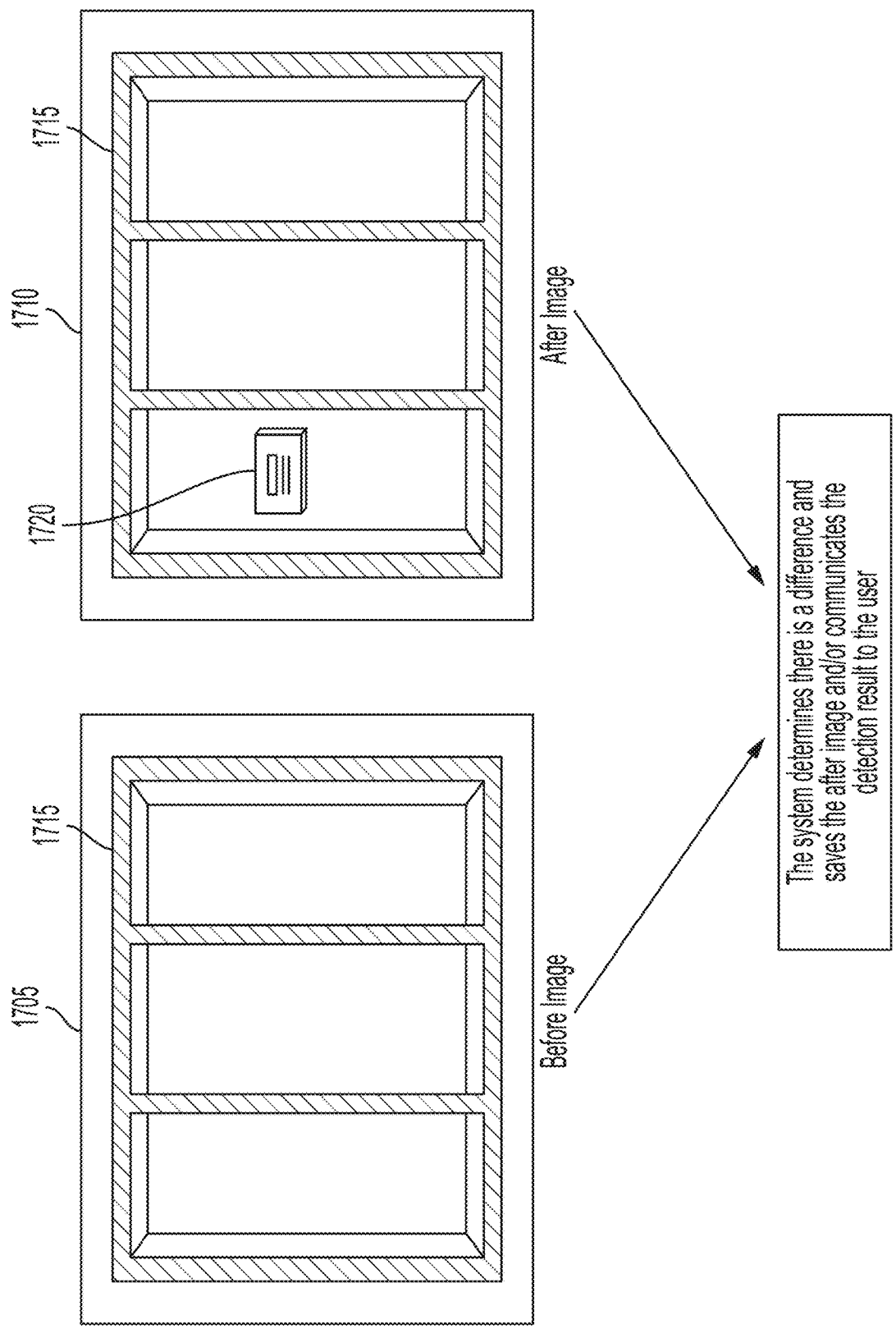
FIG. 17 depicts an illustrative image difference detection method in accordance with some embodiments of the present invention.

The imaging and spatial determination system then compares the before image (or images) and the after image (or images) and determines if there is a difference between the images. If the user removes an item from the drawer, restocks the drawer with an item, or changes the nest configuration, then the before image and the after image are different. Using this information, the system can determine if a nest has been accessed and identify the accessed nest, if an item has been removed from or placed in a nest and identify the item, if the nest configuration has been modified and stores the new nest configuration (or image of the new nest configuration), or a combination thereof. If there is a difference, the system saves the after image and/or communicates the detection result to the user through the user interface. FIG. 17 depicts an illustrative image difference detection method where 1705 represents a before image including a drawer 1715 and 1710 represents an after image including the same drawer 1715. In the after image 1710, the drawer 1715 includes an item that was not in the before image 1705. This indicates that an item was placed in the drawer or a particular nest. If the before image and the after image are the same, then no change has been made to the drawer. In some embodiments, the before image may not be required. The system can use the previously saved after image as the before image in the next comparison. It should be understood that the images 1705, 1710 in FIG. 17 and the subsequent figures may include other things such as the floor, part of the cabinet, a portion of the user's hand, or a combination thereof, in addition to the drawer. For simplicity, only the drawer is shown in the images.

When a drawer is open, the cabinet may lock the other drawers. The other drawers may not be accessible to the user until the user closes the open drawer or until the camera records an image of the drawer (after image). The cabinet may include a solenoid locking mechanism configured to provide such partial locking or unlocking feature. When the drawer is open, the system may display the nest configuration on the screen of the system and use an indicator to identify the nest that the user should access. For example, when the user opens a drawer without indicating to the system which item he wants to retrieve and all the items in the drawer are the same, the system may show a hatch pattern over a nest in the displayed configuration telling the user to access that nest. The system may use a criteria to determine the nest that the hatch pattern should be applied such as expiration date. The nest containing items with earlier expiration date may be prioritized and selected. The indicator may be a pattern (e.g., hatch pattern), color, characters, numbers, or a combination thereof. When the user indicates to the system that he wants to take a particular item, the system may open the drawer containing the item, display the nest configuration of the drawer, and show a hatch pattern over the nest containing the item. The system may display nest configurations shown in 1205 of FIG. 12.

In some embodiments, the system may display the latest recorded image of the drawer opened by the user or system, instead of the line image shown in 1205 of FIG. 12. In other words, the system may display an actual image of the drawer as opposed to a computer generated image that is produced by simplifying an actual image into a line image or other simplified image. The latest recorded image may be the last image the system took before the drawer closes. The system may show the indicator or a hatch pattern over a nest in the latest recorded image. This may be achieved by using augmented reality overlay further described below. The imaging and spatial determination system may include a light source that can be used with the camera so that images with appropriate lighting can be obtained.

In the drawer detection method, the imaging and spatial determination system is configured to determine whether a drawer is in an image recorded by the system. The top surface or the perimeter of the drawer may be provided with one or more visual markers that allow the system to recognize that a drawer is in the image. The perimeter, the outermost perimeter of the drawer or the four sides defining the shape of the drawer (without the dividers). In some embodiments, the perimeter may include the four sides defining the shape of the drawer and the dividers forming the nests. In one embodiment, the perimeter, the outer perimeter of the drawer, or the four sides defining the shape of the drawer may be the only locations that have the visual markers. In another embodiment, the dividers (top surface of the dividers) and the perimeter, the outer perimeter of the drawer, or the four sides defining the shape of the drawer may be the only locations that have the visual markers.

Figure 18:
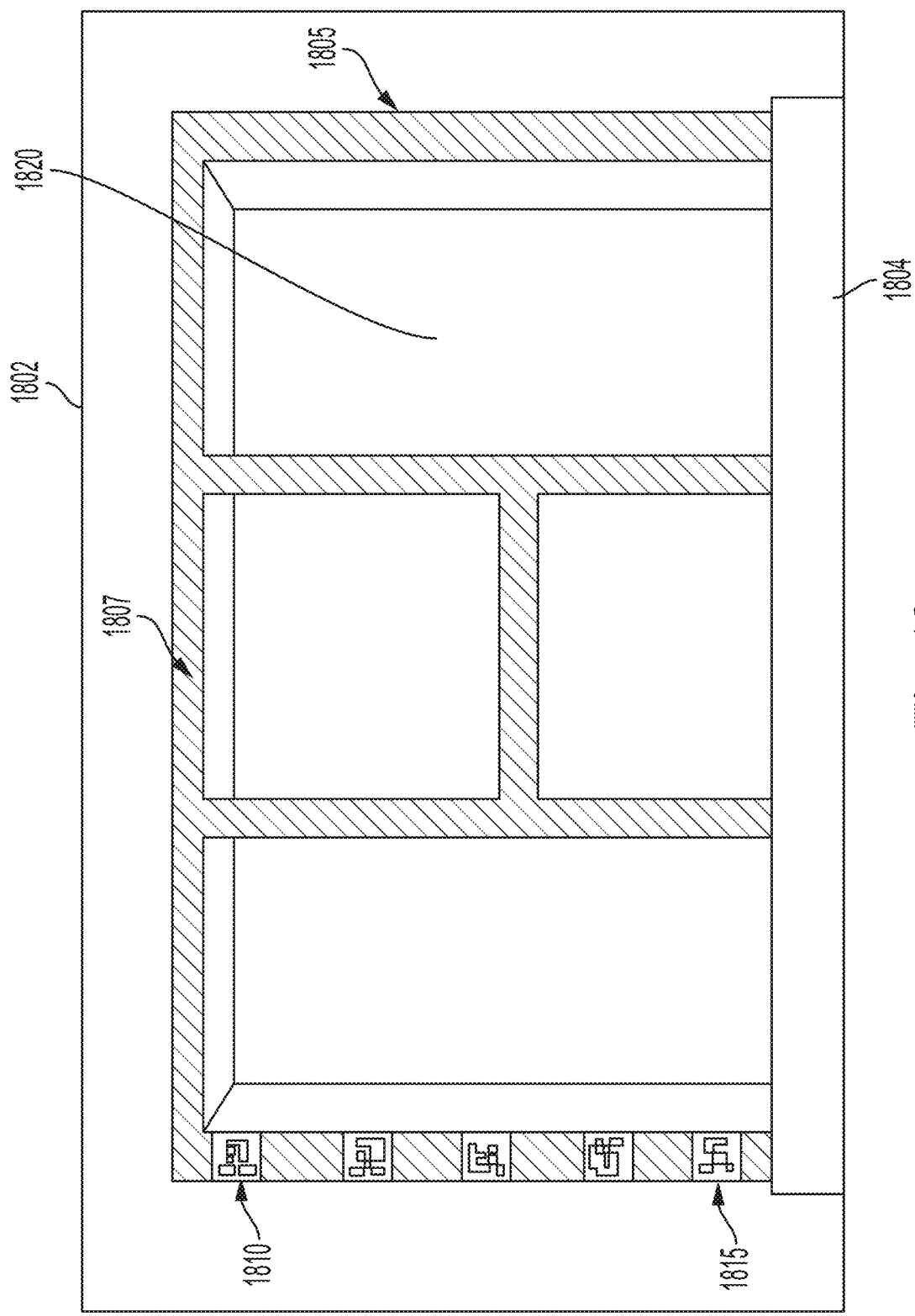
FIG. 18 depicts illustrative visual markers on the perimeter of the drawer in accordance with some embodiments of the present invention.
Figure 19:
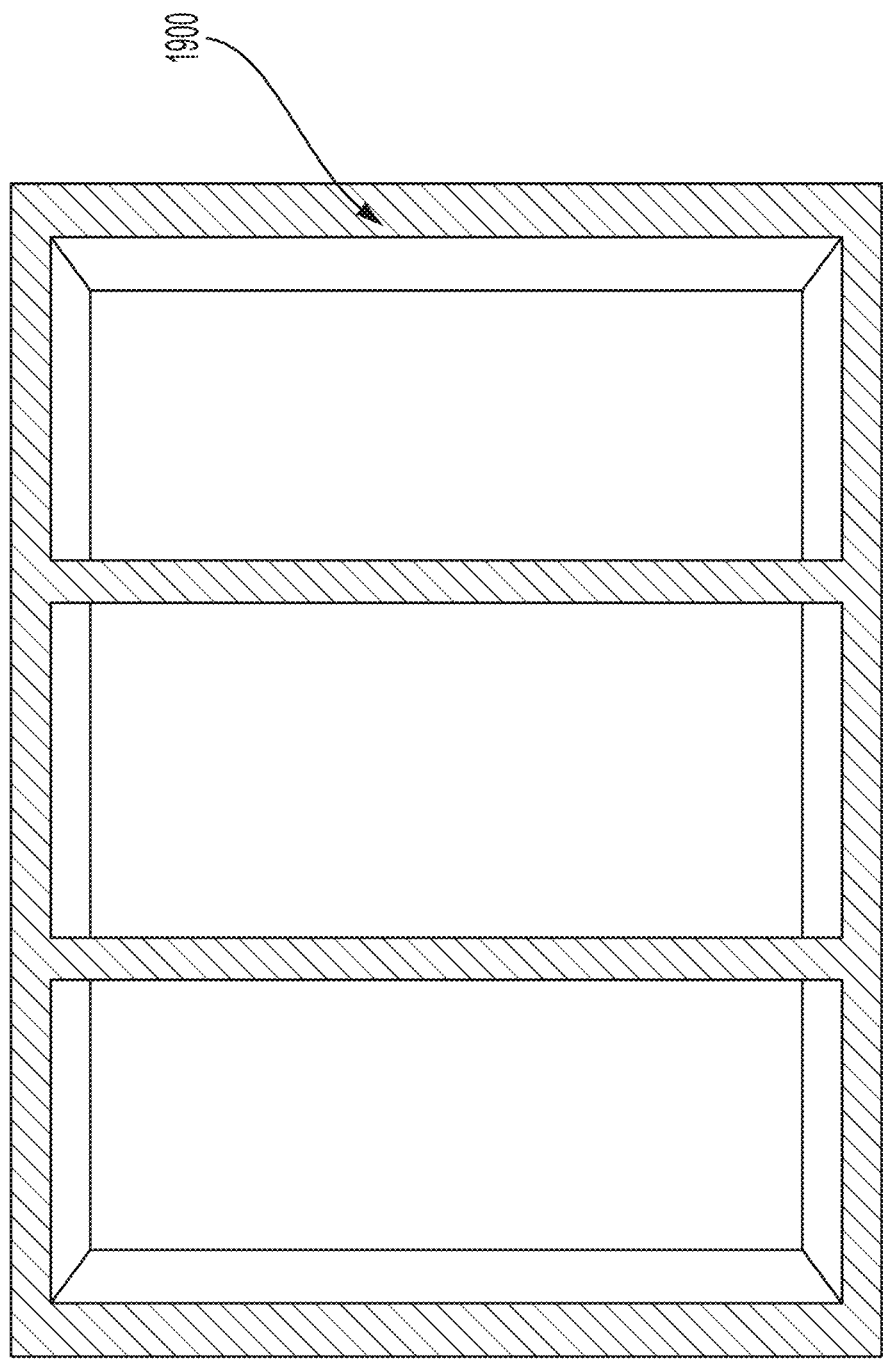
FIG. 19 depicts a drawer with an illustrative color visual marker in accordance with some embodiments of the present invention.

The visual marker can be an image, code, character, number, color, structure, shape, or a combination thereof. FIG. 18 depicts illustrative image visual markers that appear in the camera's view or the recorded image 1802. The top surface or the perimeter 1807 of the drawer 1805 may have a first image 1810 at the front of the drawer and a second image 1815 at the back of the drawer. The first and second images 1810, 1815 may be different QR codes. Upon seeing both images in the camera, the system detects that a drawer is in the view or recorded image and that the drawer is fully extended. When the system sees only the first image 1810 (or the first image and another image between the first image and the second image), the system may detect that the drawer is partially open. Multiple image visual markers can be employed to determine how far the drawer extends. The visual marker may be associated with a particular drawer, a particular drawer configuration, a drawer extension length, or a combination thereof. For example, upon seeing one or both of the images 1810, 1815, the system can determine that this drawer is drawer #5 and has the drawer configuration shown in FIG. 18. 1820 represents the bottom surface of the drawer 1805 and 1804 represents a portion of the cabinet that may be in the image 1802. As an alternative to or in a combination with the images 1810, 1815, the top surface or the perimeter 1807 of the drawer 1805 may have a color visual marker (e.g., physically color the perimeter or attach a color tape to the perimeter). Upon seeing the color visual marker and determining that a certain relationship exists between the seen color visual marker (e.g., they form a rectangle or square), the system detects that a drawer is in the recorded image. FIG. 19 depicts a drawer with an illustrative color visual marker 1900, the area filled with a hatch pattern or diagonal lines around the drawer. This color visual marker is also shown in the other figures and is on the top surface of the drawer's perimeter.

After determining that a drawer is in the recorded image, the system may isolate the drawer from that image. The recorded image or the overall image may include the drawer, a portion of the cabinet, the surface on which the cabinet is situated, and other contents. The system can isolate the drawer from this image and produce an image containing only the drawer (e.g., remove other objects from the overall image) or primarily the drawer (e.g., 90% of the image is the drawer). The before image and the after image discussed above (overall images) can be processed to produce a before drawer image and an after drawer image (images containing only the drawer or primarily the drawer), and the system can compare the images to determine if there is a difference. The before and after overall images can also be used in the image difference detection method. The drawer detection method may be executed before the system performs other detection methods, before the cabinet is used for the first time, or at other times when necessary. In some embodiments, the drawer isolation step can be optional.

After determining that a drawer is in the image, the system can further determine the drawer's configuration or nest configuration. The dividers can also be provided with similar visual markers described above. After checking the four sides of the drawer, the system can check for additional visual markers such as those on the dividers (on the top surface of the dividers or on the surface that appears in the camera's view) to determine how the internal volume of the drawer is divided. In addition the visual markers on the dividers or as an alternative method, the system can also use an edge detection technique and/or a high color contrast technique to determine the nest configuration. The edge detection technique can be based on an approach that is known in the art. The high color contrast technique can be based on the color difference between the walls or borders of the nest and the bottom surface of the nest. The borders of the nest can have a first or bright color (e.g., white) and the bottom surface of the nest can have a second or dark color (e.g., black), and vice versa. The high color contrast technique can be based on a color difference that is greater than a threshold value, such as in color measurement, luminance, pixel values in the form of (X, Y Z) (that has a value between (0, 0, 0) and (255, 255, 255)), etc. For example, the high color contrast technique can be implemented by using the color visual marker described above. In some embodiments, such a threshold value is not required as long as the colors are different (e.g., dark grey and light grey).

Using the visual markers, edge detection technique, high color contrast technique, or a combination thereof, the system can determine if the perimeter of the drawer, a divider, or both are in an image and use that determination to determine if the nest configuration has changed. For example, in the same area of the before image and the after image, a divider is in the before image and the divider is not in the after image, then the system can determine that there is a difference between the images and save the after image for future comparison or determination.

Figure 20:
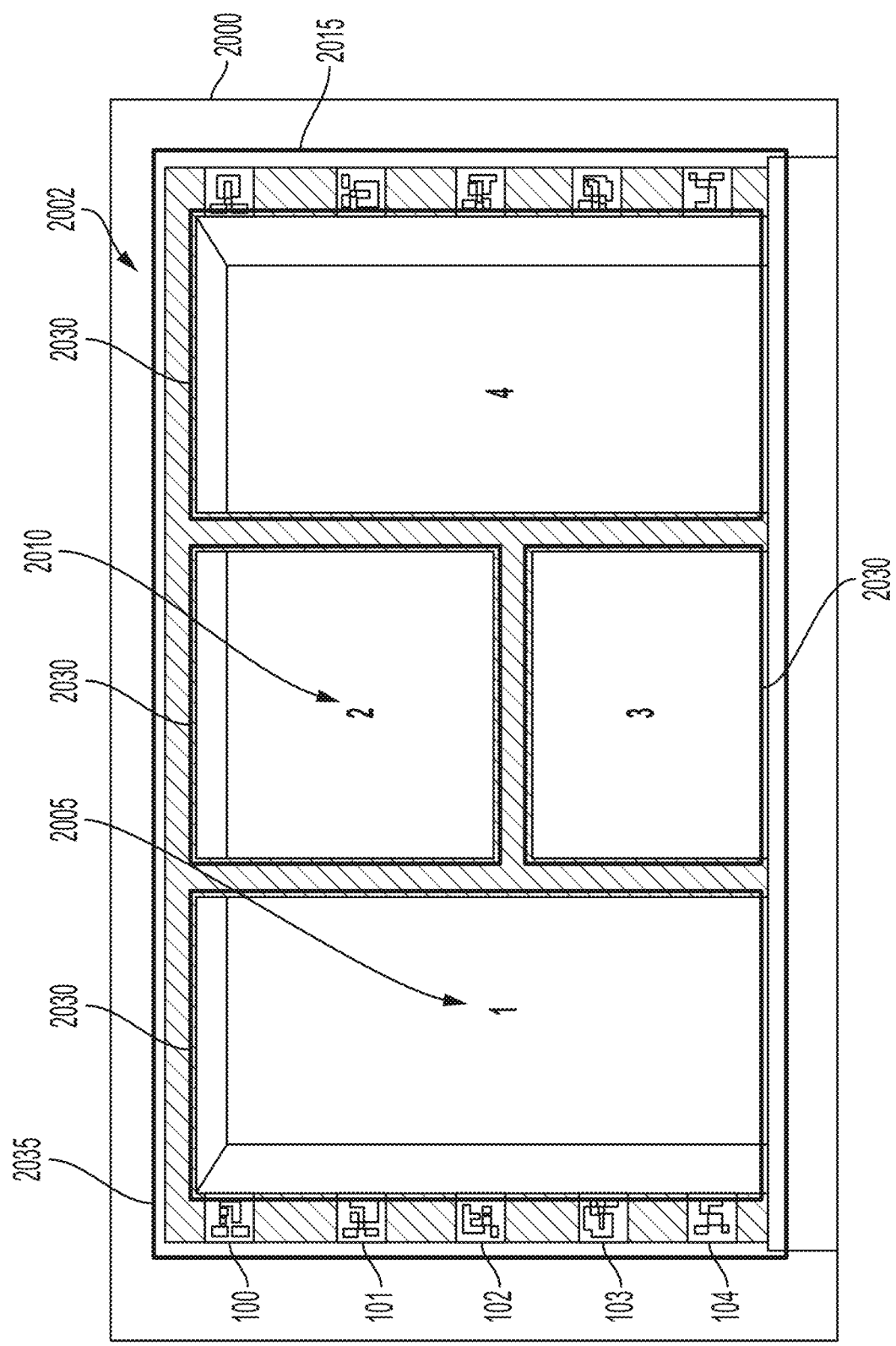
FIG. 20 depicts an illustrative nest configuration, assigned identifiers and order determined by the imaging and spatial system in accordance with some embodiments of the present invention.

The drawer detection method and the drawer configuration detection method can also occur simultaneously so that the drawer's configuration is also detected when the drawer is detected. The drawer configuration detection step can occur when the system takes a picture of the drawer, whether it is before or after the user accesses the drawer, before the drawer is used for the first time, or at other times when necessary. The system can take a before image and an after image and compare the images to determine if the user has changed the nest configuration and save the latest configuration (e.g., the after image) in the system. In the determined nest configuration, the system assigns each nest in the configuration an identifier (e.g., 1, 2, 3 and so forth depending on how many nests are in the configuration), assign the identifiers in a predetermine order (e.g., assign top left nest with 1, the top middle nest with 2, the top right nest with 3, and repeat the same process for the other rows, etc.), and stores the assigned identifiers and order. FIG. 20 depicts an image 2000 with illustrative nest configuration 2002 determined by the system and the assigned identifiers 2005, 2010 and order. 2030 represents the nest configuration detection (augmented reality overlay) by the system and 2035 represents the drawer configuration (augmented reality overlay) by the system. The system can use the identifiers to communicate which nest needs service. Other types of identifiers are also contemplated. Each drawer in the cabinet may have a default nest configuration before it is deployed and the default nest configuration information, identifiers, and identifier order may be stored in the system. The default nest configuration information may include a default nest configuration image for each drawer. FIG. 20 also depicts the drawer configuration 2015 determined by the system.

In the nest change detection method, the imaging and spatial determination system is configured to determine if a nest in the drawer has changed. The system can use the visual markers, edge detection technique, high color contrast technique, or a combination thereof to compare the before image and the after image on a per-nest basis. The system compares the same nest in the images to determine if the nest has been accessed by a user. Same nest may refer to nest in the same location, having the same physical size, having the same identifier, or a combination thereof (e.g., both nests in the images are in the top left corner, have the same size such as 2"×2", and have an identifier of 1). In some embodiments, same nest may refer to nest having the same identifier but with different size (e.g., both nests have an identifier of 1 but one nest is larger than the other one). The drawer configuration detection method may be performed before the nest change detection method so that all the nests are determined before comparing on a nest-to-nest basis. In some embodiments, the drawer configuration detection method and the nest change detection method may be performed simultaneously.

In the before image and the after image (or the drawer configuration determined from each image), the system may segment each image into a plurality of nest images (or each drawer configuration based on nest). Each nest image is an image of a particular nest. Segmentation may be based on the visual markers, edge detection technique, high color contrast technique, or a combination thereof. The system compares a nest image from one of the two images with a corresponding image from the other one of the two images. The corresponding image may be based on same nest location, nest size, nest identifier, or a combination thereof in the images. For example, from the before image and the after image, the system determines that there are three nests in each image and segments each overall image into three nest images with each showing a respective nest. The respective images are then compared (e.g., nest 1 from the before image and nest 1 from the after image are compared, and so forth). If there is a difference between the images (e.g., the contents in the nests are different such as from empty to having an item, from having an item to empty, or having another item in addition to the existing item, etc.), then the after image is saved for future reference or comparison. The system may communicate the user via the user interface of the system which nest(s) have been changed or accessed, and ask the user to confirm via the user interface if necessary. The system may perform nest change detection for every nest in the drawers or only some nests in the drawer. FIGS. 21A-21B depict an illustrative nest change detection method.

After performing the drawer configuration detection or the nest change detection, the system can save the difference, update, or latest image of the open drawer using the visual marker (e.g., QR code 1810). As mentioned above, the visual marker can be used to identify a particular drawer such as the open drawer and the system can use that visual marker save or retrieve information for the particular drawer. The system can retrieve the saved latest image of the drawer as the before image in the next drawer configuration detection or the nest change detection for comparison.

In the sliding drawer detection method, the imaging and spatial determination system is configured to determine if a drawer is fully open or partially open, and to determine the drawer configuration or nest change configuration of the partially open drawer (partial configuration, or configuration of the exposed area as opposed to the entire drawer). When the drawer is fully open, the system performs the drawer configuration detection or the nest change detection described above.

As described earlier, the top surface or the walls of the drawer may be provided with one or more visual markers. Visual markers may be provided on the perimeter or two walls of the drawer that extend in a direction perpendicular or substantially perpendicular from the cabinet (see FIG. 18). The drawer includes walls defining the height of the drawer. For example, referring to FIG. 2, the walls are structures that stand above, extend upward, or protrude from the bottom surface of the drawer and that enclose the internal volume of the drawer. The drawer 200 has a height of 2 inches (2" drawer), the drawer 230 has a height of 3 inches (3" drawer), and the drawer 260 has a height of 4 inches (4" drawer). The 2, 3, 4-inch heights refer to the heights of the walls. The visual markers located on the top surface of the walls. The top surface refers to the other end of the wall that is not connected to the bottom surface of the drawer and that can appear in the view of the camera. The same concept also applies to the top surface of the dividers. The visual markers are preferably integrated into the drawer during manufacturing (e.g., the visual markers and the drawer are produced by the same mold). In some embodiments, the visual markers can be also be subsequently added (e.g., using stickers, attaching a mechanical structure containing the visual markers to the drawer, etc.).

Visual markers are separated at a distance to indicate different distance or how far the drawer moves. Each visual marker may be provided at a specific distance, near or at a location where a divider can engage with the drawer (e.g., the walls of the drawer include a plurality of structures with each configured to engage a divider, and the visual marker can be provided adjacent to each structure), or other locations. Visual markers can be used to indicate that the drawer has been pulled to a certain distance to expose a certain nest when the system records an image of the partially open drawer. Visual markers can be used to provide drawer extension distance information or such information only (e.g., not used to identify a particular nest). Distance information associated with each visual marker may be saved in the system and accessible by the system after reading or imaging the drawer (e.g., look for the same visual marker in the system to obtain the distance information of that visual marker such as the drawer is 6 cm open). In determining that the drawer is partially open, the sliding drawer detection method may require determining that the user's hand is in the image (e.g., before image).

Visual markers may have a color and the color stays the same throughout the imaging, detection, recognition, or other methods. Visual markers may have distinct patterns or codes that are different from patterns or codes on the items or drawers (can only be found in the cabinet and not other places) to indicate that they are distance visual markers for the drawers. Visual markers may be used or located on only one of the walls or four sides of the drawer, and the imaging and spatial system can use the visual markers on that wall or side alone to determine the distance information or how much the drawer is open, without relying on visual markers on another wall or side of the drawer. Visual markers on multiple walls or sides are also contemplated.

Figure 22A:
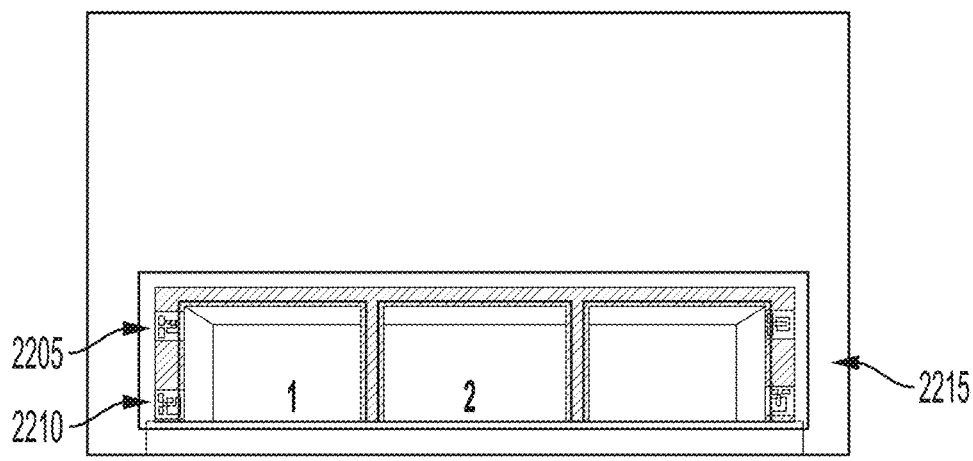
FIGS. 22A-22C together make up a process that illustrates a method in determining if the drawer is partially or fully open in accordance with some embodiments of the present invention.
Figure 22B:
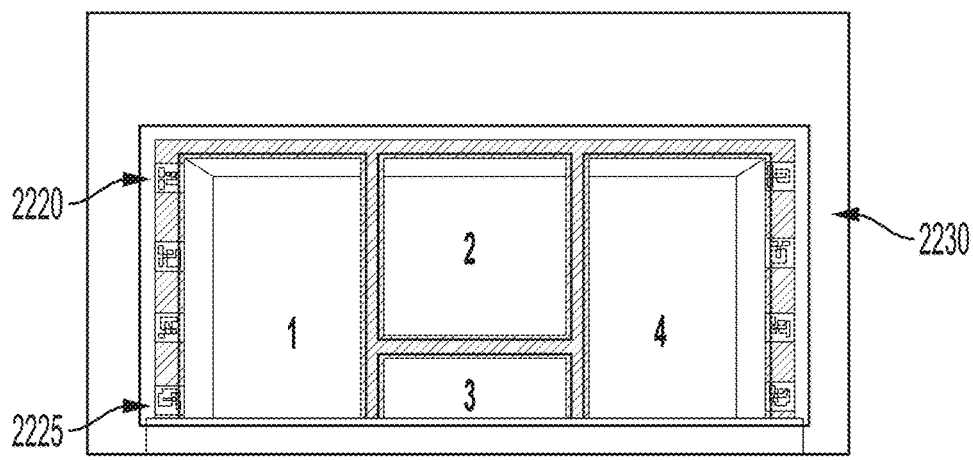
Figure 22C:
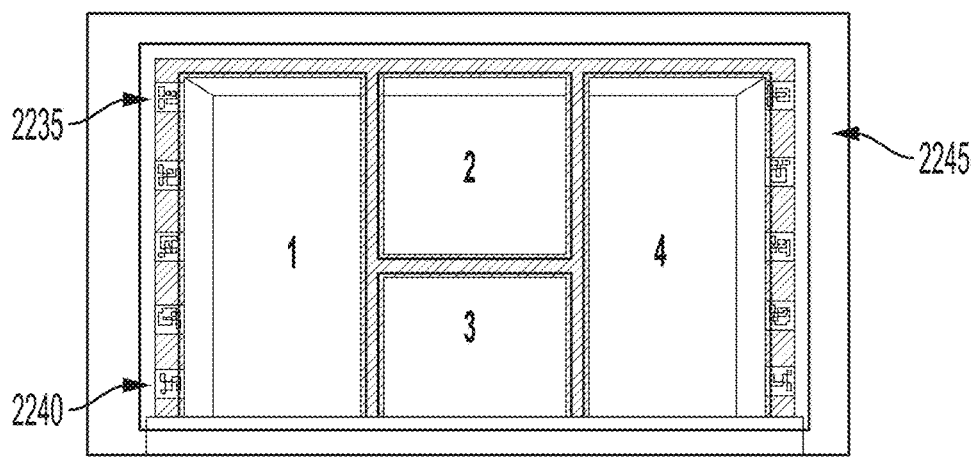

In one embodiment, when the drawer is partially open, the system may read one of the visual marks to determine which drawer is open and another one of the visual markers to determine how much the drawer is open. Using the first marker, the system can retrieve the last saved after image, the default image, or the last or default drawer configuration. Using the second marker, the system can process the retrieved image or configuration to obtain the corresponding portion of the drawer. (inert reference numbers) For example, if the second marker is 4 cm, the width of the drawer is 30 cm, and the depth of the drawer is 20 cm (the width and depth information could be default information pre-stored in the system), then the system can process the retrieved image or configuration to obtain the first 4 cm×30 cm portion of the 20 cm×30 cm drawer. FIGS. 22A-22C illustrative such concepts. In FIG. 22A, 2205 shows the first marker, 2210 shows the second marker, and 2215 shows the partial image or configuration obtained by using the two markers. The system can determine that nest 2 is completely exposed whereas nests 1 and 4 are only partially exposed. In FIG. 22B, 2220 shows the first marker, 2225 shows the second marker, and 2230 shows the partial image or configuration obtained by using the two markers. The system can determine that nest 2 is completely exposed whereas nests 1, 3 and 4 are partially exposed. In FIG. 22C, 2235 shows the first marker, 2240 shows the second marker, and 2245 shows the partial image or configuration obtained by using the two markers. The system can determine that nest 2 is completely exposed whereas nests 1, 3 and 4 are partially exposed (or completely exposed if 2245 shows the entire drawer).

The system records an image of the partially open drawer after the user accesses the drawer (after image). The system then compares the after image with the partial image or configuration of the drawer (e.g., FIGS. 22A-22C) and determines if there is a difference between the images or configurations. If there is a difference, then the after image or the latest configuration is saved by the system and can be retrieved for future reference or in the next comparison or detection. The image or information on the open portion of the drawer is updated with the after image or latest information, and the image or information the system has on the remainder of the drawer stays the same. The two images can also be compared on a per-nest basis as described above to determine if there is a change to the contents in the nest. The technique of using two visual markers in a partially open drawer can be used in either or both of the drawer configuration detection or nest change detection to determine if there is a change to the drawer configuration, nest, or both. If there is no difference, then the image or information the system has on the drawer is unchanged.

In another embodiment, when the drawer is partially open, the system may take a before image and an after image of the drawer and determine if there is difference between the two images based on procedures described above without relying on the visual markers.

Figure 23:
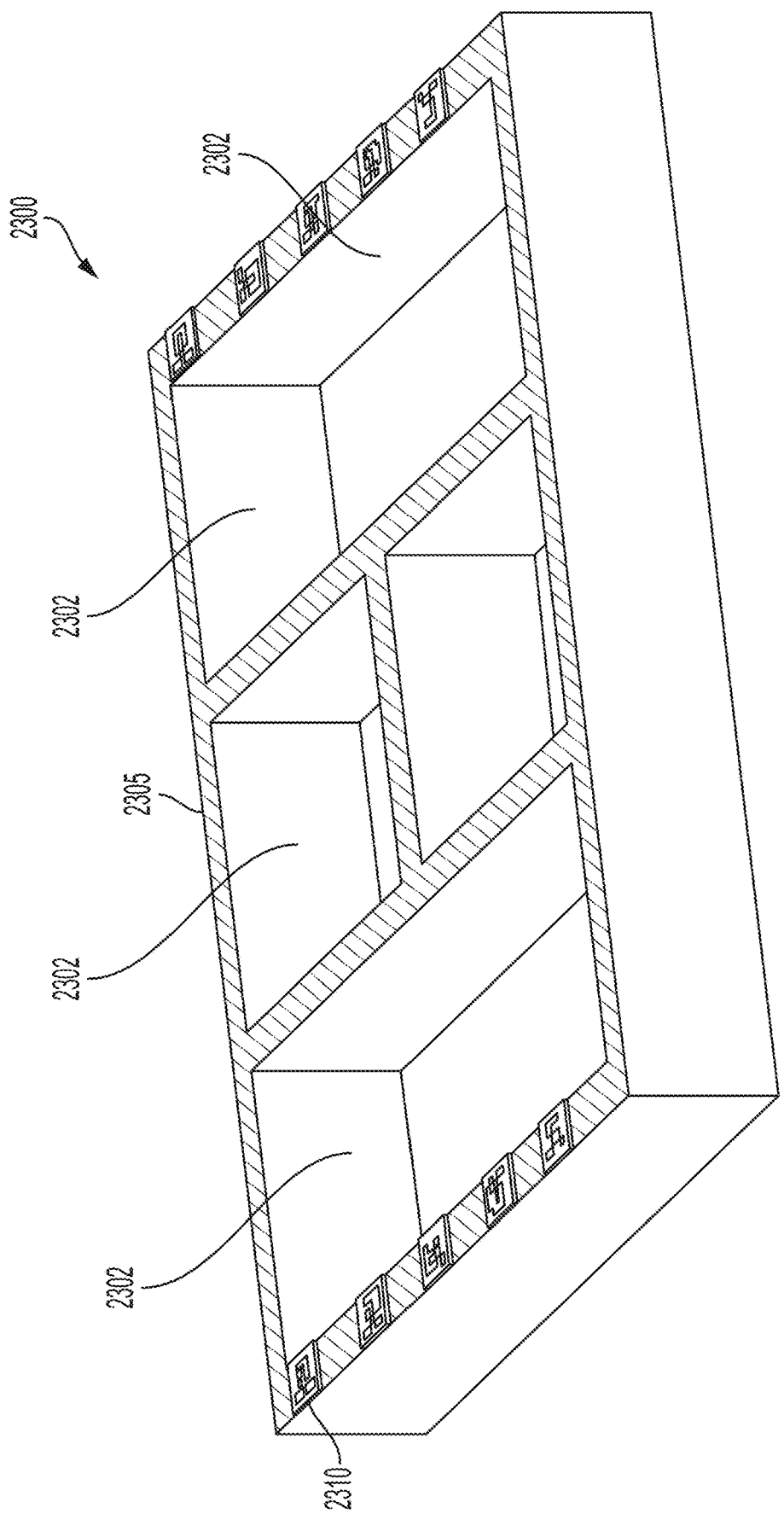
FIG. 23 depicts a perspective view of an illustrative drawer in accordance with some embodiments of the present invention.

FIG. 23 depicts a perspective view of an illustrative drawer 2300 showing the walls 2302 of the drawer 2300, the top surface 2305 of the walls 2302, and illustrative locations of the visual markers 2310. FIG. 23 also shows a drawer that is completely removed from the cabinet. FIG. 23 further illustrates that the drawer 2300 includes a bottom surface 2302 and that the visual markers 2310 are on the top surface 2305. The visual markers 2310 may be flat or leveled with respect to the top surface 2305, or formed as protrusions or indentations (e.g., the visual markers 2310 have a 0.5 cm thickness above the top surface 2305 or are notches with a 0.5 cm depth into the top surface 2305). Preferably, the visual markers 2310 are located on the wall(s) that extend along the direction in which the drawer 2300 moves.

In the item recognition method, the imaging and spatial determination system is configured to determine if correct items are being placed in a nest. The system may have information on what items each nest should contain pre-stored and include an object recognition function that can recognize objects in the view of the camera (e.g., appears in real-time in the viewfinder) or the images taken by the camera. The object recognition function is configured to recognize items to be placed in the drawer and user hands. The object recognition function can also be configured to recognize objects beyond such items and the hands. The object recognition function can recognize objects from different angles. The object recognition function can recognize an object when the entire object or a portion of the object appears in the view of the camera or in the images. After identifying the nest containing the items and recognizing the objects in the identified nest, the system can compare the recognized objects with the item information the system has on the identified nest. If the recognized objects match the item information on the system, then the right items are put in the identified nest. If the recognized objects does not match the item information on the system, then the incorrect items are put in the identified nest. In either situation, the system can communicate the result to the user through the user interface of the system.

The object recognition function is implemented on a machine learning system. The machine learning system may be part of the imaging and spatial determination system or an external system relied on by the imaging and spatial determination system. The machine learning system may include a first artificial neural network (feature learning component) and a second artificial neural network (image classification component). The first neural network is configured to receive a frame captured by the camera, detect features in the frame (e.g., patterns, edges, shapes, colors, and other characteristics that are used to delineate an object in the frame), and compute a vector representing the detected features. The second neural network is configured to receive the computed vector and classify the vector to a category based on probability. The second neural network includes multiple categories with each corresponding to a particular object or item to be received by a nest. The category with the highest probability is the object that appears in the view or image of the camera.

The imaging and spatial determination system is also configured to perform augmented reality overlay. When a drawer is fully open or partially open, the system through the camera can determine the configuration and/or nests that are in the viewfinder of the camera in real-time, assign each configuration or nest an identifier in real-time, and display the determined configuration and/or nest and their assigned identifiers in the viewfinder in real-time or the display of the system that is connected to the viewfinder. The system can highlight the nest or draw a corresponding shape (e.g., square or rectangle) to show each determined or assigned configuration and/or nest. Such highlight or drawing can also be used to identify nests that require service (e.g., need to restock a nest or a wrong item is placed in the nest and requires removal, etc.). The augmented reality overlay is illustrated in FIGS. 20-22.

The system may not need to use the perforation pattern on the bottom surface of the drawer to determine whether a nest is full, partially full, or needs refill. The drawer can be manufactured with or without perforations on the bottom surface. When perforations are created, they may be used for ventilation purposes or in combination with the above detection or recognition method to obtain better accuracy. When perforations are used, the system can also take before and after images of the perforations on the bottom surfaces and compare their patterns to determine if there is difference.

The cabinet may be built to have multiple zones for storing different types of product, such as a temperature-controlled zone (e.g., the temperature can be set by the user), a refrigerated zone (e.g., the temperature is kept between 38 F and 42 F) and an ambient temperature zone. For example, the temperature-controlled zone may include three drawers, the refrigerated zone may include five drawers, and the ambient temperature zone may include the remaining drawers. Each zone may have its own dedicated camera such as the first camera 115 for each zone.

The cabinet may be configured to function as a vending and distributing machine. Such a machine includes one or more first drawers for storing items available for purchase and one or more second drawers for storing items purchased or to be distributed. The items in the first drawers are to be scanned by an optical scanner (e.g., bar code scanner) and marked as purchased or scanned by the cabinet (e.g., the imaging and spatial system). Items in the first drawers include a bar code or other identifier that is readable by an optical scanner (e.g., upon reading or scanning the bar code or other identifier, the cabinet can determine which item it is and its price). The cabinet includes an optical scanner that is part of or that is configured to communicate with the imaging and spatial system (e.g., transmit scanned code or information representing the scanned code to the imaging and spatial system). The optical scanner is communication with the processor and may be activated by the processor in response to selecting a purchase option on the user interface. The optical scanner can read a printed code (e.g., barcode, QR code, etc.), decode the data contained in the code, and send the data to a computer. The optical scanner generally emits light (e.g., a light beam), frequency, or other signal (visible or invisible) to scan or detect the code. In some embodiments, a camera, such as the type of camera used for the first camera, can also be used as the optical scanner. In some embodiments, the first camera and the optical scanner can be the same device (they use or share the same lens and imaging sensor).

When someone wants to buy an item from the machine by interacting with the user interface, the user interface directs the person to the specific drawer and nest containing the item (e.g., ejecting the drawer and shows the hatch pattern over the nest on the display). If there is more than one nest that contains the same items that the person wants to buy, then the user interface (or the imaging and spatial system) can make a decision based on a criteria such as lot, expiration date, or both. For example, the nest with items having the earliest expiration date should be selected. The person retrieves the item from the selected nest and scans the item using the optical scanner to have it marked as purchased.

Items purchased from the machine or the first drawers can be distributed to patients immediately. If there are extra items from the purchase (e.g., a person bought a pack containing 3 items and only one is needed for the patient), the extra items can be placed in the second drawer for future use. When a person interacts with the user interface to retrieve a particular item, if the particular item is available in one of the second drawers, then the user interface directs the person to that drawer. The second drawer may include a plurality of nests and the user interface may also direct the person to the particular nest containing the item (e.g., ejecting the drawer and shows the hatch pattern over the nest on the display). The user interface (or the imaging and spatial system) can also use a criteria such as lot, expiration date, or both to select a nest in the second drawer. If the particular item is not available in the second drawer, then the user interface communicates to the person that he needs to purchase the item as described above. In some embodiments, the machine may require a second scan before distribution or after being taken out from the second drawer. The second scan can be used to keep track of inventory information (of the second drawer or if a purchase is necessary when the same item is desired the next time), to know the date and time it is used, or other purposes The imaging and spatial system may be configured to track and monitor the first drawers, the second drawers, or both and their inventory information using the one or more of the methods discussed above (image difference detection method, drawer detection method, drawer configuration detection method, nest change detection method, sliding drawer detection method, item recognition method, augmented reality overlay, and other methods) and shown in the figures. The first drawers, the second drawers, or both may include the visual markers, and the visual markers may be positioned at the locations mentioned earlier in the application.

In some embodiments, one cabinet may be configured to store items available for purchase and another cabinet may be configured to store items purchase. Purchased items are moved from the cabinet to the other cabinet. The two cabinets can be configured to operate as the first drawer and the second drawer discussed above.

The storage device can be medication storage device, tools storage device, cellular tissue storage device, merchandise storage device, or other types of storage device for storing other items. The items can be medications, medical or dental tools and supplies, tissue samples (e.g., human, animal, and plant tissues), automotive repair tools, beauty salon supplies, cosmetic and skin care tools and products, packaged goods or liquid, and other items. The storage device can be a cabinet, a refrigerator, or other temperature-controlled or environmentally controlled machine. The storage device, cabinet, or vending machine is applicable or particularly suited for a hospital or patient care setting to dispense medical products that are usable for treating patients. These are typically consumable or disposable medical products.

The storage device is an apparatus configured to store and dispense products, tools merchandizes, medications, and other items. The storage device dispenses items by allowing a user to have access to a drawer to take an item such as by releasing the drawer that contains the item.

The step of detecting, sensing, or determining involves operating a camera and the processor and memory including related software in the imaging and spatial determination system. For example, in those steps, the camera is used to view a drawer or user's movement and feed the view to the processor and memory. The terms detecting, sensing, and determining are used interchangeably in this application. The camera's view may refer to the view in the viewfinder of the camera in real-time or a frame recorded by the camera. The view fed to the processor and memory includes one or more frames representing the view. The processor and memory includes instructions and algorithms that enable the processor and memory to know that a mechanism (e.g., the first, second, or third mechanism, which may be an arrow image, diamond image, and square image, respectively, or visual markers) is in the one or more frames and to perform a function or obtain information associated with the mechanism after the processor and memory receives the one or more frames showing the mechanism (or after the processor and memory receives information about the one or more frames showing the mechanism). The mechanism can be based on a shape, color, character, number, structure, or other form (or a combination thereof). The instructions and algorithms also include computer codes implementing the function associated with each mechanism. Similarly, the instructions and algorithms enable the processor and memory to know that a visual marker, a divider, or a tag associated with a distance measurement is in the one or more frames and to perform an action after the processor and memory receives the one or more frames showing the visual marker, divider, or tag (or after the processor and memory receives information about the one or more frames showing the visual marker, divider, or tag). The processor and memory further include instructions and algorithms that are configured to monitor a user's movement over the drawer and determine whether the user is accessing one of the plurality of nests in the manner described above.

Additionally, the processor and memory include instructions and algorithms that control the movement of the first and second cameras so that the first and second cameras can be used in conjunction with the processor and memory to perform their functions and to obtain the necessary frames or images.

Additionally, the step of detecting, sensing, or determining may further include or refer to the result obtained after performing the detecting or sensing step. For example, after the processor and memory receives a frame showing the first mechanism and performs the function associated with first mechanism, the processor and memory determines the length of a nest.

The step of identifying or recognizing refers the ability of the processor and memory including related software to determine the presence of a mechanism, visual marker, divider, or tag in the one or more frames that has an associated function or action to be performed. The step of scanning refers to an operation of the camera and may include moving or tilting the camera to change view direction and look for the aforementioned mechanism, visual marker, divider, or tag.

In accordance with principles of the invention, a non-transitory computer readable medium embodiment is contemplated. The medium stores computer executable instructions that are executable by a processor. When the instructions are executed by a processor, the instructions cause the processor to perform a method for operating a cabinet such as performing processes, steps, or activities described herein.

A divider is a piece plate, panel, sheet, or other similar device that can be inserted into and removed from a drawer. Once a divider is installed in the drawer, the drawers is divided into multiple smaller compartments.

The locking mechanism, the drawer motor, and the drawer mechanical components used and configured to engage, eject, retract, slide, or otherwise move the drawers are known to those of ordinary skill in the art.

The imaging and spatial determination system or the storage device implements image processing software or hardware in conjunction with the camera (signals from the view of the camera) to perform image processing or analysis. The imaging and spatial determination system may also be referred to as the imaging system.

The storage device can be configured to detect and use certain actions as triggers to evaluate the nest in drawers. For example, the storage device can detect when a user is opening or is closing a drawer and at that time take an image of the drawer. The image can be used to check the nests based on the visual pattern (to detect contents).

The storage device can be configured using the camera to automatically read machine readable information on a top surface of an item in a nest and store that information (or using a hand scanner). The information may be necessary for associating the item with a particular patient for control reasons.

The lock or locking mechanism may be a solenoid locking mechanism arranged and adapted on the drawers that will sense when a drawer is opened and lock the remaining ones, e.g., as part of the overall system.

In some embodiments, a medical cabinet (or possibly other cabinet) and system is provided which as described includes software and/or hardware (drawers, computer, etc.) that provides a locked cabinet that is configured to include a first set of drawers that are provided for convenience as storage for the facility (e.g., hospital or patient care site will store products in a refrigerated shelf in the cabinet that they can access and use of their own products) and a second set of drawers that the system is configured to store products and monitor for vending products. In such a configuration, a user can take an item from the second set of drawers and the system will record the transaction (e.g., record that the hospital has used that item and will need to be part of charges to the hospital) and for example, when the item is a multipack item (e.g., 10 pack of items in one bundle), the user can break the pack, take one item and place the remaining pack (items) in the first set of drawers for later retrieval. The system can monitor and track the second set of drawers without doing the same or needing to the same for the first set of drawers.

Figure 24:
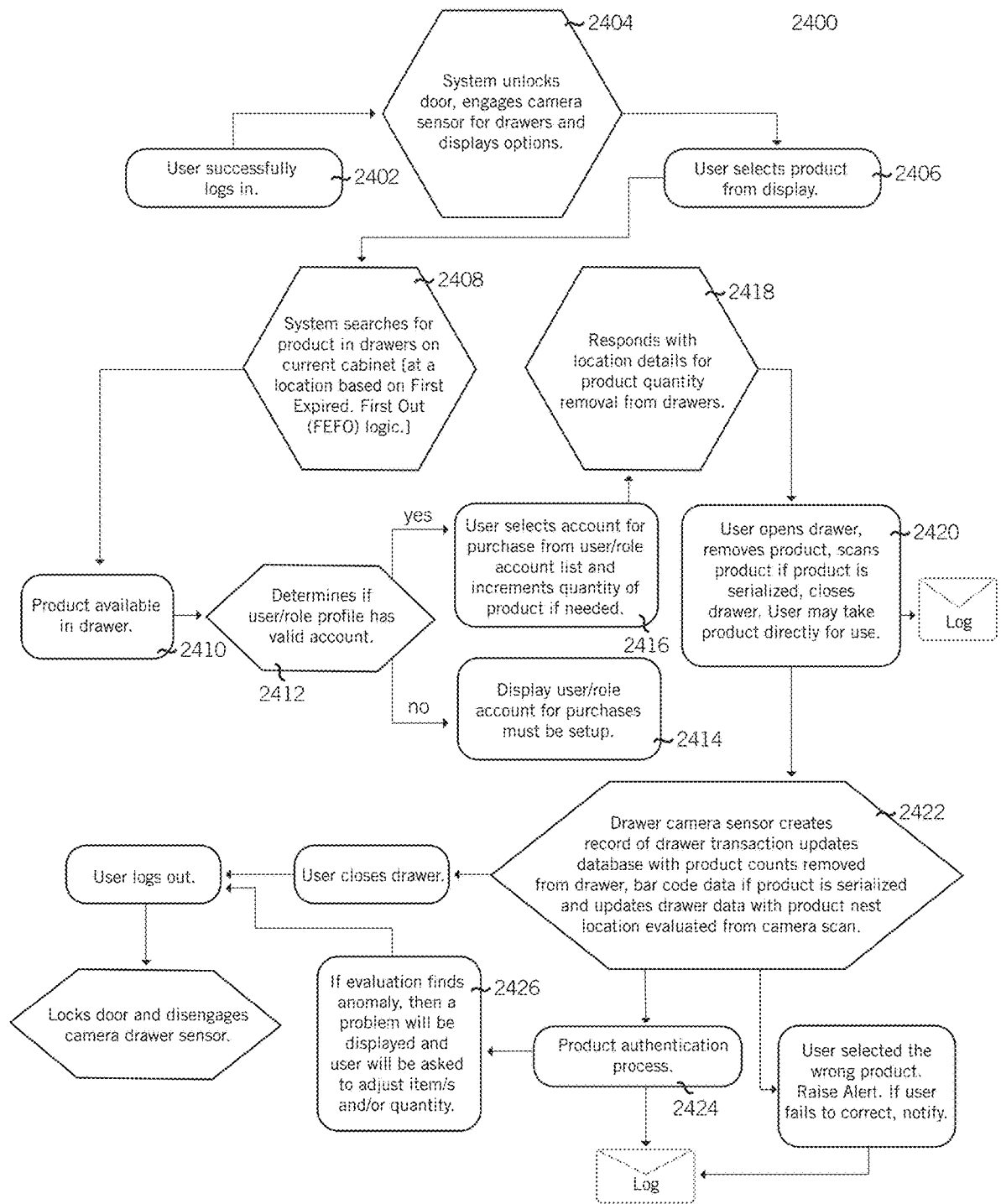
FIG. 24 depicts an illustrative flow chart in accordance with some embodiments of the present invention.

With reference now to FIG. 24, the cabinet can be configured in structure and operation to implement security and inventory management that can provide significant benefits to users, facilities, and cabinet providers. Flow chart 2400 of FIG. 24 can be implemented using the software and hardware described herein. At step 2402, the cabinet, by way of a user interface, can provide the user (a user that has physically approached the device) with a user interface to login by providing one or more credentials and in response, the cabinet can check the information and authenticate the user to access the operation of the cabinet. The credentials can for example be a user ID and a password that is entered by the user. At step 2404, in response to the authentication (and login), the cabinet can unlock a cabinet door (if equipped with one) to make available the plurality of drawers behind the door and can in some embodiments, unlock all of the drawers. The drawers (all of the drawers or subset of the drawers) can be unlocked when the user is logged in as a possible operational option.

At step 2404, an interface of the cabinet can generate a display, a GUI, that provides the user with an interactive option to select a product (such as a particular packaged medical product or device). This can be provided by the interface by providing a keyword searching tool, product browsing tool, or other technique. At step 2406, the selection of a product by the user can be received via the user interface (e.g., the user using a touch screen or pointing device on the interface to select a product and quantity).

A database such as database 1333 of the cabinet can store product and item specific information that is used by the cabinet in its operation processes. The database can store data specific to each item stored in the cabinet comprising, a serial number assigned to that product, a product code assigned to that item (e.g., one that is distinct from the serial number), a product name to which each item corresponds to provide a stock of that product in the cabinet, information identifying the nest and drawer in which the scanned item is stored in the cabinet, and lot and expiration of the item if applicable. For example, a user in a hospital or medical facility may need a product such as an epinephrine injection and the database may store in the data how many items of that product are stored in the cabinet and store that information with respect to the nest and drawer in which the items are contained. The product code can be the National Drug Code for that product which is standardized based on the specific medication and product size. The National Drug Code is a unique product code used in the United States and defined by the Federal government. The value can be that regulated products can be identified by their drug code using a standard defined numbering methodology irrespective of manufacturer. If a product is of the type that is serialized, the database can store the serial number for each item in the database in association with the nest and drawer in which it is contained. The data can be added to or updated in the database during the stocking operation in which the items are scanned and placed in nests. The cabinet, as part of the stocking, can specify to the user the nest in which the item should be placed and thus, at least in one way, can save the data about the association in the database in response.

In some facilities or user applications, there are significant consequences or existing problems with inventory loss or mistakes. For example, in a hospital, loss of certain types of items can lead to significant financial loss and also raise safety issues. Mistakes can have significant consequences. Seeking to have precise tracking and security for items in such situations can have material advantages to those industries.

At step 2408, in response to the selection of a product by the user, the cabinet searches, using the database, for the product to determine whether the cabinet is stocked with that product and identify the nest and drawer that contains the stocked item. An algorithm can be implemented to prioritize which available item is selected from the database. This can, for example, be based on an algorithm that reads the expiration of the available items and selects by prioritizing items based on expiration so that the item expiring the soonest is identified for the user.

At step 2410, in response to the identifying an item of that product is available in a nest and drawer, the user interface displays information to the user providing the location of the item. In some embodiments, the cabinet is configured to process a transaction related recording for that event when a user removes a product from the cabinet (e.g., the removal is recorded and a collection of such removals are periodically sent to the facility owner with a charge for the items). At step 2412, the cabinet can determine whether the login user has authorization and a valid account to carry out the transaction for that item. At step 2414, if the account is not valid or if the account of that user does not have the authorization for that product, the process can be terminated. At step 2416, if the account is valid and if implemented and the level of authorization is sufficient, the cabinet can perform the related process with the user's account and update the product count.

At step 2418, the cabinet (in response to the above) retrieves and communicates via the interface information specifying the location of an item of the selected product in the drawer. At step 2420, the cabinet permits the user to open the drawer (the drawer can be selectively unlocked to allow opening a corresponding drawer or a group of drawers, such as, all drawers). The user can remove the item by hand and if the items is serialized, the cabinet receives scan information from the user scanning the product after removing the item. At step 2422, the cabinet creates a record of the video from the camera (positioned over a drawer when it is opened) for the transaction (which can be later retrieved) and updates the database with the item count removed from the drawer, bar code for the removed product(s), and updates the drawer data for the nest location.

At step 2424, the cabinet can implement product authentication processes that are configured to integrate multiple layers of product authentication into the overall process with the user. Product authentication refers to the cabinet determining that the item that was actually removed by the user is an item of that user-selected product. This can be a combination of user authentication and product authentication. For example, the cabinet can determine using the database and product selected by the user and using the image and spatial determination processes described herein can detect which nest in a drawer the user removed an item from and determine from the database by reading information on items stored in that nest that the detected nest is reflected in the database to (currently) contains one or more items of that product. This for example can be one layer. As another example, the cabinet can receive information from an optical scan and from that scan determine the serial number of the removed item. The cabinet can use the database to determine that the serial number is in the database and also that the corresponding product is the selected product. The cabinet can further determine whether the serial number of the scanned item removed by the user is one that was associated with the nest and drawer from which the user removed the scanned item. In some embodiments, the combination of all of these product authentication determinations is implemented and provides an integrated multilayer inventory and security system with high compliance capabilities and real time inventory precision.

At step 2426, in response to determining an anomaly in step 2424, the cabinet generates an error and communicates (such as by displaying an error message using the interface on the monitor) that a determination was made the removed item is not correct or proper (e.g., removed from the wrong nest). The cabinet can prompt the user via the user interface to return the item or can prompt the user to accept the different product that may have been taken. If via the interface, the user accepts the different product, the corresponding information is updated in the database (e.g., item count or serial number). Thus, the cabinet can generate an error and/or provide an option to accept the mistake before the user can complete the item removal process. The cabinet can be configured to provide a prompt or other process feature that prevents the cabinet from proceeding to logging out the user or moving past the error unless the user interacts to correct the mistake or accepts the removal of a different product. If desired, the cabinet can send an alert to other devices if the user does not address the error (e.g., walks away from the cabinet with the item).

If desired, in some embodiments, the cabinet can require that user conduct an update when the user logs in the next time or subsequent time. The cabinet is configured to maintain an accurate count of stock items for a product and corresponding serial numbers by performing updates to the database consistent with the actual product removed (e.g., after the user selects that he or she is removing a different product). The system is configured to then be able to interact with other users to login and use the system using up-to-date inventory information while maintaining a record of the error (if the user did not reverse his or her mistake with the machine).

The technique can provide plural independent determinations or authentications of the product that was removed and related determination and authentication of the inventory information.

As such, in accordance with the illustrative descriptions herein, a cabinet system that stores packaged medicine or other regulated healthcare related devices for stocking or dispensing using an optical scanner, and integrates multiple product authentication layers, can be provided that comprises: a cabinet comprising a plurality of sliding drawers each comprising a volume to store items, one or more surfaces including a plurality of visual markers, and one or more dividers that divide the volume into a plurality of nests, a display monitor, and a camera adapted on the cabinet to record the drawers, wherein the cabinet is configured to store individual scanned items in the nests locked in the cabinet from being accessed; and a processor and memory storing computer executable instructions that configures the cabinet to include inventory security and cabinet operation management, a user interface, and imaging and spatial determination processes, wherein execution of the instructions in the memory causes the processor to perform steps comprising: storing in a database data specific to each item comprising, a serial number assigned to that item, a product code assigned to that item that is distinct from the serial number, a product code to which each item corresponds to provide a scanned stock of that product, information identifying the nest and drawer in which the scanned item is stored in the cabinet, and the lot and expiration of the item, communicate, via the user interface, to a user an option to authenticate one or more credentials of the user, permit the user to operate the cabinet in response to authenticating the user, communicate, via the user interface, to a user an option to select a medical product or device available from the stored items to remove from the cabinet, receive, via the user interface, a user selection to obtain an item from the cabinet, unlock one or more of the drawers to make items in cabinet accessible by hand to the user when the drawer is opened, operate the camera to record and save for later retrieval a video of the user's hand entering over the drawer and removing an item, perform imaging and spatial determination processes comprising: record a first image of the one of the drawers when that drawer is open, the first image including the visual markers, determine first content information of that drawer from the first image, record a second image of the same drawer in the first image, and determine second content information of that drawer from the second image; and compare the first image and the second image and identify which one of the nest in that drawer an item was removed by the user, the determination being based on a difference between the images and the visual markers. The cabinet system being further configured to: (a) determine from searching the database whether the selected product is an item scanned into that identified nest for retrieval; (b) receive a scan of the removed item via the optical scanner and in response determine, using the database, whether the removed item is the selected medical product using the scanned information; (c) determine from searching the database whether the serial number of the scanned item is for one of the items the database indicates to be in that nest; and is further configured, in response to, permit the user interaction to acquire the item to proceed without error when it is determined that (a) the removed item is shown in the database to be a product that was stocked into that nest and drawer, (b) the scanned item is the product that user selected via the interface to remove, and/or (c) the serial number of the removed items determined based on the scan is reflected in the database to have been for a corresponding item stored in the cabinet or identified nest. Different combinations of (a), (b), and (c) are contemplated. The cabinet system may be further configured to update in the database, a status of the identified nest and removed item in response to the permitting and make the cabinet ready to operate to transact the removal of a new item. Two verifications as opposed to three are also contemplated.

The cabinet system can be configured to play the recorded video on the monitor using the interface. The cabinet system can be configured to store and track the National Drug Code for each product.

The cabinet system can be further configured to include a second camera that is adapted to take a picture of the user logging into the cabinet system.

The cabinet system can be configured to unlock a plurality of drawers in response to the user logging into system.

The cabinet system can be configured to store the database on a remote server.

The cabinet system can be configured to operate in cooperation with a remote server.

The cabinet system can be configured to store bulk items and track removal of individual items in the bulk package from a specified drawer.

The cabinet system can be configured to use color as a visual marker.

The cabinet system can be adapted to have one or more drawers that are configured to be refrigerated or freezer zones.

Embodiments are contemplated, where a dual mode of operation or open access operation is provided by the management processes of the cabinet. Once a user is authenticated, the cabinet can provide unlocked drawers permitting a "freestyle" approach in which the logged in user can open an unlocked drawer and take an item from a nest and, if desired, at the same time or simultaneously, the cabinet is configured for a guided process (e.g., as shown in FIG. 24) that involves the cabinet allowing the user to select a product and displaying information about the nest and drawer for that product.

Figure 25:
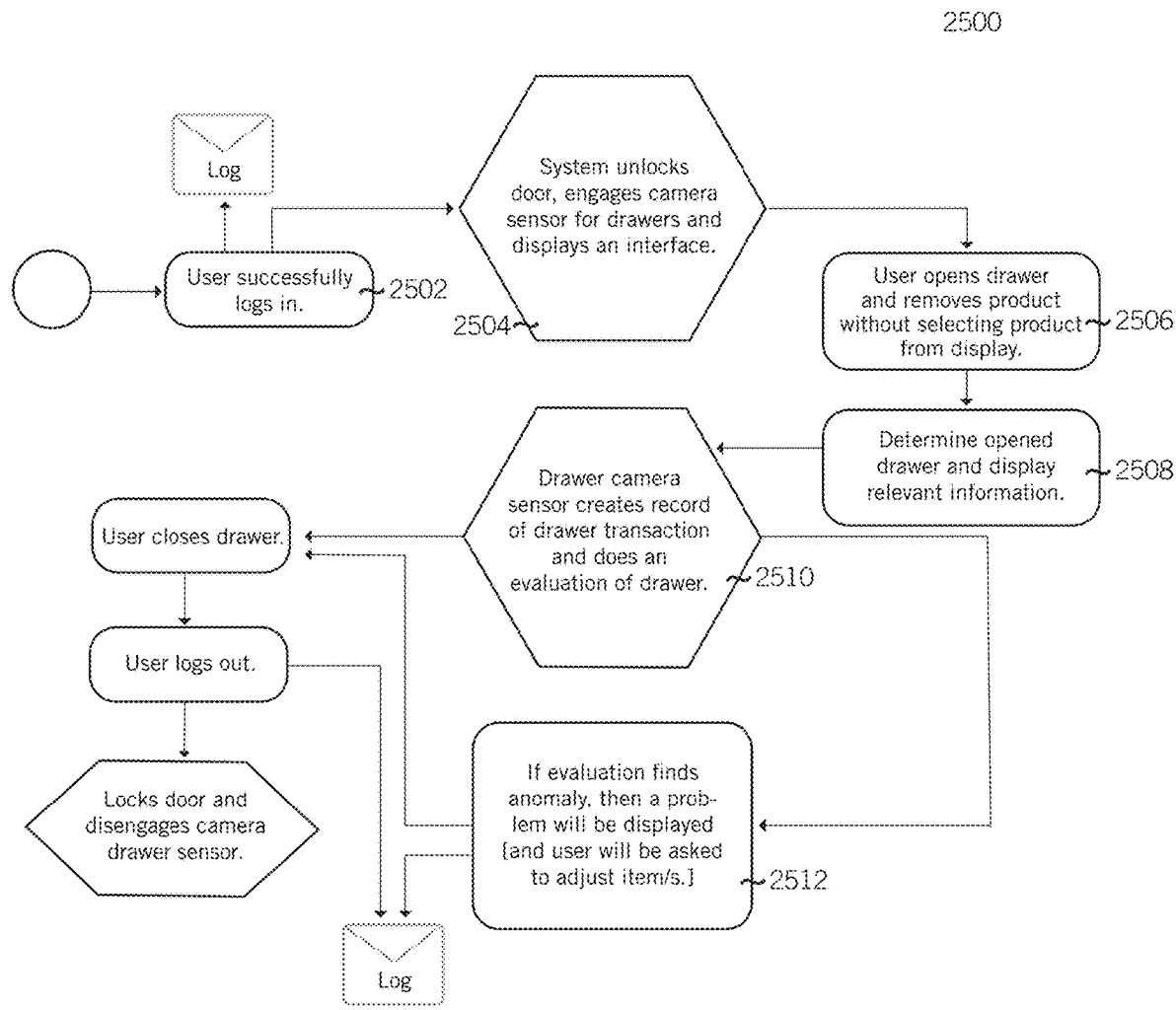
FIG. 25 depicts an illustrative flow chart in accordance with some embodiments of the present invention.

Now with reference to FIG. 25, a flow chart is shown that can implement the alternative or simultaneous process 2500 for removing a product. At step 2504, in response to the authentication, the cabinet can unlocks a cabinet door (if there is one) and unlocks one or more of the sliding drawers such that they can be fully opened such as by being pulled by the user. The cabinet can be configured to have electronically controlled locks that can be unlocked by the operating process. The system can also include one or more sensors for the drawers, such as positioned in the back of the drawers (e.g., each drawer), that detects that one of the unlocked drawers has been pulled open and in response to the detection, automatically locks the other drawers in the cabinet.

The cabinet activates the camera facing down towards the top of the drawers when the drawers are opened and can display a product search option on the user interface. At step 2506, the user pulls open one of the drawers and removes a product from a nest without selecting a product from the display of the user interface. Step 2506 can include, if desired, step 2508. At step 2508, the cabinet can determine the drawer opened by the user such as by using a sensor or markers. In response, the cabinet can retrieve information about the items in the nests of the drawer from the database.

The cabinet can use the information to display information in the interface (on the monitor) about the items in the drawer. The interface can be displaying a live feed from the video camera that is currently over the opened drawer. The user can be facing the monitor and the cabinet can use the retrieved information to display using a graphic (such as an overlay) over the video certain information such as in visual proximity to the item about which the information is provided. For example, the cabinet can determine that product or products in a nest are expired and can display a red indicator on that nest or on that product that notifies the user not to select from that nest or select that marked product. The software can maintain the mapping of each drawer and nest and identify the location of a product or nest in the nest using the special and image analysis features. Using the mapping (e.g., two-dimensional map), the cabinet can specify the location for a graphic. The cabinet can, for example, display the specific lot or expiration information on the display or can display other information in close association with the item. If desired, the information can be displayed in other ways such as in a panel window next to the video. Thus, the cabinet, can for example, allow the user to open any drawer and take an item from the drawer without having to take any steps (the object being to allow the user quick access) after logging in and this can be provided in parallel with the feature that the user can interact with the cabinet to select a product and receive information from the cabinet about which drawer and nest to pull the item. In the "freestyle" process, the cabinet can be configured to display video of the drawer and display information about items or nest to avoid or not to use. These one more features can be provide a much improved system that permits incredibly quick access which may be critical in life saving situations. In some embodiments, the drawers and cabinet do not have markings or information on the front face or side of the drawers or cabinet (e.g., displays or printed text) that informs the user of the content of a corresponding drawer. At step 2510, the cabinet stores a video recording of the interaction with the user and the drawer in removing the item and performs an evaluation to determine if an anomaly occurred (e.g., the user removed an item that user's account is not authorized to remove, cabinet detects an expired item was removed, etc.). At step 2512, the cabinet processes the anomaly and generates an error or performs other operations to address the anomaly.

As discussed herein, and as generally stated, various features herein can be combined. For example, the cabinet can have a configuration that provides for facility personnel seeking items from the cabinet to remove an item from a first drawer and place it in a second drawer of the cabinet for later retrieval, which can be a form of convenience. For example, the cabinet can be configured to allow the user to remove an item from a first drawer and place the item or portions thereof in a second drawer in the cabinet for later removal while the cabinet tracks, as described herein, the inventory placed in the second drawer by the user. For example, the system can be configured to allow the user to scan to remove a bulk item from a first drawer and place the bulk item or portion thereof in a second drawer while also tracking the serial number of the bulk item and its contents and/or its content's serial numbers.

With respect to a dual mode, a cabinet system that stores packaged medicine or regulated healthcare devices comprising, a cabinet comprising a plurality of sliding drawers each comprising a volume that is adapted to store items one or more surfaces including a plurality of visual markers, and one or more dividers that divide the volume into a plurality of nests, a display monitor, and a camera adapted on the cabinet to record the drawers, wherein the cabinet is configured to store (stock) individual scanned items in the nests locked in the cabinet from being accessed; and a processor and memory storing computer executable instructions that configures the cabinet to include inventory security and cabinet operation management, a user interface, and imaging and spatial determination processes, wherein execution of the instructions in the memory causes the processor to perform steps comprising: storing in a database data items specific to each item comprising, a serial number assigned to that product, a product code assigned to that item that is distinct from the serial number, and information identifying the nest and drawer in which the scanned item is stored in the cabinet; communicating, via the user interface, to a user an option to authenticate one or more credentials of the user; permit the user to operate the cabinet in response to authenticating the user, including implementing a dual simultaneous use mode of operation comprising; in response to the user authentication, and providing the following two paths at the same time. In a first mode, communicating to a user, via the user interface, an option to select a product available from the stored items to remove from the cabinet, and receiving, via the user interface, a user selection to obtain an item from the cabinet; and in a second mode, unlocking the drawers to allow the user to open any one of the drawers and remove an item from the opened drawers and have the system automatically identify the selected product in response to the removal, and displaying on the monitor using the camera video of the currently opened drawer and generating, based on information in the database about the items in the currently opened drawer, a visual graphic that is displayed in association with an item in the nest and communicates product information. The cabinet can be configured to implement imaging and spatial determination comprising recording a first image of one of the drawers when that drawer is open, including the visual markers, determine first content information of that drawer from the first image; and recording a second image of the same drawer in the first image, and determine second content information of that drawer from the second image; and comparing the first image and the second image and identify which one of the nests in that drawer an item was removed by the user, the determination being based on a difference between the images and the visual markers. The cabinet can be further configured to determine from searching the database the product that was removed by determining from the database the product that is stored in the identified nest, and perform update operation of the database to reflect the change in items in that identified nest.

As discussed above, features of the cabinet system (sometimes referred to as a cabinet) include a configuration in which the cabinet provides for a user to login and proceed through the operation to remove an item from a first drawer and place that removed item in another (second) drawer in the same cabinet for storage. The cabinet system can be configured to, for example, when a user later uses the cabinet to remove an item of that product, the system can include in the search (based on previously updating the database) the content of the second drawer and can identify the item in the second drawer for the user to remove before or over identifying the product in another cabinet that also stocks that product items (e.g., a drawer that would be tracked for logging transactions). As would be understood, in some embodiments, serial numbers can be included in the operation of the cabinet and database to improve tracking inventory. For example, an individual bulk item having its own serial number for that bulk item can be scanned and stocked in a first drawer and the user can move that item to the second drawer. In response, the system is configured to track individual items in the bulk item by serial number of each individual item.

Figure 26:
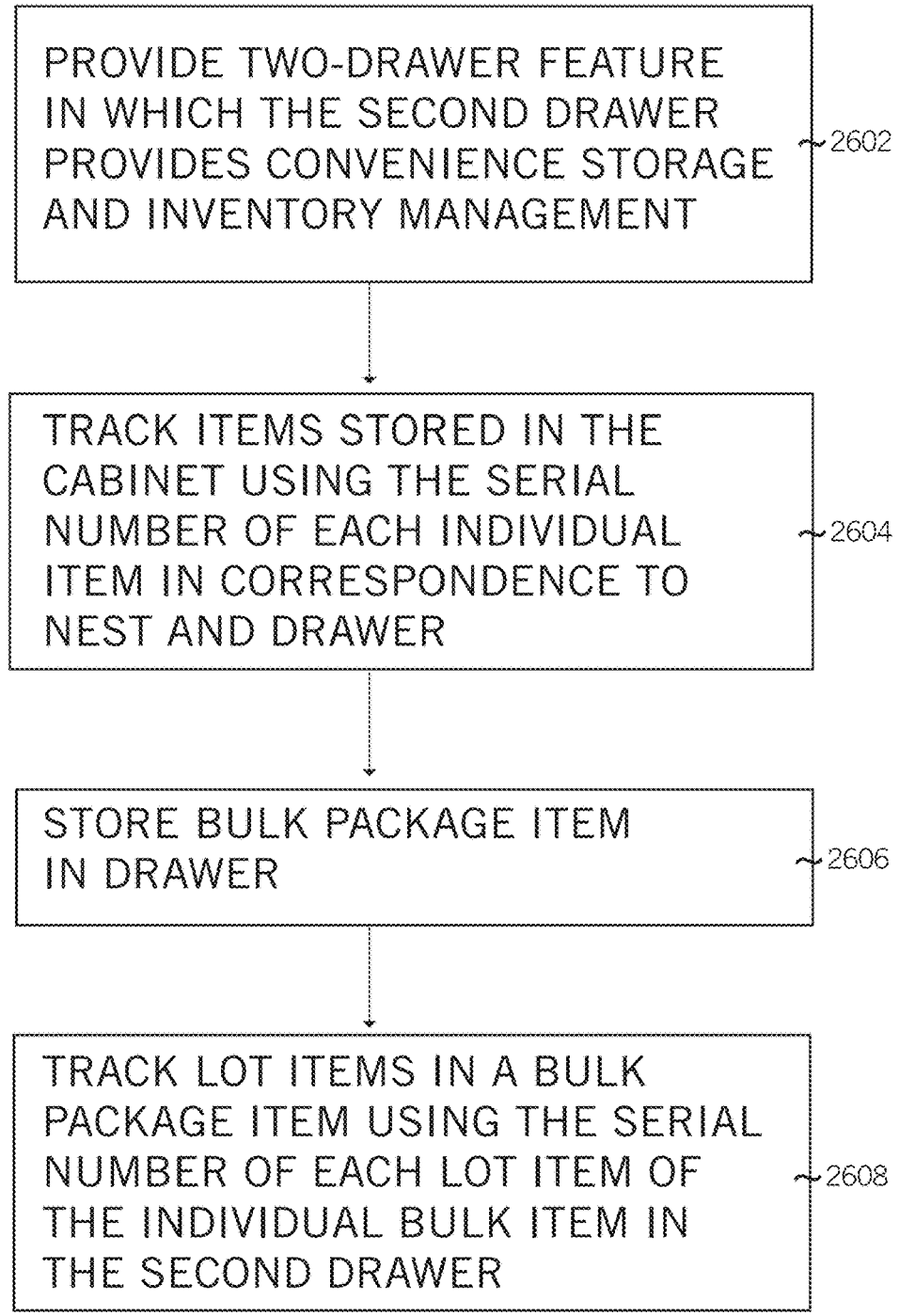
FIG. 26 depicts an illustrative flow chart in accordance with some embodiments of the present invention.

For example, an illustrative flow chart 2600 is provided in FIG. 26. At step 2602, as described above, the cabinet system provides a two-drawer feature in which the second drawer provides convenience storage and inventory management for the facility in a secured cabinet. It should be understood that the first and second drawer can be one or more drawers. At step 2604, the cabinet is configured (as discussed herein) to track items stored in the cabinet using the serial number of individual items in correspondence to the nest and drawer identification containing that item. The cabinet can be configured to stock a bulk product item and can store a specific serial number for an individual bulk product item (step 2606). The bulk item can be stored and scanned into a nest of a first drawer. For example, a 10-pack of syringes can be a bulk item that is packaged as one item (e.g., by the manufacturer) and the bulk item has its own serial number and product code. The serial number and product code can be distinct from the serial number of each item in the bulk package. Each item can have its own serial number. The items in the bulk package can have the same product code. At step, 2608, the cabinet is configured to track the bulk lot items in a bulk product item using the serial number of each lot item of the individual bulk product item in the second drawer. The cabinet can store in the database each of the lot item serial numbers and the product code. In response to the user placing the bulk item in the second drawer (using the image and spatial analysis process, software and hardware, as described), the cabinet can determine that the bulk item contained a specific number of items and track each removed item by checking the serial number and updating the inventory information in the database as the user scanned individual items out from the second drawer. The cabinet can automatically provide security to the tracking of such bulk items that are often the subject of loss or security issues because of the user obtaining a lot to meet the need of one item. The cabinet automatically expands one bulk item with a corresponding single serial number to a set of individual items in the bulk pack with its own corresponding distinct serial number. The database is updated to include the nest, drawer, and item serial number correspondence.

As discussed, the cabinet system can include a processor (e.g., a computer in the cabinet, or at or near the cabinet in the facility or room) and can be configured to communicate with a server or application in the cloud to provide features and services.

The first and second drawers (or one or more of each) can be adapted in the cabinet to be a refrigerated or freezer section or otherwise be a temperature-controlled zone. The drawers can be positioned in a temperature-controlled zone that is a refrigerator zone or a freezer zone.

The cabinet system can be configured to allow a user to login via the interface and in response to a user selecting product, determining whether items of that product are stored in the first drawer or second drawer and if stored in the second drawer, communicate to the user to remove the item from the second drawer. As such, when an item is stored in a convenience drawer (second drawer), the cabinet is configured to direct the user to the convenience drawer over another drawer that contains one of the items such as on where the item is one that would be invoiced to the hospital or similar transaction when it is removed.

The cabinet system can configured to allow the user to open any drawer upon logging into the cabinet through the interface and displaying on the interface information in visual association with an opened drawer about the contents of the drawer in real time for the user. The cabinet system can be configured to provide such quick access to the content wherein the user can login and in response a plurality of the drawers are unlocked for sliding open and removing items. As discussed, the cabinet can include a monitor through which software application of the cabinet can display a live video of the opened drawer and also display a graphic in association with the relevant location in the video to inform the user of relevant information about an item or nest in the current view such as marking graphically an expired item. As mentioned, the cabinet system can be implemented to display a live video of the drawer during the user's interaction with the drawer using a monitor facing out on a front of the cabinet.

Implementations of embodiments involving different combination of features are contemplated.

For the sake of brevity and clarity, the present description may have been written without specific discussion referencing software or hardware (equipment). It should be understood that software and/or hardware of the cabinet or system are configured to provide the described feature or functionality such as being configured to use the visual markers to provide the described operational capability. This is to affirmatively explain that the system, cabinet, or corresponding element is configured to provide the described capability.

It is understood from the above description that the functionality and features of the systems, devices, or methods of embodiments of the present invention include generating and sending signals to accomplish the actions.

It should be understood that variations, clarifications, or modifications are contemplated. It should also be understood by one of ordinary skill in the art that features, processes, or elements described in various context or portions in this application can be combined to provide variations (various combinations) that are within the scope. For example, in some portions, a scan of a product is implemented as part of an embodiment but this is not used another embodiment, it would be understood that the embodiment is described with or without the scan by combination with the other embodiment. It would be understood that features described herein to provide corresponding operation functionality as part of the cabinet, system, or process can be substantially, substantially only, primarily, consisting of, or consisting essentially of that feature for providing that operational functionality. (e.g., identifying how far a drawer is open may only involve the system being configured to use the visual markers at the top of nest walls to evaluate how far the drawer is open as described). Applications of the technology to other fields are likewise contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes or would primarily be understood to involve user intervention or manual operation (e.g., determining nest configuration in a drawer is automatically performed by the cabinet, detecting a broken pattern is automatically performed by the cabinet, etc.).

It should be understood that claims that include fewer limitations, broader claims, such as claims without requiring a certain feature or process step (e.g., removing a feature or step) in the appended claim or in the specification, clarifications to the claim elements, different combinations, and alternative implementations based on the specification, or different uses, are also contemplated by the embodiments of the present invention.

The words "can" or "may" are used to communicate or clarify that this is one option and others options or variations are contemplated. This is not to say that if such a word is not used, it is being communicated that this only implementation.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

It is intended that the specification and examples be considered as exemplary only, with a true scope being indicated by the claims and their equivalents.

What is claimed is:

1. A cabinet system that stores packaged medicine or other regulated healthcare related devices for stocking or dispensing using an optical scanner, and integrates multiple product authentication layers, comprising:
   a cabinet comprising a plurality of sliding drawers each comprising a volume to store items, one or more surfaces including a plurality of visual markers, and one or more dividers that divide the volume into a plurality of nests, a display monitor, and a camera adapted on the cabinet to record the drawers, wherein the cabinet is configured to store individual scanned items in the nests locked in the cabinet from being accessed; and
   a processor and memory storing computer executable instructions that configures the cabinet to include inventory security and cabinet operation management, a user interface, and imaging and spatial determination processes, wherein execution of the instructions in the memory causes the processor to:

store in a database data specific to each item comprising, a serial number assigned to that item, a product code assigned to that item that is distinct from the serial number, a product code to which each item corresponds to provide a scanned stock of that product, information identifying the nest and drawer in which the scanned item is stored in the cabinet, and lot and expiration of the item;

communicate, via the user interface, to a user an option to authenticate one or more credentials of the user;

permit the user to operate the cabinet in response to authenticating the user communicate, via the user interface, to a user an option to select a medical product or device available from the stored items to remove from the cabinet;

receive, via the user interface, a user selection to obtain an item from the cabinet;

unlock one or more of the drawers to make items in cabinet accessible by hand to the user when the drawer is opened;

operate the camera to record and save for later retrieval a video of the user's hand entering over the drawer and removing an item;

perform imaging and spatial determination processes comprising,
 record a first image of the one of the drawers when that drawer is open, the first image including the visual markers, determine first content information of that drawer from the first image;
 record a second image of the same drawer in the first image, and determine second content information of that drawer from the second image; and
 compare the first image and the second image and identify which one of the nest in that drawer an item was removed by the user, the determination being based on a difference between the images and the visual markers;

determine from searching the database whether the selected product is an item scanned into that identified nest for retrieval;

receive a scan of the removed item via the optical scanner and in response, determine, using the database, whether the removed item is the selected medical product using the scanned information;

determine from searching the database whether the serial number of the scanned item is for one of the items the database indicates to be in that nest;

permit the user interaction to acquire the item to proceed without error when it is determined that (a) the removed item is shown in the database to be a product that was stocked into that nest and drawer, (b) the scanned item is the product that user selected via the interface to remove, and (c) the serial number of the removed items determined based on the scan is reflected in the database to have been for a corresponding item stored in the cabinet or identified nest;

update in the database a status of the identified nest and removed item in response to the permitting and make the cabinet ready to operate to transact the removal of a new item.

2. The cabinet system of claim 1 wherein the cabinet is configured to play the recorded video on the monitor using the interface.

3. The cabinet system of claim 1 wherein the product code is a National Drug Code.

4. The cabinet system of claim 1 wherein the cabinet system is further configured to include a second camera that is adapted to take a picture of the user logging into the cabinet system.

5. The cabinet system of claim 1 wherein the cabinet system is configured to unlock a plurality of drawers in response to the user logging into system.

6. The cabinet system of claim 1 wherein the cabinet system is configured to store the database on a remote server.

7. The cabinet system of claim 1 wherein the cabinet system is configured to operate in cooperation with a remove server.

8. The cabinet system of claim 1 wherein the cabinet system is configured to stored bulk items and track removal of individual items in the bulk package from a specified drawer.

9. The cabinet system of claim 1 wherein the cabinet system is configured to use color as a visual marker.

10. The cabinet system of claim 1 wherein one or more drawers are configured to refrigerated or freezer zones.

11. A cabinet system that stores packaged medicine or regulated healthcare devices comprising:
 a cabinet comprising a plurality of sliding drawers each comprising a volume to store items, one or more surfaces including a plurality of visual markers, and one or more dividers that divide the volume into a plurality of nests, a display monitor, and a camera adapted on the cabinet to record the drawers, wherein the cabinet is configured to store (stock) individual scanned items in the nests locked in the cabinet from being accessed; and
 a processor and memory storing computer executable instructions that configures the cabinet to include inventory security and cabinet operation management, a user interface, and imaging and spatial determination processes, wherein execution of the instructions in the memory causes the processor to:
store in a database data items specific to each item comprising, a serial number assigned that product, a product code assigned to that item that is distinct from the serial number, and information identifying the nest and drawer in which the scanned item is stored in the cabinet;
communicate, via the user interface, to a user an option to authenticate one or more credentials of the user;
permit the user to operate the cabinet in response to authenticating the user including implementing a dual simultaneous use mode of operation comprising;
 in response to the user authentication, providing the following two paths at the same time,
  in a first mode,
   communicating, via the user interface, to a user an option to select a product available from the stored items to remove from the cabinet;
   receiving, via the user interface, a user selection to obtain an item from the cabinet, and
  in a second mode,
   unlocking the drawers to allow the user to open any one of the drawers and remove an item from the opened drawers and have the system automatically identify the selected product in response to the removal; and
   displaying on the monitor using the camera video of the currently opened drawer and generating, based on information in the database about the items in the currently opened drawer, a visual graphic that is displayed in association with an item in the nest and communicates product information;

implement imaging and spatial determination comprising,
recording a first image of the one of the drawers when that drawer is open, the first image including the visual markers, determine first content information of that drawer from the first image;

recording a second image of the same drawer in the first image, and determine second content information of that drawer from the second image; and comparing the first image and the second image and identify which one of the nest in that drawer an item was removed by the user, the determination being based on a difference between the images and the visual markers;

determine from searching the database the product that was removed by determining from the database the product that is stored in the identified nest;

perform update operation of the database to reflect the change in items in that identified nest.

12. The system of claim 11, where the system is further configured to receive a scan of the removed item via the optical scanner and in response, determine, using the database, whether the removed item is the selected product using the scanned information.

13. The system of claim 11, wherein the system is configured to include in the database lot and expiration information corresponding to items in the drawers.

14. The system of claim 13, wherein the system is configured to display on the interface a graphic informing the user in association with an item a nest that the item is expired or soon to expire.

15. The system of claim 13, wherein the system is configured to display on the interface during the second mode a graphic on the interface informing the user to avoid an item or nest.

16. The system of claim 11 wherein the system is configured using a sensor to determine when an unlocked drawer is opened and in response, locks the other drawers.

17. The system of claim 11 wherein the system is configured to allow the user to remove an item from a first drawer and place the item or portions thereof in a second drawer in the cabinet for later removal while tracking the inventory placed in the second drawer by the user.

18. The system of claim 11 wherein the system is configured to allow the user to scan to remove a bulk item from a first drawer and place the bulk item or portion thereof in a second drawer while also tracking the serial number of the bulk item and its contents.

19. The system of claim 11 wherein the system is configured to record a video of the user's had interaction with an opened drawer for later retrieval and security review.

20. A cabinet system comprising:
a first drawer configured to store items to be scanned by an optical scanner;
a second drawer configured to store items from the first drawer scanned by the optical scanner;
wherein the first drawer and second drawer comprise a volume to store items, one or more surfaces of the first drawer including a plurality of visual markers, and one or more dividers that divide the volume into a plurality of nests; and
an imaging, spatial determination, and operating system including a processor and memory storing computer executable instructions, a user interface, and a camera, wherein execution of the instructions in the memory causes the processor to:

store for later retrieval a serial number for each of a plurality of items stored in the first drawer;

communicate, via the user interface, to a user an option to select an item stored in the first drawer and identify an item from the first drawer scanned by the optical scanner as a scanned item;

receive, via the user interface, a user selection to obtain an item from the cabinet, determine whether the item to be obtained is available in the first drawer or the second drawer, and communicate, via the user interface, to the user that the item to be obtained is available in the second drawer when the item to be obtained is available in both the first drawer and the second drawer;

communicate, via the user interface, to the user to retrieve the item to be obtained from the first drawer when the step of determining determines that the item is unavailable in the second drawer, and identify the retrieved item after scanning by the optical scanner as a scanned item;

make the second drawer available to the user to store the identified item;

store the serial number of the identified item with information updating a location of the item to be that it is stored in the second drawer;

in response to updating the location, use the information of the identified item in the second drawer to store, in the database, individual serial numbers each corresponding to individual lot items contained in the identified item;

determine for users that the lot items is available in the second drawer and update the database to maintain a current lot item count of the lot items and removed lot item serial numbers when one of the lot items is scanned for removal;

record, via the camera, a first image of the first drawer or the second drawer when that drawer is open, the first image including the visual markers, and determine first content information of that drawer from the first image;

record, via the camera, a second image of the same drawer in the first image, and determine second content information of that drawer from the second image; and compare the first image and the second image and determine if there is a difference between the images and update content information of that drawer based on the comparison.

21. The cabinet system of claim 20 wherein the imaging, spatial determination, and operating system is implemented using one or more computers remotely located from a facility in which the cabinet is located.

22. The cabinet system of claim 20 wherein the first and second drawer are positioned in a temperature-controlled zone that is a refrigerator zone or a freezer zone.

23. The cabinet system of claim 20 wherein the cabinet system is configured to allow a user to login via the interface and in response to a user selecting product, determining whether items of that product are stored in the first drawer or second drawer and if stored in the second drawer, communicate to the user to remove the item from the second drawer.

24. The cabinet system of claim 20 wherein the cabinet system is configured to allow the user to open any drawer upon logging into the cabinet through interface and displaying on the interface information in visual association with the drawer about the contents of the drawer in real time for the user.

25. The cabinet system of claim 20 wherein the cabinet system is implemented to display a live video of the drawer during the user's interaction with the drawer using a monitor facing out on a front of the cabinet.

\* \* \* \* \*